(12) United States Patent
Feng et al.

(10) Patent No.: US 12,474,814 B2
(45) Date of Patent: Nov. 18, 2025

(54) DISPLAYING AN ENVIRONMENT FROM A SELECTED POINT-OF-VIEW

(71) Applicant: Apple Inc., Cupertino, CA (US)

(72) Inventors: Dan Feng, Santa Clara, CA (US); Aashi Manglik, Sunnyvale, CA (US); Adam M. O'Hern, Campbell, CA (US); Bo Morgan, Santa Cruz, CA (US); Bradley W. Peebler, Redwood City, CA (US); Daniel L. Kovacs, Los Angeles, CA (US); Edward Ahn, San Francisco, CA (US); James Moll, Studio City, CA (US); Mark E. Drummond, East Palo Alto, CA (US); Michelle Chua, Seattle, WA (US); Mu Qiao, Campbell, CA (US); Noah Gamboa, San Francisco, CA (US); Payal Jotwani, Santa Clara, CA (US); Siva Chandra Mouli Sivapurapu, Morgan Hill, CA (US)

(73) Assignee: APPLE INC., Cupertino, CA (US)

(*) Notice: Subject to any disclaimer, the term of this patent is extended or adjusted under 35 U.S.C. 154(b) by 66 days.

(21) Appl. No.: 18/113,020

(22) Filed: Feb. 22, 2023

(65) Prior Publication Data
US 2023/0350536 A1    Nov. 2, 2023

Related U.S. Application Data

(63) Continuation of application No. PCT/US2021/044256, filed on Aug. 3, 2021.
(Continued)

(51) Int. Cl.
*G06F 3/04815*    (2022.01)
*G06F 3/01*    (2006.01)
(Continued)

(52) U.S. Cl.
CPC .......... *G06F 3/04815* (2013.01); *G06F 3/017* (2013.01); *G06T 17/00* (2013.01); *G10L 15/22* (2013.01); *G10L 2015/223* (2013.01)

(58) Field of Classification Search
CPC ..... G06F 3/04815; G06F 3/017; G06T 17/00; G06T 15/20; G10L 15/22; G10L 2015/223
See application file for complete search history.

(56) References Cited

U.S. PATENT DOCUMENTS 10,559,118 B2    2/2020 Hurter
2010/0156906 A1    6/2010 Montgomery et al.
(Continued)

FOREIGN PATENT DOCUMENTS

EP    3236345 A1    10/2017
WO    2019231893 A1    12/2019

OTHER PUBLICATIONS

PCT International Search Report and Written Opinion dated Nov. 4, 2021, PCT International Application No. PCT/US2021/044256, pp. 1-14.

*Primary Examiner* — Antonio A Caschera
(74) *Attorney, Agent, or Firm* — Fernando & Partners, LLP

(57) ABSTRACT

A device obtains a request to display a graphical environment. The graphical environment is associated with a set of saliency values corresponding to respective portions of the graphical environment. A POV for displaying the graphical environment is selected based on the set of saliency values. The graphical environment is displayed from the selected POV on the display.

18 Claims, 35 Drawing Sheets

Related U.S. Application Data

(60) Provisional application No. 63/142,248, filed on Jan. 27, 2021, provisional application No. 63/070,008, filed on Aug. 25, 2020.

(51) Int. Cl.
*G06T 17/00* (2006.01)
*G10L 15/22* (2006.01)

(56) References Cited

U.S. PATENT DOCUMENTS

| | | | |
|---|---|---|---|
| 2013/0135315 A1* | 5/2013 | Bares | G11B 27/031 |
| | | | 345/473 |
| 2016/0352982 A1* | 12/2016 | Weaver | H04N 23/695 |
| 2017/0363949 A1 | 12/2017 | Valente et al. | |
| 2018/0307303 A1 | 10/2018 | Powderly et al. | |
| 2019/0101882 A1 | 4/2019 | Strinden et al. | |
| 2020/0160746 A1 | 5/2020 | Belch et al. | |

* cited by examiner

700

(A)

Select point-of-view (POV) for displaying graphical environment based on set of saliency values — 720

- Graphical environment comprises plurality of objects; each object is associated with one of the saliency values; selecting POV comprises selecting one of the plurality of objects based on saliency values 720a
- Saliency values correspond to respective portions of object in graphical environment; selecting POV comprises selecting portion of object based on saliency values 720b
- Request to display graphical environment identifies object 720c
- Select POV based on relationship between objects in graphical environment 720d

Display, on display, graphical environment from selected POV — 730

- Display view of two objects in graphical environment that are related to each other 730a
- Switch from another POV to selected POV in response to obtaining request to display graphical environment 730b

Figure 7B

DISPLAYING AN ENVIRONMENT FROM A SELECTED POINT-OF-VIEW

CROSS-REFERENCE TO RELATED APPLICATIONS

This application is a continuation of Intl. Patent App. No. PCT/US2021/44256, filed on Aug. 3, 2021, which claims priority to U.S. Provisional Patent App. No. 63/070,008, filed on Aug. 25, 2020 and U.S. Provisional Patent App. No. 63/142,248 filed on Jan. 27, 2021, which are incorporated by reference in their entirety.

TECHNICAL FIELD

The present disclosure generally relates to displaying an environment from a selected point-of-view.

BACKGROUND

Some devices are capable of generating and presenting graphical environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 7A-7B are a flowchart representation of a method for presenting a graphical environment in accordance with some implementations.

Figure 1A:
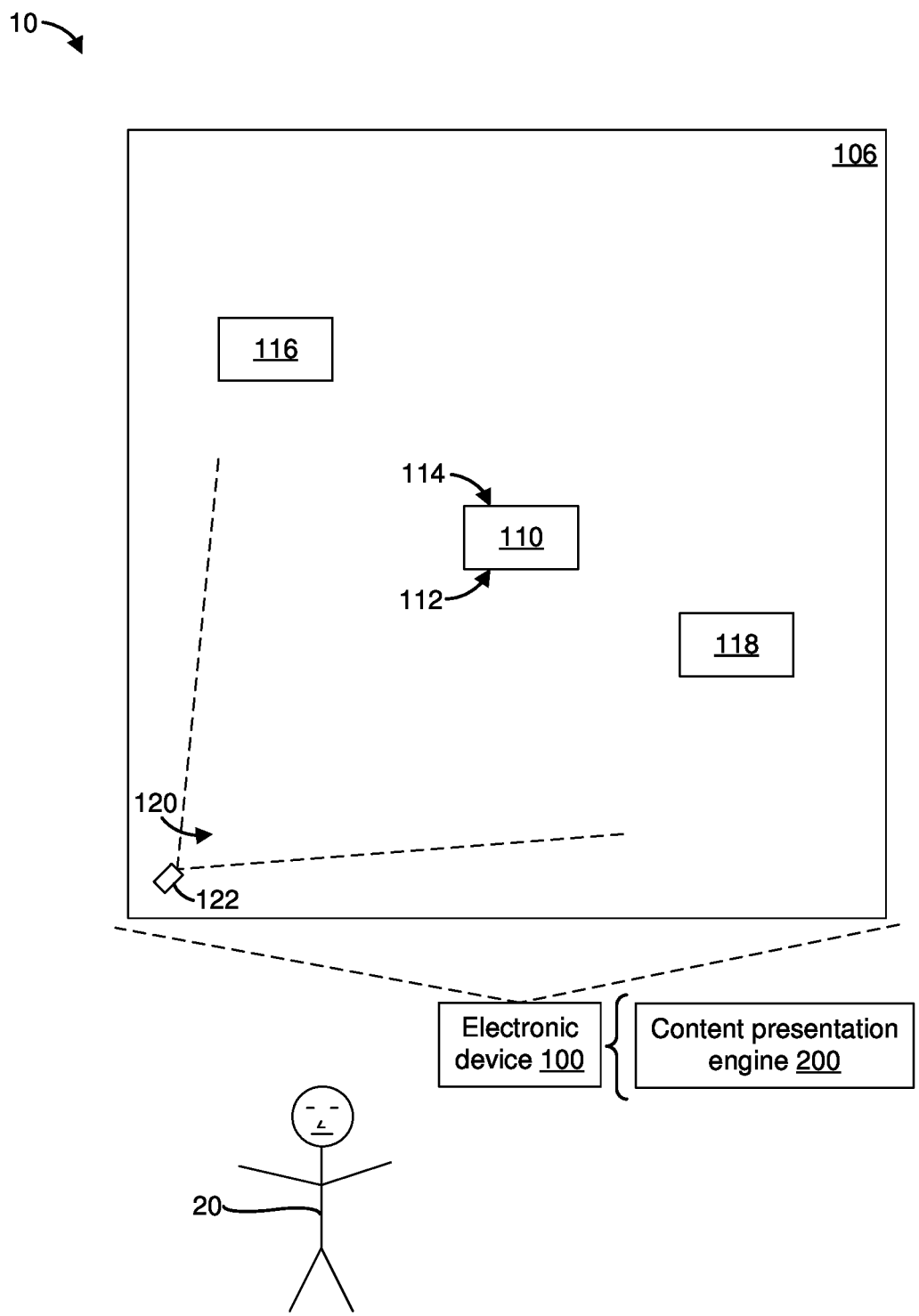
FIGS. 1A-1L are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for selecting a point-of-view (POV) for displaying an environment. In some implementations, a device includes a display, one or more processors, and a non-transitory memory. In some implementations, a method includes displaying, on the display, a graphical environment from a first point-of-view (POV). In some implementations, the method includes selecting a second POV based on a speech input received via the audio sensor and an untethered input obtained via the input device. In some implementations, the method includes displaying the graphical environment from the second POV.

In some implementations, a method includes obtaining a request to display a graphical environment. The graphical environment is associated with a set of saliency values corresponding to respective portions of the graphical environment. A POV for displaying the graphical environment is selected based on the set of saliency values. The graphical environment is displayed from the selected POV on the display.

In some implementations, a method includes displaying a first view of a target located in a graphical environment. The first view is associated with a first rig. A change in the graphical environment is detected. The method includes switching from a first rig to a second rig in response to detecting the change in the graphical environment. The second rig provides a second view of the target that is different from the first view.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

In some implementations, an electronic device comprises one or more processors working with non-transitory memory. In some implementations, the non-transitory memory stores one or more programs of executable instructions that are executed by the one or more processors. In some implementations, the executable instructions carry out the techniques and processes described herein. In some implementations, a computer (readable) storage medium has instructions that, when executed by one or more processors of an electronic device, cause the electronic device to perform, or cause performance, of any of the techniques and processes described herein. The computer (readable) storage medium is non-transitory. In some implementations, a device includes one or more processors, a non-transitory memory, and means for performing or causing performance of the techniques and processes described herein.

Some devices allow a user to provide an input to switch a point-of-view (POV) from which an environment is displayed. For example, the user may use an input device, such as a mouse or hotkeys, to select the POV from which the user can view the environment. The user can use the mouse to change a camera angle from which the device is displaying the environment. However, some user inputs to display the graphical environment from a particular POV are ambiguous. This ambiguity can detract from a user experience of the device. Additionally, this ambiguity can result in increased user inputs to specify the desired POV, resulting in increased power consumption.

The present disclosure provides methods, systems, and/or devices for presenting a graphical environment from a selected POV. In some implementations, the device utilizes saliency values associated with the graphical environment to select a POV for displaying the graphical environment. Saliency values may represent respective levels of importance of features of the graphical environment. In some implementations, saliency values are associated with objects in the graphical environment and/or with portions of objects in the graphical environment. For example, each object in the graphical environment may be associated with a saliency map that indicates the most salient portions of the object. In some implementations, saliency values are different for different users. For example, for some users, a head portion of an object may be the most salient portion, while for other users, a torso portion of the object may be the most salient portion.

When a device is displaying a view of an object from a particular POV, the graphical environment may change such that the object is not readily visible from the POV. For example, if the POV corresponds to following the object, a view of the object may be obstructed by other objects. The view of the object may be obstructed if the object turns a corner. In some implementations, the device switches between multiple rigs to maintain a visual of an object. For example, if an obstruction comes in the way of a line of sight to the object, the device may switch to a different rig that is not affected by the obstruction. As another example, if the object is moving, the device may switch rigs to maintain visibility of the object. For example, as the object travels around corners, the device may switch rigs to change a camera angle.

FIG. 1A is a block diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 100 and a content presentation engine 200. In some implementations, the electronic device 100 includes a handheld computing device that can be held by a user 20. For example, in some implementations, the electronic device 100 includes a smartphone, a tablet, a media player, a laptop, or the like. In some implementations, the electronic device 100 includes a wearable computing device that can be worn by the user 20. For example, in some implementations, the electronic device 100 includes a head-mountable device (HMD) or an electronic watch.

In the example of FIG. 1A, the content presentation engine 200 resides at the electronic device 100. For example, the electronic device 100 implements the content presentation engine 200. In some implementations, the electronic device 100 includes a set of computer-readable instructions corresponding to the content presentation engine 200. Although the content presentation engine 200 is shown as being integrated into the electronic device 100, in some implementations, the content presentation engine 200 is separate from the electronic device 100. For example, in some implementations, the content presentation engine 200 resides at another device (e.g., at a controller, a server or a cloud computing platform).

As illustrated in FIG. 1A, in some implementations, the electronic device 100 presents an extended reality (XR) environment 106. In some implementations, the XR environment 106 is referred to as a computer graphics environment. In some implementations, the XR environment 106 is referred to as a graphical environment. In some implementations, the electronic device 100 generates the XR environment 106. Alternatively, in some implementations, the electronic device 100 receives the XR environment 106 from another device that generated the XR environment 106.

In some implementations, the XR environment 106 includes a virtual environment that is a simulated replacement of a physical environment. In some implementations, the XR environment 106 is synthesized by the electronic device 100. In such implementations, the XR environment 106 is different from a physical environment in which the electronic device 100 is located. In some implementations, the XR environment 106 includes an augmented environment that is a modified version of a physical environment. For example, in some implementations, the electronic device 100 modifies (e.g., augments) the physical environment in which the electronic device 100 is located to generate the XR environment 106. In some implementations, the electronic device 100 generates the XR environment 106 by simulating a replica of the physical environment in which the electronic device 100 is located. In some implementations, the electronic device 100 generates the XR environment 106 by removing and/or adding items from the simulated replica of the physical environment in which the electronic device 100 is located.

In some implementations, the XR environment 106 includes various virtual objects such as an XR object 110 ("object 110", hereinafter for the sake of brevity) that includes a front portion 112 and a rear portion 114. In some implementations, the XR environment 106 includes multiple objects. In the example of FIG. 1A, the XR environment 106 includes objects 110, 116 and 118. In some implementations, the virtual objects are referred to as graphical objects or XR objects. In various implementations, the electronic device 100 obtains the virtual objects from an object datastore (not shown). For example, in some implementations, the electronic device 100 retrieves the object 110 from the object datastore. In some implementations, the virtual objects represent physical elements. For example, in some implementations, the virtual objects represent equipment (e.g., machinery such as planes, tanks, robots, motorcycles, etc.). In some implementations, the virtual objects represent fictional elements (e.g., entities from fictional materials, for example, an action figure or a fictional equipment such as a flying motorcycle).

In various implementations, the electronic device 100 (e.g., the content presentation engine 200) presents the XR environment 106 from a first point-of-view (POV) 120. In the example of FIG. 1A, the electronic device 100 displays the first POV 120 via a first rig 122. In some implementations, the electronic device 100 uses the first rig 122 to capture a representation of the XR environment 106 from the first POV 120, and the electronic device 100 displays the representation of the XR environment 106 captured from the first POV 120. In some implementations, the first rig 122 includes a set of one or more virtual environmental sensors. For example, in some implementations, the first rig 122 includes a virtual image sensor (e.g., a virtual camera), a virtual depth sensor (e.g., a virtual depth camera), or a virtual audio sensor (e.g., a virtual microphone). In some implementations, the XR environment 106 includes a physical environment, and the first rig 122 includes a set of one or more physical environmental sensors. For example, in some implementations, the first rig 122 includes a physical image sensor (e.g., a physical camera), a physical depth sensor (e.g., a physical depth camera), or a physical audio sensor (e.g., a physical microphone). In some implementations, the first rig 122 is fixed at a location within the XR environment 106 (e.g., the first rig 122 is stationary).

In various implementations, when the electronic device 100 presents the XR environment 106 from the first POV 120, the user 20 sees what the XR environment 106 looks like from a location corresponding to the first rig 122. For example, when the electronic device 100 displays the XR environment 106 from the first POV 120, the user 20 sees the front portion 112 of the object 110 and not the rear portion 114 of the object 110. In some implementations, when the electronic device 100 presents the XR environment 106 from the first POV 120, the user 20 hears sounds that are audible at a location corresponding to the first rig 122. For example, the user 20 hears sounds that the first rig 122 detects.

In some implementations, the electronic device 100 includes or is attached to a head-mountable device (HMD) worn by the user 20. The HMD presents (e.g., displays) the XR environment 106 according to various implementations. In some implementations, the HMD includes an integrated display (e.g., a built-in display) that displays the XR environment 106. In some implementations, the HMD includes a head-mountable enclosure. In various implementations, the head-mountable enclosure includes an attachment region to which another device with a display can be attached. For example, in some implementations, the electronic device 100 can be attached to the head-mountable enclosure. In various implementations, the head-mountable enclosure is shaped to form a receptacle for receiving another device that includes a display (e.g., the electronic device 100). For example, in some implementations, the electronic device 100 slides/snaps into or otherwise attaches to the head-mountable enclosure. In some implementations, the display of the device attached to the head-mountable enclosure presents (e.g., displays) the XR environment 106. In various implementations, examples of the electronic device 100 include smartphones, tablets, media players, laptops, etc.

Figure 1B:
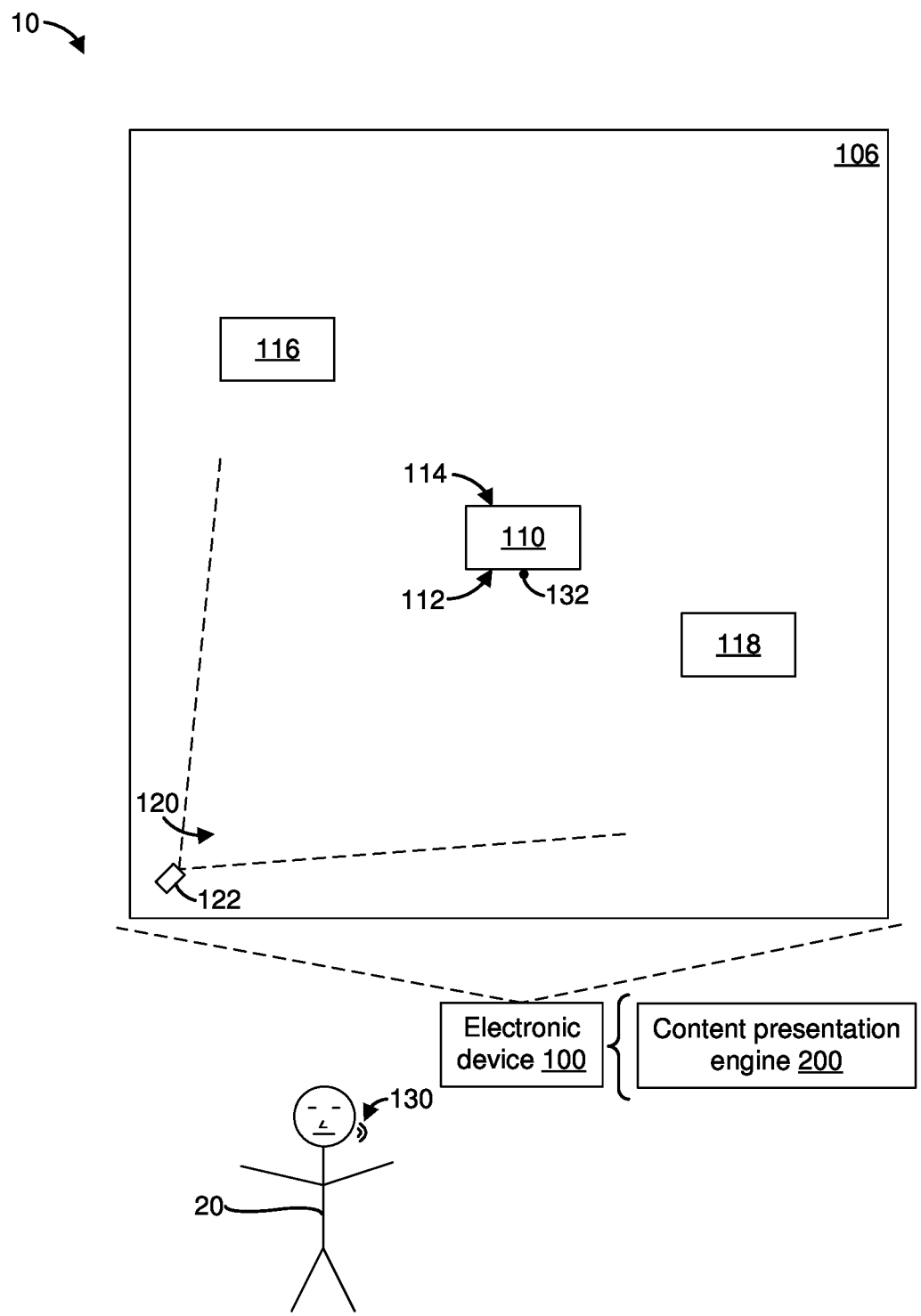

Referring to FIG. 1B, in some implementations, the electronic device 100 detects a speech input 130. In some implementations, the speech input 130 includes an utterance from the user 20 (e.g., the user 20 utters "focus"). In some implementations, the content presentation engine 200 determines that the speech input 130 corresponds to a request to switch from the first POV 120 to another POV. However, in some implementations, the speech input 130 on its own is not sufficient to determine the other POV. For example, in some implementations, the speech input 130 is ambiguous. For example, if the user 20 utters "focus" and there are multiple objects in the XR environment 106, the content presentation engine 200 determines that the speech input 130 is ambiguous because the speech input 130 does not specify which of the objects to focus on. In the example of FIG. 1B, the speech input 130 of "focus" does not specify whether to focus on the object 110, the object 116 or the object 118.

In various implementations, the content presentation engine 200 uses another input to disambiguate the speech input 130. In the example of FIG. 1B, the content presentation engine 200 obtains a gaze input 132. In some implementations, the gaze input 132 indicates that a gaze of the user 20 is directed to a particular region within the XR environment 106. In the example of FIG. 1B, the gaze input 132 indicates that the user 20 is looking at the front portion 112 of the object 110. In some implementations, the electronic device 100 includes a user-facing image sensor (e.g., a front-facing camera or an inward-facing camera), and the electronic device 100 determines the gaze input 132 based on a set of one or more images captured by the user-facing image sensor.

In some implementations, the content presentation engine 200 uses the gaze input 132 to disambiguate the speech input 130. For example, if the speech input 130 is to "focus" and the gaze input 132 indicates that the user 20 is looking at the object 110, the content presentation engine 200 determines that the user 20 wants to view the XR environment 106 from a POV that focuses on the object 110.

Figure 1C:
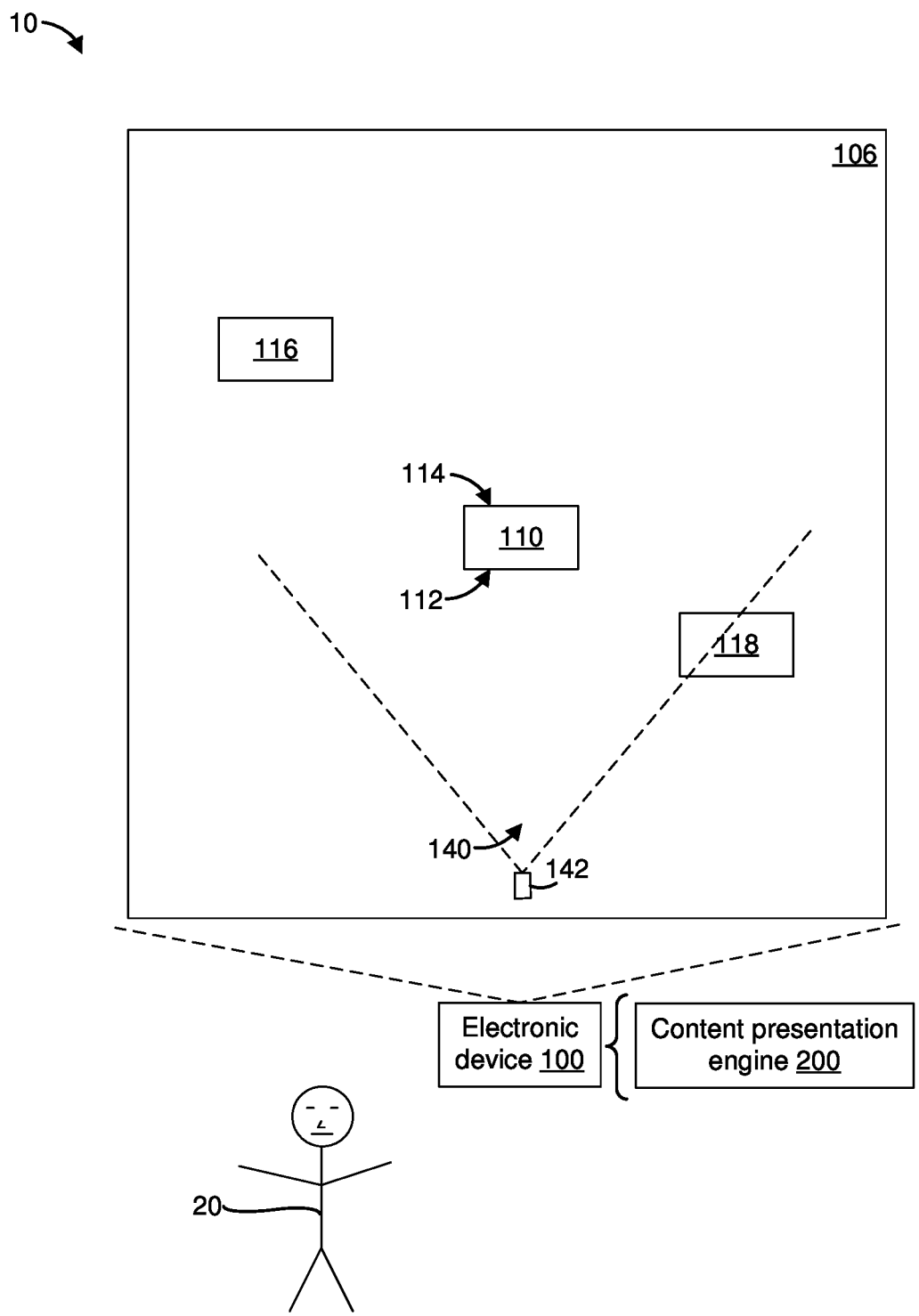

Referring to FIG. 1C, in some implementations, the electronic device 100 displays the XR environment 106 from a second POV 140 in response to detecting the speech input 130 and the gaze input 132 shown in FIG. 1B. Since the speech input 130 was to "focus" and the gaze input 132 indicates that the user 20 is looking at the front portion 112 of the object 110, the second POV 140 focuses on the front portion 112 of the object 110. For example, the front portion 112 of the object 110 is in the center of the second POV 140.

In the example of FIG. 1C, the electronic device 100 displays the second POV 140 via a second rig 142. In some implementations, the electronic device 100 uses the second rig 142 to capture a representation of the XR environment 106 from the second POV 140, and the electronic device 100 displays the representation of the XR environment 106 captured from the second POV 140. In some implementations, the second rig 142 includes a set of one or more virtual environmental sensors (e.g., a virtual image sensor, a virtual depth sensor, or a virtual audio sensor). In some implementations, the XR environment 106 includes a physical environment, and the second rig 142 includes a set of one or more physical environmental sensors (e.g., a physical image sensor, a physical depth sensor, or a physical audio sensor).

In various implementations, when the electronic device 100 presents the XR environment 106 from the second POV 140, the user 20 sees what the XR environment 106 looks like from a location corresponding to the second rig 142. For example, when the electronic device 100 displays the XR environment 106 from the second POV 140, the user 20 sees the front portion 112 of the object 110 in the center of the second POV 140. In some implementations, when the electronic device 100 presents the XR environment 106 from the second POV 140, the user 20 hears sounds that are audible at a location corresponding to the second rig 142. For example, the sounds being generated by the object 110 appear to be louder in the second POV 140 than in the first POV 120 shown in FIGS. 1A and 1B. This may be because the second POV 140 is closer to the object 110 that the first POV 120. Also, this may be because the content presentation engine 200 boosts sounds being generated by the object 110.

Figure 1D:
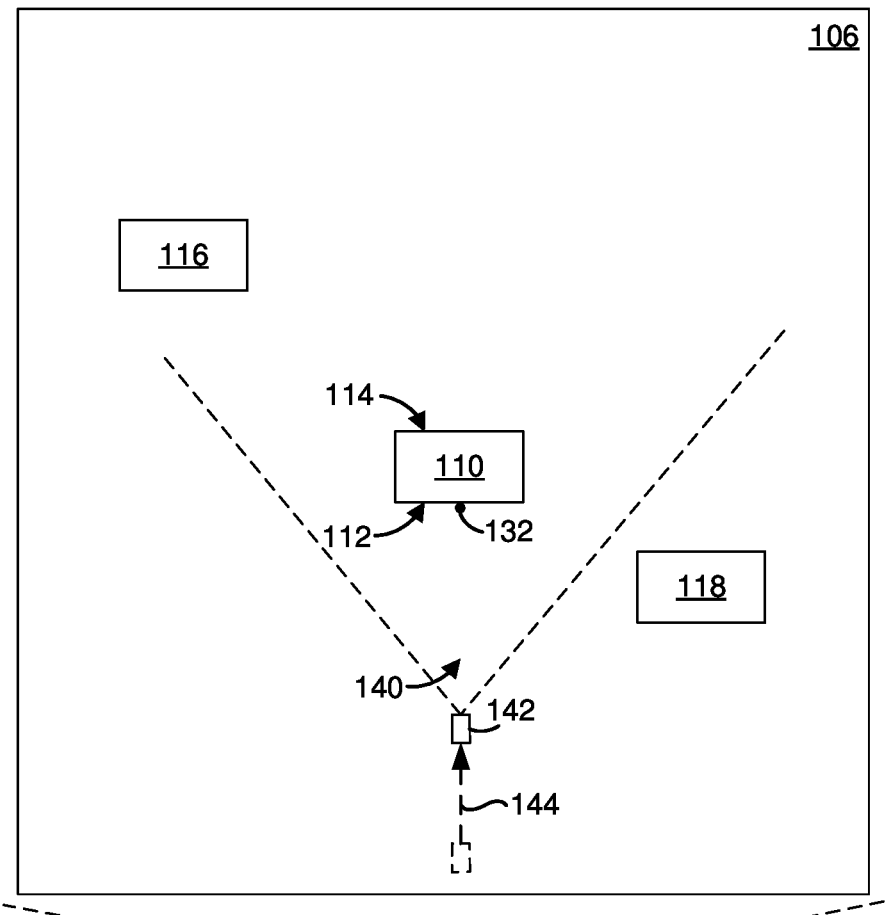

Referring to FIG. 1D, in some implementations, as indicated by an arrow 144, the second rig 142 moves towards the object 110. In some implementations, the second rig 142 moves towards the object 110 in response to the gaze input 132 being directed to the object 110. As the second rig 142 moves closer to the object 110, a representation of the object 110 being displayed on a display of the electronic device 100 occupies an increasing number of pixels. As such, as the second rig 142 moves closer to the object 110, the object 110 appears to get larger to the user 20. In some implementations, as the second rig 142 moves closer to the object 110, a sound being generated by the object 110 appears to get louder to the user 20 (e.g., because the electronic device 100 plays the sound generated by the object 110 at a greater amplitude). In some implementations, the second rig 142 is a rig that moves towards an object that the second rig 142 is focusing on. In some implementations, the second rig 142 moves towards the object 110 in a straight line. In some implementations, the second rig 142 is of a rig type that tracks an object by moving towards the object.

Figure 1E:
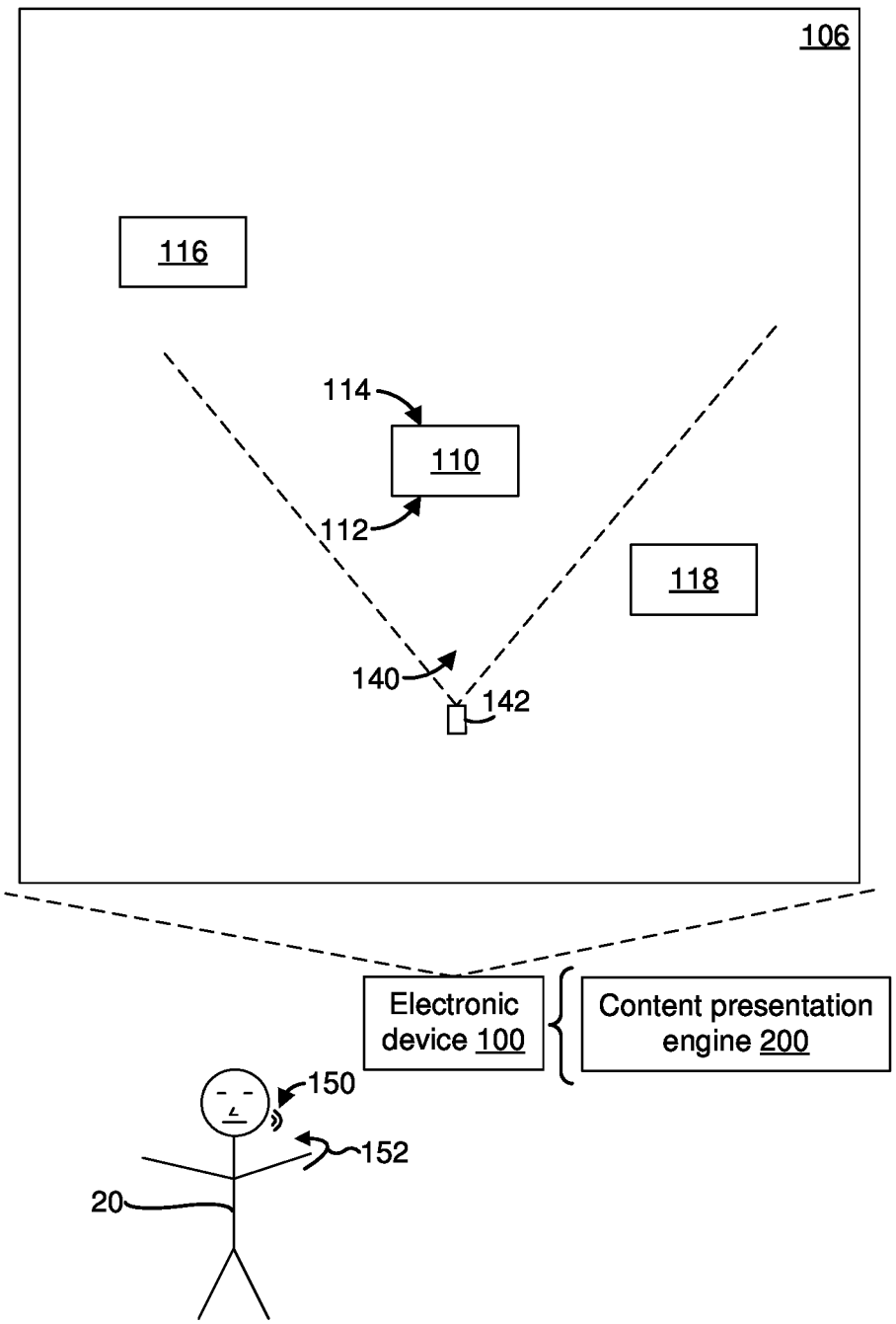

Referring to FIG. 1E, in some implementations, the electronic device 100 detects another speech input 150 and a gesture 152 that the user 20 is performing with his/her left hand. In the example of FIG. 1E, the speech input 150 corresponds to the user 20 uttering "other side", and the gesture 152 is a rotate gesture. The content presentation engine 200 determines that the user 20 wants to view the other side of the object 110. In some implementations, the electronic device 100 includes a user-facing image sensor (e.g., a user-facing camera) that captures image data, and the electronic device 100 uses the image data to detect the gesture 152. In some implementations, the electronic device 100 includes a user-facing depth sensor (e.g., a user-facing depth camera) that captures depth data, and the electronic device 100 uses the depth data to detect the gesture 152.

Figure 1F:
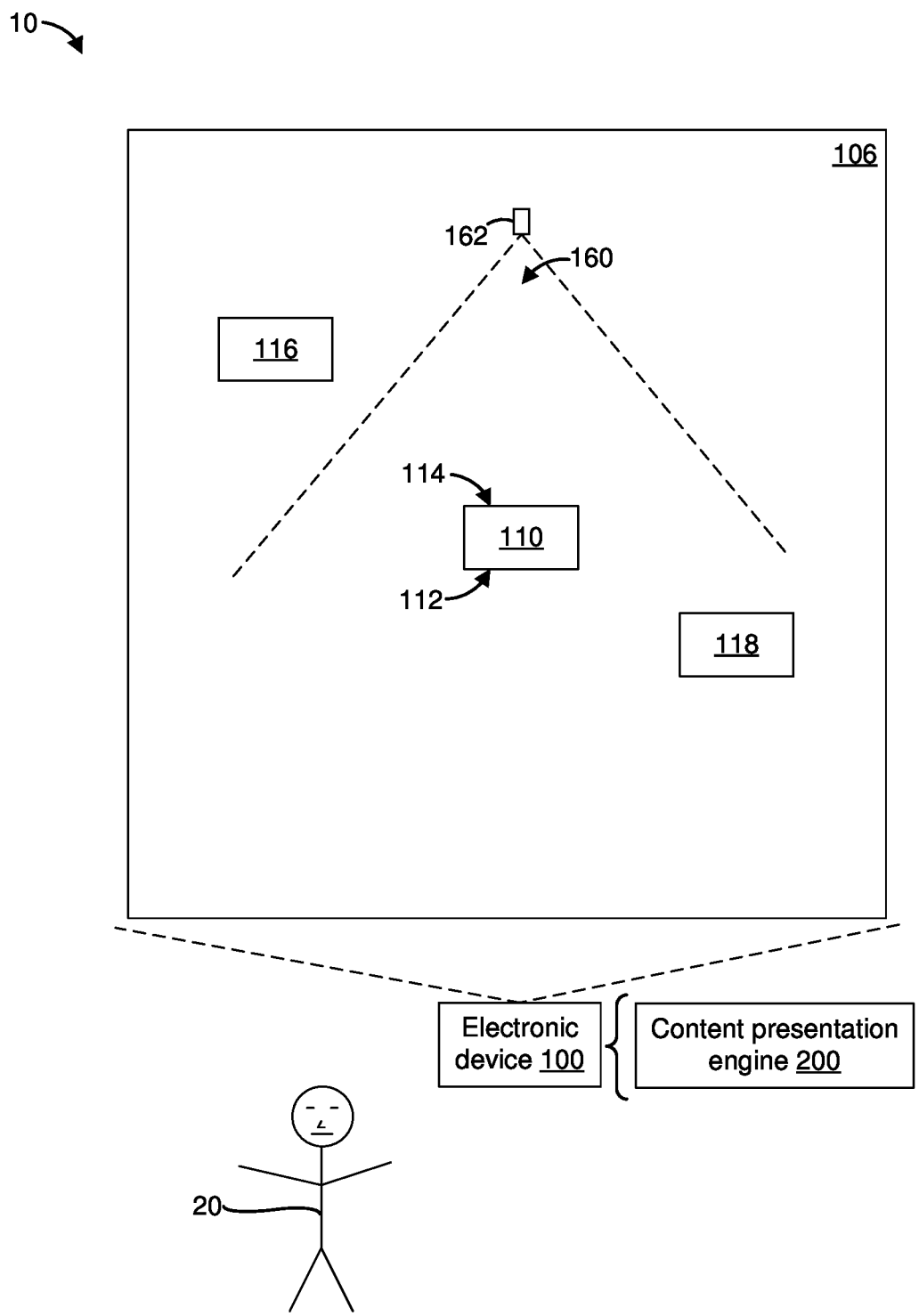

As illustrated in FIG. 1F, the electronic device 100 presents the XR environment 106 from a third POV 160. In the example of FIG. 1F, the electronic device 100 uses a third rig 162 to present the XR environment 106 from the third POV 160. In some implementations, the content presentation engine 200 switches from the second POV 140 shown in FIG. 1E to the third POV 160 shown in FIG. 1F in response to the speech input 150 and the gesture 152 shown in FIG. 1E.

In the example of FIG. 1F, the electronic device 100 uses the third rig 162 to capture a representation of the XR environment 106 from the third POV 160, and the electronic device 100 displays the representation of the XR environment 106 captured from the third POV 160. In some implementations, the third rig 162 includes a set of one or more virtual environmental sensors (e.g., a virtual image sensor, a virtual depth sensor, or a virtual audio sensor). In some implementations, the XR environment 106 includes a physical environment, and the third rig 162 includes a set of one or more physical environmental sensors (e.g., a physical image sensor, a physical depth sensor, or a physical audio sensor).

In various implementations, when the electronic device 100 presents the XR environment 106 from the third POV 160, the user 20 sees what the XR environment 106 looks like from a location corresponding to the third rig 162. For example, when the electronic device 100 displays the XR environment 106 from the third POV 160, the user 20 sees the rear portion 114 of the object 110 and not the front portion 112 of the object 110. In some implementations, when the electronic device 100 presents the XR environment 106 from the third POV 160, the device presents sounds to the user 20 as though the user 20 is located at a location corresponding to the third rig 162.

Figure 1G:
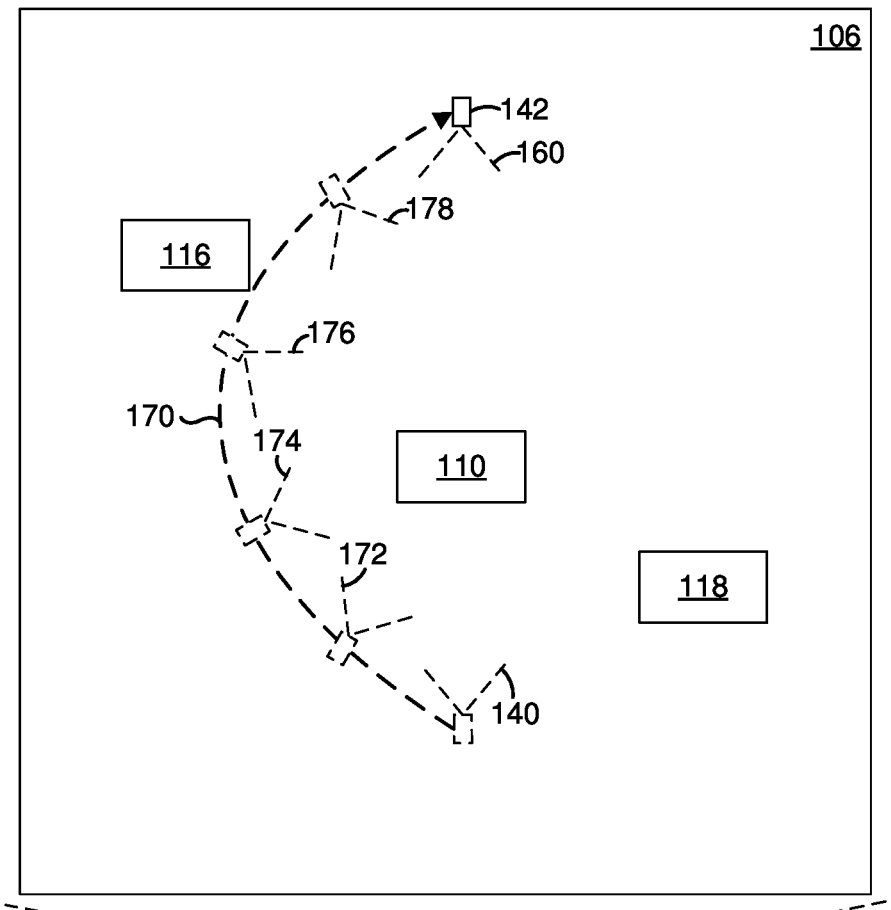

Referring to FIG. 1G, in some implementations, the electronic device 100 presents the XR environment 106 from the third POV 160 by moving the second rig 142 along a path 170. In some implementations, the electronic device 100 presents intermediary POVs 172, 174, 176 and 178 as the second rig 142 is moving along the path 170. In some implementations, the path 170 avoids obstacles that are in the XR environment 106 in order to provide an appearance that the second rig 142 is moving around other objects (e.g., virtual objects and physical objects) that are in the XR environment 106 and not going through the objects. In some implementations, the electronic device 100 selects the path 170 such that respective locations corresponding to the intermediary POVs 172, 174, 176 and 178 do not overlap with locations corresponding to other objects. In some implementations, selecting the path 170 provides an appearance that the second rig 142 is avoiding obstacles and not going through the obstacles thereby providing a more realistic user experience. For example, the electronic device 100 selects the path 170 such that the second rig 142 does not traverse through the object 110 thereby avoiding an appearance that the second rig 142 is going through the object 110.

In various implementations, the electronic device 100 determines a non-linear path (e.g., a curved path, for example, the path 170) for a rig in response to determining that a linear path (e.g., the path indicated by the arrow 144 shown in FIG. 1D) intersects with a location of an object. For example, the electronic device 100 selects the path 170 for the second rig 142 in response to determining that following a linear path indicated by the arrow 144 shown in FIG. 1D results in the second rig 142 going through the object 110. POVs that correspond to going through objects may detract from a user experience of the electronic device 100, whereas POVs that correspond to maneuvering around objects may enhance a user experience of the electronic device 100.

Figure 1H:
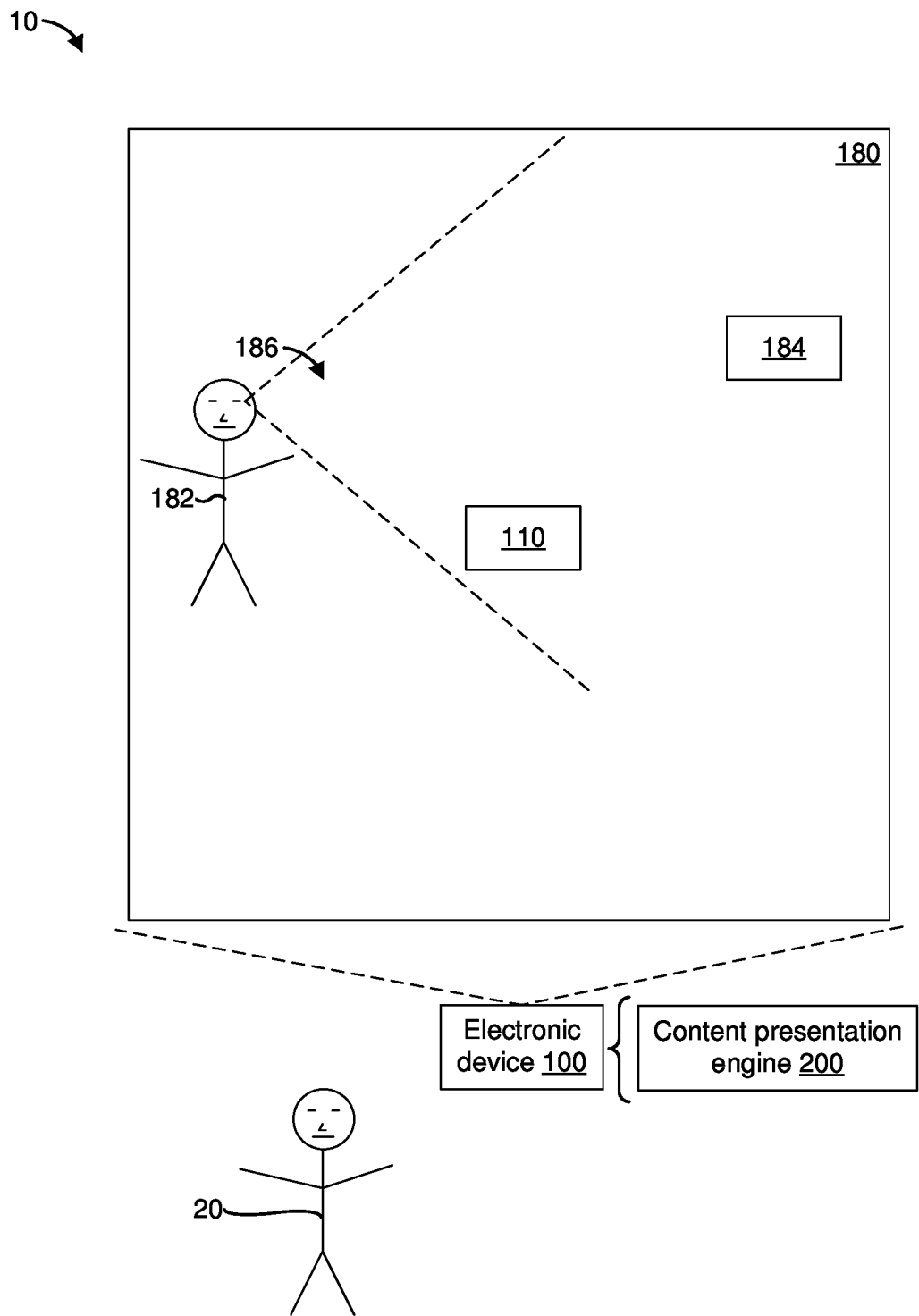
Figure 1I:
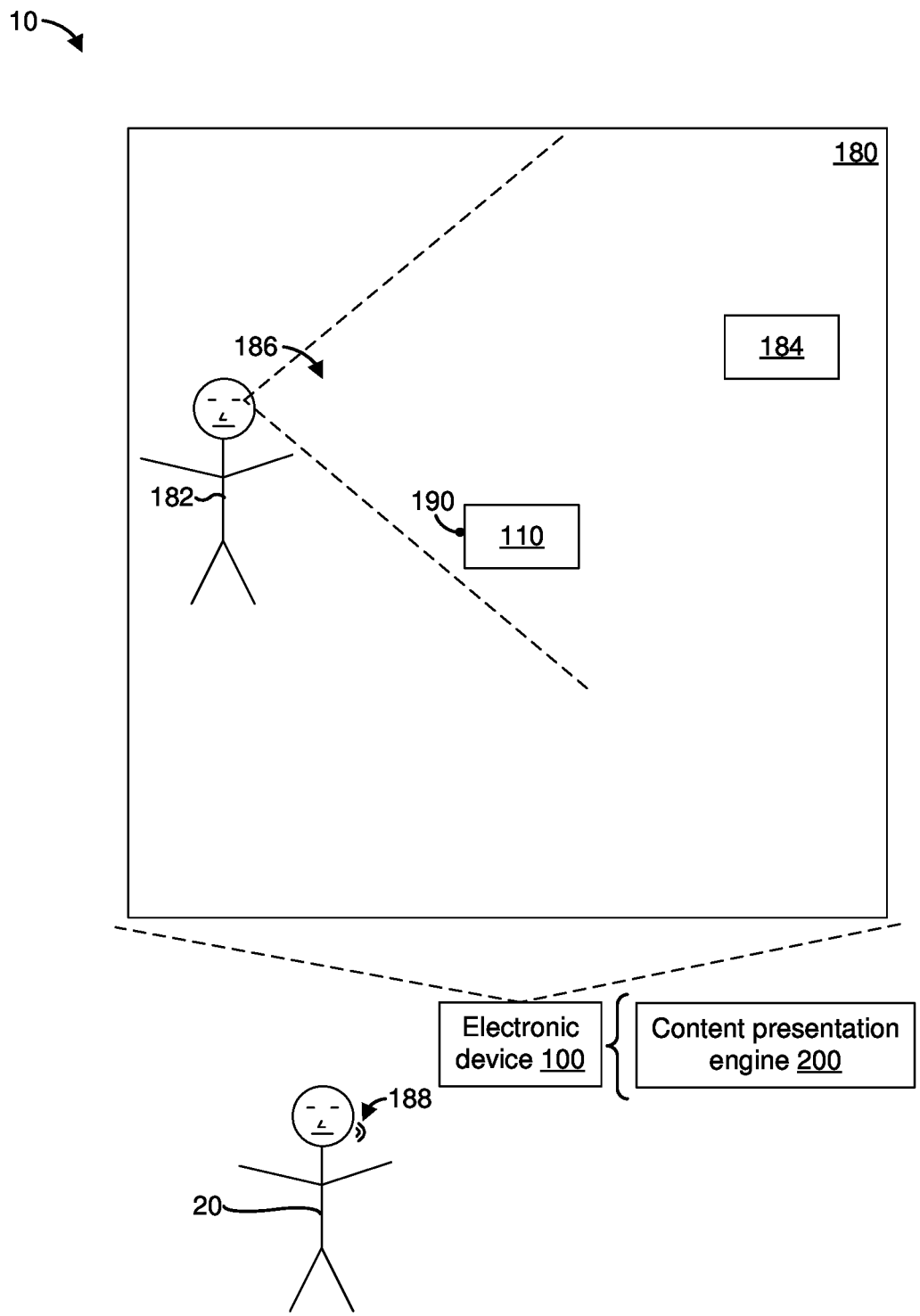
Figure 1J:
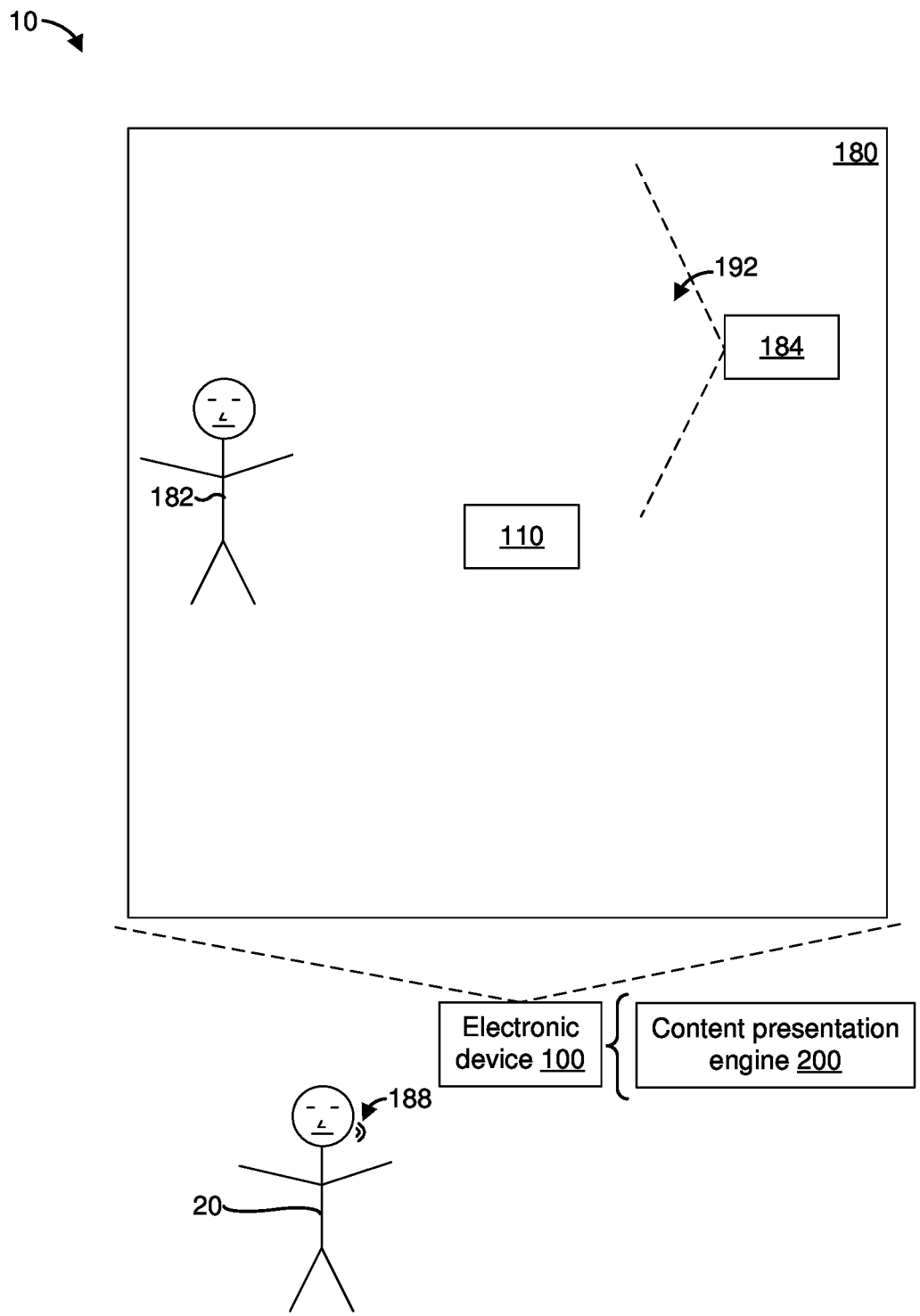

FIGS. 1H-1J illustrate a sequence in which the electronic device 100 displays portions of an XR environment 180 from POVs of different objects (e.g., virtual objects or physical objects). In the example of FIG. 1H, the XR environment 180 includes the object 110, a virtual character 182 and a virtual dog 184. In some implementations, the virtual character 182 is an XR representation (e.g., an avatar) of the user 20. In some implementations, the virtual character 182 represents a fictional character. In the example of FIG. 1H, the content presentation engine 200 is presenting the XR environment 180 from a POV of the virtual character 182 ("character POV 186", hereinafter for the sake of brevity).

In some implementations, the content presentation engine 200 generates the character POV 186 based on ray cast data associated with the virtual character 182. In some implementations, the ray cast data associated with the virtual character 182 indicates objects that are in a field-of-view of the virtual character 182. In some implementations, the character POV 186 is associated with a height that corresponds to a height of the virtual character 182. For example, the character POV 186 is displayed from a height that matches a distance between virtual eyes of the virtual character 182 and a floor of the XR environment 180.

Referring to FIG. 1I, the electronic device 100 detects a speech input 188 (e.g., an utterance from the user 20 corresponding to "dog view") and a gaze input 190. The gaze input 190 indicates that a gaze of the user 20 is directed to the object 110. Since the gaze of the user 20 is directed to the object 110 instead of the virtual dog 184, the content presentation engine 200 determines that the user 20 wants to look at the object 110 from a POV of the virtual dog 184 (e.g., instead of looking at the virtual dog 184 from the character POV 186).

Referring to FIG. 1J, the content presentation engine 200 presents the XR environment 180 from a POV of the virtual dog 184 ("dog POV 192", hereinafter for the sake of brevity). As illustrated in FIG. 1J, the dog POV 192 is wider than the character POV 186 shown in FIG. 1H, for example, because dogs have a wider field-of-vision than humans. Furthermore, as illustrated in FIG. 1J, the dog POV 192 is shorter than the character POV 186 shown in FIG. 1H, for example, because dogs cannot see as far as humans can see. As such, while the object 110 may be equidistant from the virtual character 182 and the virtual dog 184, the user 20 may not see the object 110 when looking at the XR environment 180 through the dog POV 192.

In some implementations, the content presentation engine 200 generates the dog POV 192 based on ray cast data associated with the virtual dog 184. In some implementations, the ray cast data associated with the virtual dog 184 indicates objects that are in a field-of-view of the virtual dog 184. In some implementations, the dog POV 192 is associated with a height that corresponds to a height of the virtual dog 184. For example, the dog POV 192 is displayed from a height that matches a distance between virtual eyes of the virtual dog 184 and a floor of the XR environment 180. In some implementations, the virtual dog 184 is shorter than the virtual character 182, and the height from which the dog POV 192 is displayed is lower than the height from which the character POV 186 (shown in FIG. 1H) is displayed.

Figure 1K:
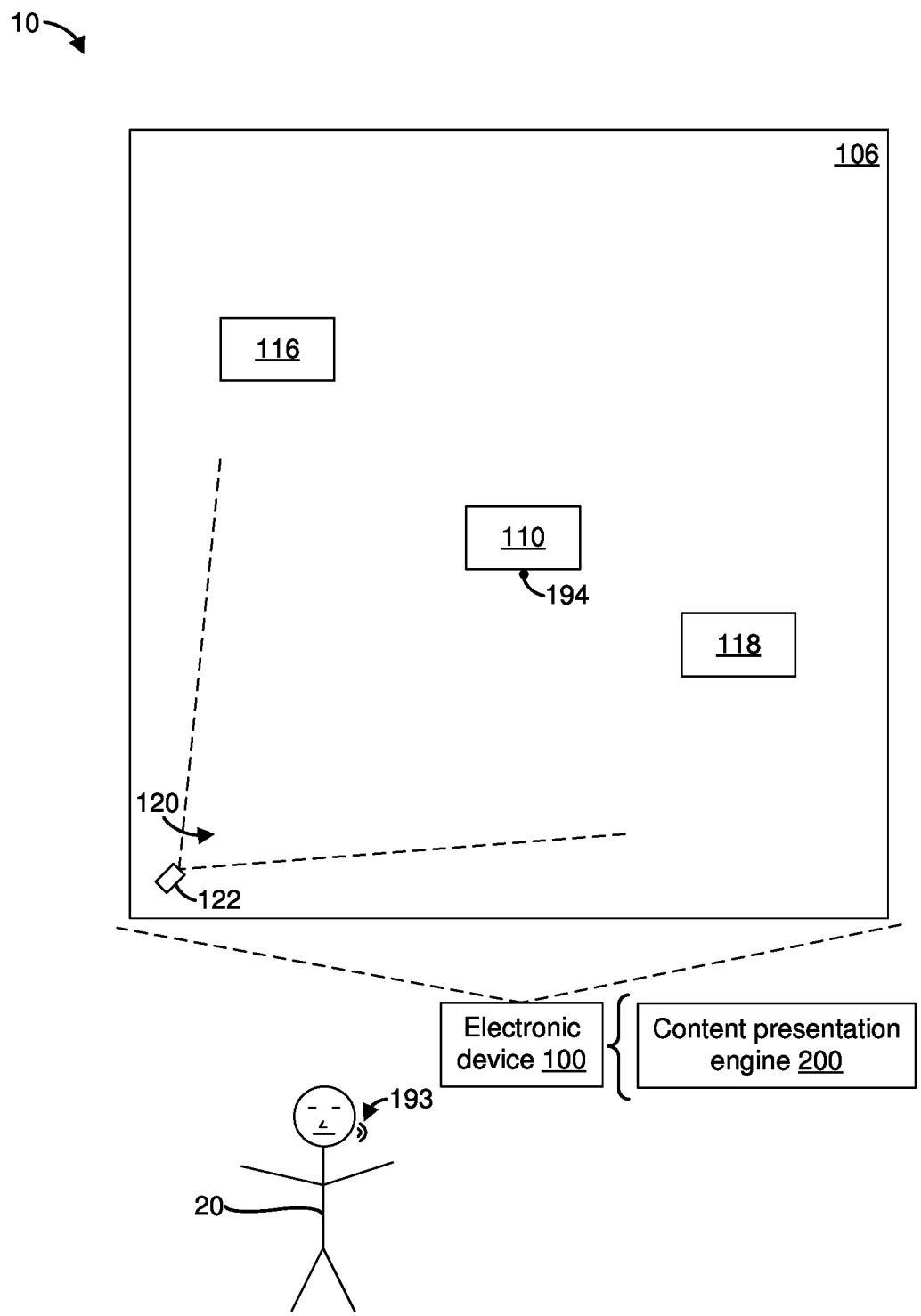
Figure 1L:
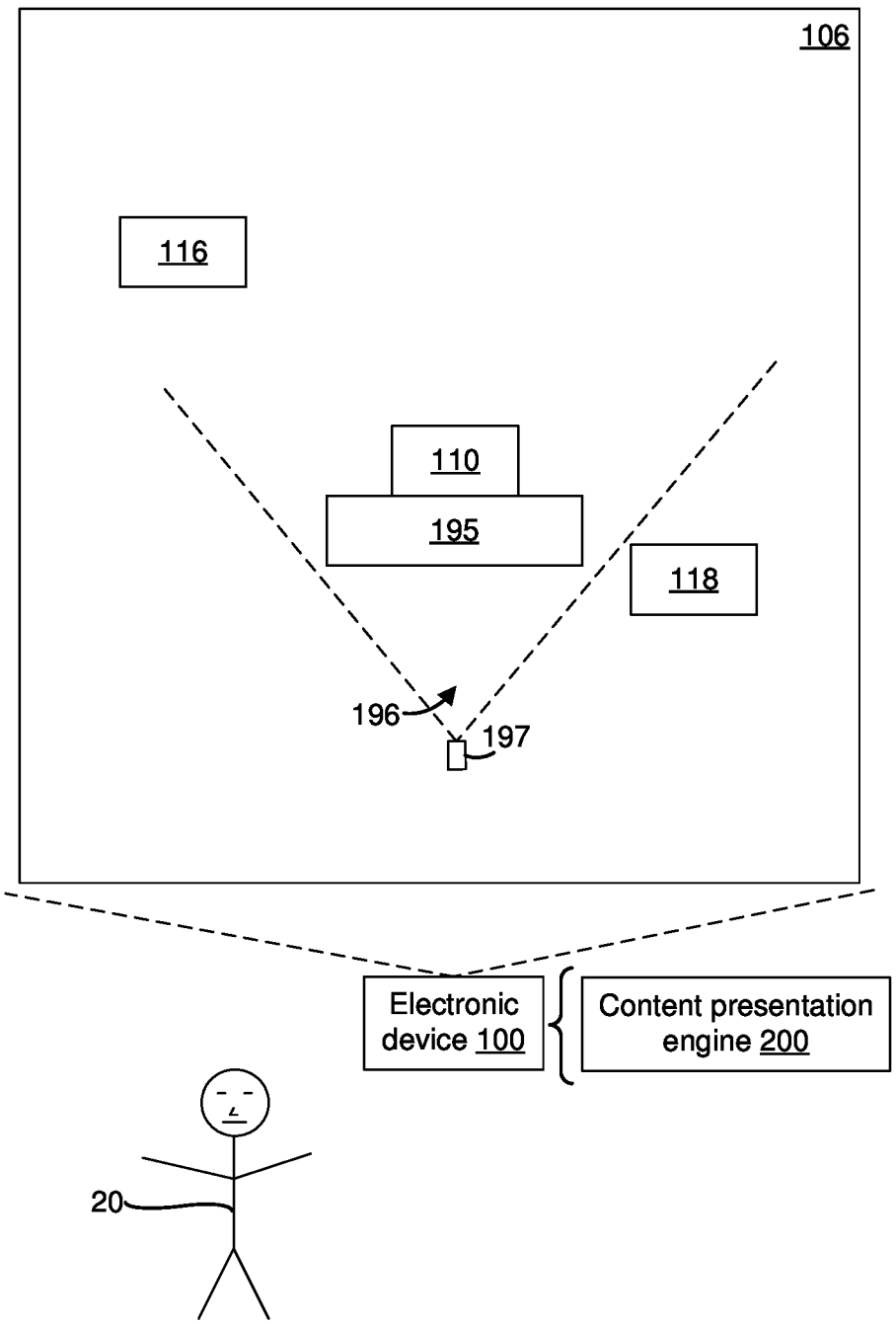

FIGS. 1K and 1L illustrate a sequence in which an object is displayed in tabletop view. In some implementations, tabletop view refers to a POV in which an object is displayed as being placed on top of a table. In some implementations, a height of the POV corresponds to a height of a table in the tabletop view. In the example of FIG. 1K, the electronic device 100 detects a speech input 193 corresponding to a request to view an object in tabletop view (e.g., the user 20 utters "tabletop view"). Since there are multiple objects in the XR environment 106 and the speech input 193 does not specify which of the objects to display in the tabletop view, the content presentation engine 200 uses another input to disambiguate the speech input 193. In the example of FIG. 1K, the electronic device 100 obtains a gaze input 194 indicating that the user 20 is looking at the object 110. As such, the content presentation engine 200 determines to display the object 110 in the tabletop view (e.g., instead of displaying the object 116 or the object 118 in the tabletop view).

Referring to FIG. 1L, the content presentation engine 200 displays a virtual table 195 in the XR environment 106. As shown in FIG. 1L, the content presentation engine 200 presents the XR environment 106 from a tabletop POV 196 in which the object 110 is shown as resting on top of the virtual table 195. In some implementations, the tabletop POV 196 is shown via a tabletop rig 197. In some implementations, the tabletop rig 197 is focused such that a top of the virtual table and the object 110 are within the tabletop POV 196. In some implementations, a height associated with the tabletop POV 196 corresponds to a height of the virtual table 195. For example, a height of the tabletop rig 197 is set such that the top of the virtual table and the object 110 are within the tabletop POV 196.

In some implementations, the user 20 may request to change the POV while the user 20 is editing or manipulating three-dimensional (3D) content. For example, the user 20 may want to see how edits look from different POVs. As an example, if the user 20 is manipulating a graphical object with their hands, the user 20 may want to view the graphical object from a POV that provides a close-up view of the graphical object. As another example, if the user 20 is viewing a graphical object and not editing or manipulating the graphical object, the user 20 may want to view the graphical object from a distance. In some implementations, the electronic device 100 and/or the content presentation engine 200 automatically switch POVs in response to the user 20 providing a request to switch between an edit mode and a viewing mode.

In some implementations, the electronic device 100 and/or the content presentation engine 200 maintain a history of the POVs that the electronic device 100 displayed thereby allowing the user 20 to view the XR environment 106 from a previous POV by uttering "previous POV" or "last POV". In some implementations, the electronic device 100 reverts to the last POV in response to a user request, for example, in response to the user 20 uttering "undo" or "go back".

Figure 2A:
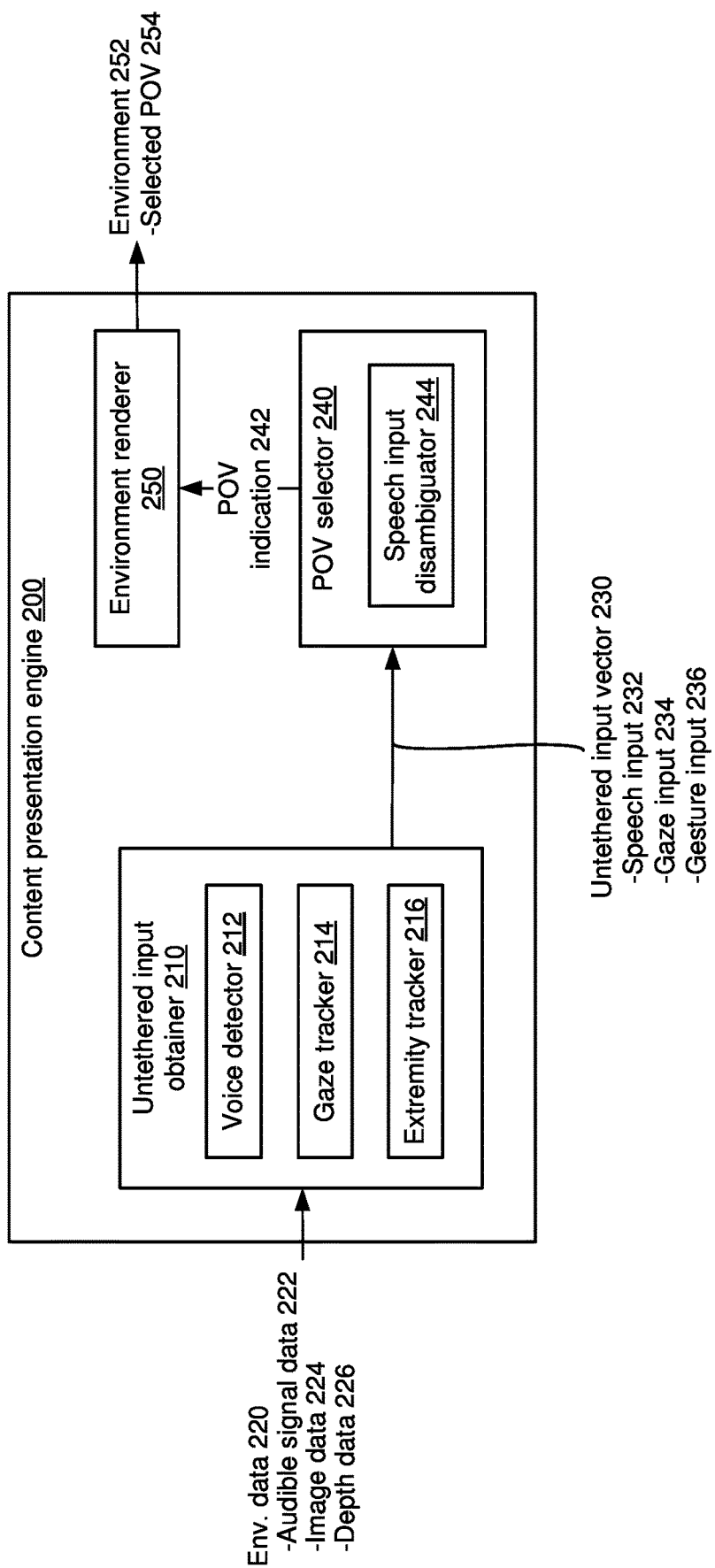
FIG. 2A is a block diagram of a content presentation engine in accordance with some implementations.

FIG. 2A illustrates a block diagram of the content presentation engine 200 in accordance with some implementations. In some implementations, the content presentation engine 200 includes an untethered input obtainer 210, a POV selector 240 and an environment renderer 250. In some implementations, the content presentation engine 200 is integrated into the content presentation engine 600 shown in FIG. 6 and/or the content presentation engine 1000 shown in FIG. 10. In some implementations, in addition to or as an alternative to performing the operations described in relation to the content presentation engine 200, the content presentation engine 200 performs the operations described in relation to the content presentation engine 600 shown in FIG. 6 and/or the operations described in relation to the content presentation engine 1000 shown in FIG. 10.

In various implementations, the untethered input obtainer 210 obtains environmental data 220 characterizing a physical environment of the content presentation engine 200. In some implementations, the environmental data 220 includes audible signal data 222 that represents an audible signal received at the electronic device 100 shown in FIGS. 1A-1L. In some implementations, the audible signal data 222 represents utterances spoken by the user 20 shown in FIGS. 1A-1L. For example, in some implementations, the audible signal data 222 represents the speech input 130 shown in FIG. 1B, the speech input 150 shown in FIG. 1E, the speech input 188 shown in FIG. 1I, or the speech input 193 shown in FIG. 1K. More generally, the audible signal data 222 indicates a speech input provided by a user. In some implementations, the electronic device 100 receives an audible signal and converts the audible signal into the audible signal data 222. In some implementations, the audible signal data 222 is referred to as electronic signal data.

In some implementations, the environmental data 220 includes image data 224. In some implementations, the image data 224 includes a set of one or more images that are captured by an image sensor (e.g., a camera). For example, in some implementations, the image data 224 includes a set of one or more images that are captured by a user-facing camera of the electronic device 100 shown in FIGS. 1A-1L. In various implementations, the image data 224 indicates respective positions of body portions of a user. For example, in some implementations, the image data 224 indicates whether the user 20 is making a gesture with his/her hands.

In some implementations, the environmental data 220 includes depth data 226. In some implementations, the depth data 226 is captured by a depth sensor (e.g., a depth camera). For example, in some implementations, the depth data 226 includes depth measurements captured by a user-facing depth camera of the electronic device 100 shown in FIGS. 1A-1L. In various implementations, the depth data 226 indicates respective positions of body portions of a user. For example, in some implementations, the depth data 226 indicates whether the user 20 is making a gesture with his/her hands.

In various implementations, the untethered input obtainer 210 includes a voice detector 212 for recognizing a speech input 232 in the audible signal data 222. In some implementations, the voice detector 212 determines that the speech input 232 corresponds to a request to switch a POV of an XR environment 252 being presented. For example, referring to FIG. 1B, the voice detector 212 determines that the speech input 130 corresponds to a request to switch displaying the XR environment 106 from the first POV 120 to another POV.

In various implementations, the untethered input obtainer 210 includes a gaze tracker 214 that determines a gaze input 234 based on the environmental data 220. In some implementations, the gaze tracker 214 determines the gaze input 234 based on the image data 224. For example, in some implementations, the gaze tracker 214 tracks a three-dimensional (3D) line of sight of the user 20 based on the image data 224. In some implementations, the gaze input 234 indicates a gaze location with respect to the XR environment 252 being presented. For example, referring to FIG. 1B, the gaze tracker 214 determines that the gaze of the user 20 is directed to the front portion 112 of the object 110. In some implementations, the gaze tracker 214 utilizes various methods, devices and systems associated with eye tracking and/or gaze tracking to determine the gaze input 234.

In various implementations, the untethered input obtainer 210 includes an extremity tracker 216 that determines a gesture input 236 based on the environmental data 220. In some implementations, the extremity tracker 216 detects the gesture input 236 based on the image data 224. In some implementations, the extremity tracker 216 detects the gesture input 236 based on the depth data 226. In some implementations, the extremity tracker 216 tracks a position of an extremity (e.g., a hand, a finger, a foot, a toe, etc.) of the user 20 based on the image data 224 and/or the depth data 226. For example, in some implementations, the extremity tracker 216 tracks a movement of a hand of the user 20 to determine whether the movement corresponds to a gesture (e.g., a rotate gesture, for example, the gesture 152 shown in FIG. 1E).

In various implementations, the untethered input obtainer 210 generates an untethered input vector 230 based on the environmental data 220. In some implementations, the untethered input vector 230 includes the speech input 232, the gaze input 234 and/or the gesture input 236. In some implementations, the untethered input obtainer 210 provides the untethered input vector 230 to the POV selector 240.

In various implementations, the POV selector 240 selects a POV for displaying the XR environment 252 based on the untethered input vector 230. In some implementations, the POV selector 240 provides an indication 242 of a selected POV 254 to the environment renderer 250, and the environment renderer 250 presents the XR environment 252 from the selected POV 254. For example, referring to FIG. 1C, the POV selector 240 provides an indication of the second POV 140 to the environment renderer 250, and the environment renderer 250 presents the XR environment 106 from the second POV 140.

In some implementations, the POV selector 240 includes a speech input disambiguator 244 for disambiguating the speech input 232. In some implementations, the POV selector 240 determines that the speech input 232 is ambiguous. In such implementations, the speech input disambiguator 244 disambiguates the speech input 232 based on the gaze input 234 and/or the gesture input 236. For example, referring to FIGS. 1B and 1C, the speech input disambiguator 244 disambiguates the speech input 130 (e.g., "focus") based on the gaze input 132 directed to the object 110. As another example, referring to FIGS. 1E and 1F, the speech input disambiguator 244 disambiguates the speech input 150 (e.g., "other side") based on the gesture 152 (e.g., the rotate gesture). In various implementations, the speech input disambiguator 244 disambiguates the speech input 232 based on an untethered input (e.g., the gaze input 234 or the gesture input 236).

In various implementations, the environment renderer 250 receives the indication 242 of the selected POV 254 from the POV selector 240. The environment renderer 250 presents the XR environment 252 from the selected POV 254 in response to receiving the indication 242 from the POV selector 240. For example, referring to FIG. 1C, the environment renderer 250 presents the XR environment 106 from the second POV 140.

Figure 2B:
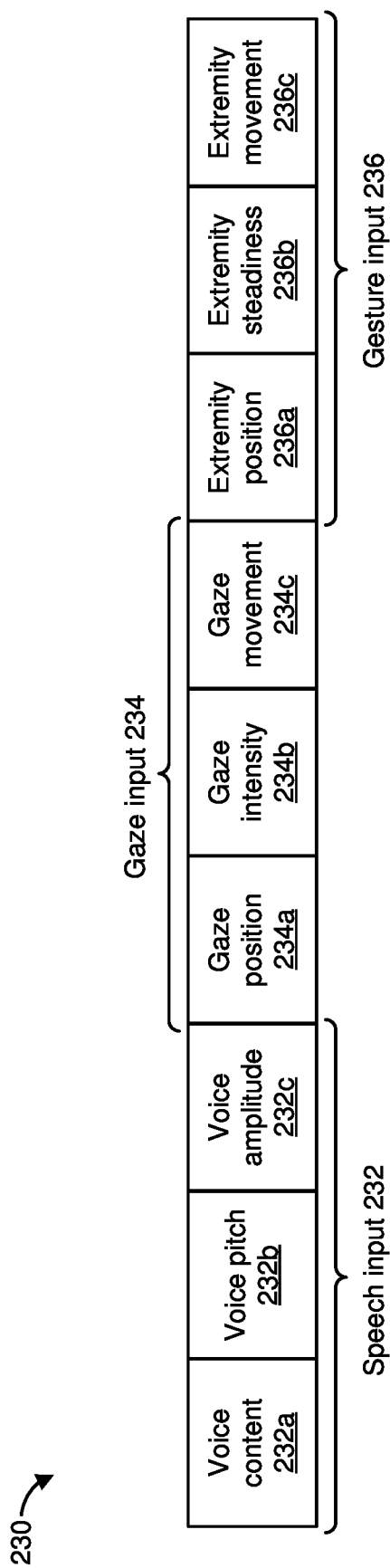
FIG. 2B is a block diagram of an example untethered input vector in accordance with some implementations.

FIG. 2B illustrates an example block diagram of the untethered input vector 230. As described in relation to FIG. 2A, in some implementations, the untethered input vector 230 includes the speech input 232, the gaze input 234 and the gesture input 236. In some implementations, the speech input 232 includes a voice content 232a (e.g., "focus", "other side", etc.), a voice pitch 232b (e.g., a range of frequencies associated with the speech input 232), and/or a voice amplitude 232c (e.g., a decibel value associated with the speech input 232). In some implementations, the gaze input 234 includes a gaze position 234a (e.g., pixel coordinates within the XR environment), a gaze intensity 234b (e.g., a dimension of the gaze, for example, a number of pixels that the gaze is directed to), and/or a gaze movement 234c (e.g., a direction in which the gaze is moving). In some implementations, the gesture input 236 includes an extremity position 236a (e.g., respective positions of fingers of a hand), an extremity steadiness 236b (e.g., whether the fingers are stationary or moving), and/or an extremity movement 236c (e.g., a direction in which the fingers or the hand is moving).

Figure 3:
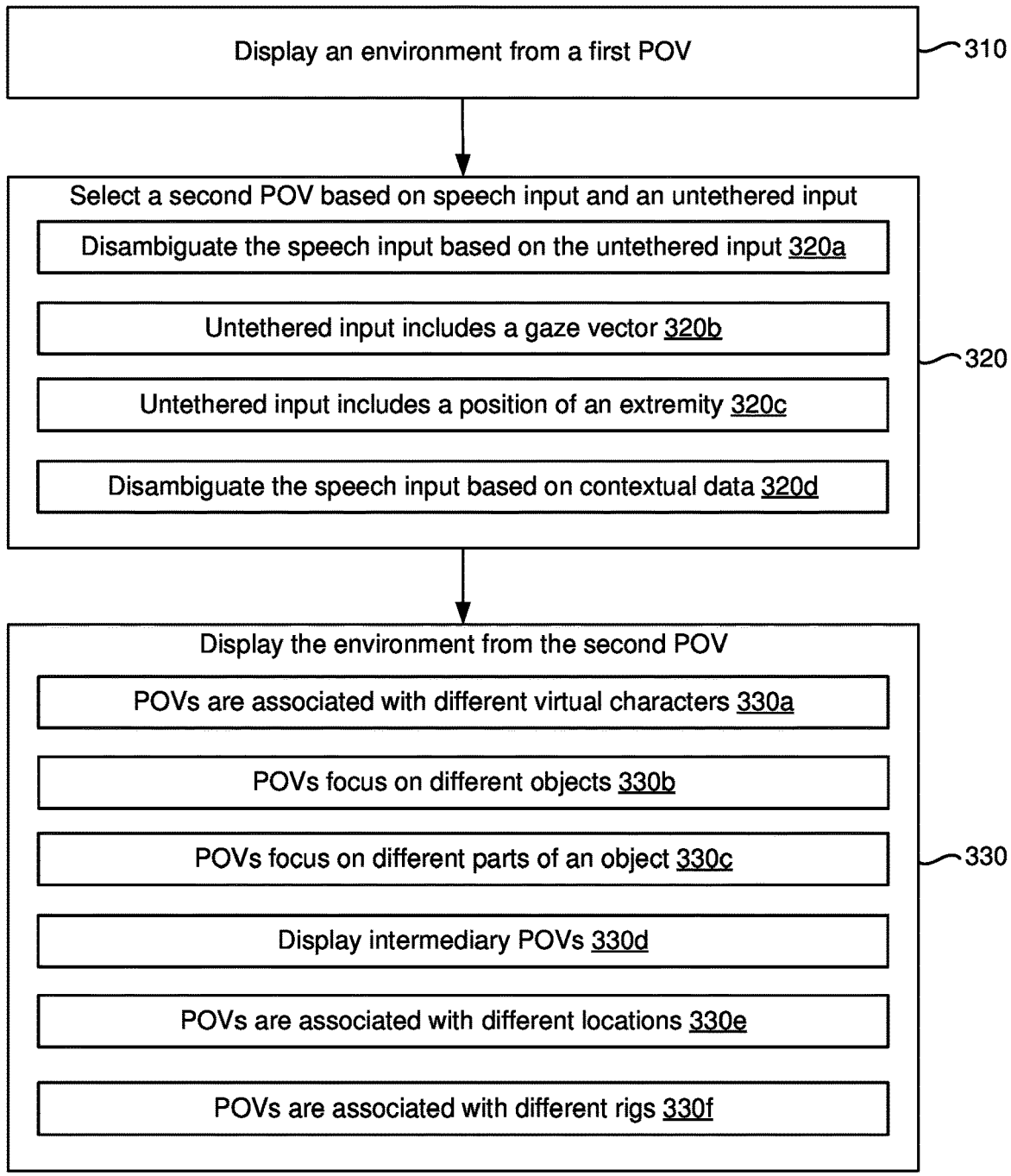
FIG. 3 is a flowchart representation of a method of presenting a graphical environment in accordance with some implementations.

FIG. 3 is a flowchart representation of a method 300 for presenting a graphical environment. In various implementations, the method 300 is performed by a device (e.g., the electronic device 100 shown in FIGS. 1A-1L, or the content presentation engine 200 shown in FIGS. 1A-2A). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes displaying, on the display, a graphical environment from a first point-of-view (POV). For example, as shown in FIG. 1A, the content presentation engine 200 displays the XR environment 106 from the first POV 120. In some implementations, the method 300 includes utilizing (e.g., using) a first rig to capture a representation of the graphical environment from the first POV. For example, as shown in FIG. 1A, the content presentation engine 200 uses the first rig 122 to capture a representation of the XR environment 106 from the first POV 120.

In some implementations, the method 300 includes obtaining ray cast information from a location corresponding to the first POV and utilizing the ray cast information to generate a representation of the graphical environment from the first POV. For example, in some implementations, the first rig includes a first virtual camera or a first virtual character (e.g., the virtual character 182 shown in FIG. 1H), and the method 300 includes obtaining ray cast information that indicates locations of objects that are in a field-of-view of the first virtual camera or the first virtual character. In such implementations, displaying the graphical environment from the first POV includes displaying representations of objects that are in the field-of-view of the first virtual camera or the first virtual character.

As represented by block 320, in various implementations, the method 300 includes selecting a second POV based on a speech input received via the audio sensor and an untethered input obtained via the input device. For example, as shown in FIGS. 1B and 1C, the content presentation engine 200 selects the second POV 140 based on the speech input 130 (e.g., the user 20 uttering "focus") and the gaze input 132 (e.g., the user 20 looking at the front portion 112 of the object 110).

In some implementations, selecting the second POV based on the speech input and the untethered input reduces a need for a user of the device to provide a tethered input that corresponds to specifying the second POV. In various implementations, detecting a tethered input includes detecting a physical interaction of the user with the device or a component of the device such as a mouse, a keyboard or a touchscreen (e.g., detecting that the user has touched the touchscreen, moved the mouse, etc.). By contrast, in some implementations, detecting an untethered input includes detecting a change in a state of the user without detecting a physical interaction of the user with the device (e.g., detecting that the user is making a gesture with his/her hand, uttering a voice command, gazing in a particular direction, etc.). As such, selecting the second POV based on the speech input and the untethered input reduces the need for the user to physically manipulate a mouse, a trackpad or a touchscreen device, press physical keys on a keyboard, or physical buttons on an accessory device. In some implementations, reducing the need for a tethered input tends to improve a user experience of the device. In some implementations, the device does not accept tethered inputs (e.g., because the device does not have physical buttons), and selecting the second POV based on the speech input and the untethered input enhances functionality of the device.

As represented by block 320a, in some implementations, selecting the second POV includes disambiguating the speech input based on the untethered input. For example, as shown in FIG. 2A, the POV selector 240 (e.g., the speech input disambiguator 244) disambiguates the speech input 232 based on the gaze input 234 and/or the gesture input 236. In some implementations, the method 300 includes determining that the speech input is unclear and using the untethered input to clarify the speech input. For example, in some implementations, the method 300 includes determining that the speech input is unintelligible or ambiguous, and using the untethered input to make the speech input intelligible or unambiguous.

In some implementations, the method 300 includes determining that the speech input specifies the user's intent to switch to a different POV without specifying which POV to switch to. For example, as discussed in relation to FIG. 1B, the speech input 130 may correspond to the user 20 uttering "focus" without specifying which of the objects 110, 116 and 118 to focus on. In such implementations, the method 300 includes determining the POV that the user likely intends to switch to based on the untethered input. For example, as discussed in relation to FIGS. 1B and 1C, the content presentation engine 200 determines to focus on the object 110 in response to the gaze input 132 indicating that the user 20 is gazing at the object 110.

In some implementations, selecting the second POV based on the speech input and the untethered input tends to result in a more accurate POV selection than selecting the second POV based entirely on the speech input thereby improving operability of the device. For example, in some implementations, the speech input is unclear (e.g., unintelligible or ambiguous), and selecting the second POV based entirely on the speech input may result in selecting a POV that the user did not intend to select. In such implementations, using the untethered input to disambiguate the speech input tends to result in a POV selection that more closely aligns with the POV that the user intended to select thereby providing an appearance that the device is more accurately responding to the user's intentions.

As represented by block 320b, in some implementations, the untethered input includes a gaze input. For example, as shown in FIG. 1B, the electronic device 100 detects the gaze input 132. In some implementations, the method 300 includes obtaining a set of one or more images from a user-facing camera and detecting the gaze input based on the set of one or more images. In some implementations, the gaze input indicates a gaze position in relation to an XR environment that the device is displaying (e.g., the gaze input 132 indicates that the user 20 is gazing at the object 110 shown in FIG. 1B). In some implementations, the gaze input indicates a gaze intensity (e.g., a size of an area that the user is gazing at, for example, the gaze intensity 234b shown in FIG. 2B). In some implementations, the gaze input indicates a gaze movement (e.g., the gaze movement 234c shown in FIG. 2B) that corresponds to a gesture that the user is making by moving his/her gaze. In various implementations, the method 300 includes performing gaze tracking to detect the gaze input.

As represented by block 320c, in some implementations, the untethered input includes a position of an extremity. For example, as shown in FIG. 1E, the electronic device 100 detects the gesture 152 that the user 20 is making with his/her hand. In some implementations, the method 300 includes performing extremity tracking to determine the position of the extremity. In some implementations, the method 300 includes determining how steady the extremity is (e.g., determining the extremity steadiness 236b shown in FIG. 2B). In some implementations, the method 300 includes determining that a body portion (e.g., a hand) satisfies a predetermined body pose for a threshold amount of time. In such implementations, the method 300 includes using the extremity steadiness to determine whether the extremity maintains the predetermined body pose for the threshold amount of time. In some implementations, the method 300 includes determining an extremity movement, for example, in order to determine whether the user is making a gesture.

As represented by block 320d, in some implementations, selecting the second POV includes disambiguating the speech input based on contextual data indicating a context of the device or a user of the device. In some implementations, the contextual data indicates an application that the user is currently using, and the method 300 includes selecting the second POV based on the application that the user is using. In some implementations, the contextual data indicates an activity that the user is currently performing, and the method 300 includes selecting the second POV based on the activity that the user is performing. In some implementations, the contextual data indicates a location of the device, and the method 300 includes selecting the second POV based on the location of the device. In some implementations, the contextual data indicates a current time, and the method 300 includes selecting the second POV based on the current time.

In various implementations, the method 300 includes displaying the graphical environment from the second POV. For example, as shown in FIG. 1C, the content presentation engine 200 displays the XR environment 106 from the second POV 140. As represented by block 330a, in some implementations, the first POV is associated with a first type of virtual object and the second POV is associated with a second type of virtual object. For example, as shown in FIGS. 1H-1J, the content presentation engine 200 switches from the displaying the XR environment 180 from the character POV 186 to the dog POV 192. As another example, in some implementations, the method 300 includes switching from a POV corresponding to a humanoid view to a bird's eye view.

As represented by block 330b, in some implementations, the first POV provides a view of a first object and the second POV provides a view of a second object that is different from the first object. For example, as shown in FIG. 1B, the first POV 120 provides a view of the objects 110, 116 and 118. However, as shown in FIG. 1D, the second POV 140 provides a view of the objects 110 and 116 without providing a view of the object 118. As such, in various implementations, the device displays POVs of a graphical environment that focus on different objects in the graphical environment thereby enhancing a user experience by allowing the user of the device to explore different objects in the graphical environment.

As represented by block 330c, in some implementations, the first POV provides a view of a first portion of an object and the second POV provides a view of a second portion of the object that is different from the first portion of the object. For example, as shown in FIG. 1E, the second POV 140 provides a view of the front portion 112 of the object 110. However, as shown in FIG. 1F, the third POV 160 provides a view of the rear portion 114 of the object 110. As such, in various implementations, the device displays POVs of a graphical environment that focus on different portions of an object in the graphical environment thereby enhancing a user experience by allowing the user of the device to explore the object from different 3D viewpoints.

As represented by block 330d, in some implementations, displaying the graphical environment from the second POV includes displaying a transition between the first POV and the second POV. In some implementations, the transition includes a set of intermediary POVs. For example, as shown in FIG. 1G, the content presentation engine 200 displays the XR environment 106 from the intermediary POVs 172, 174, 176 and 178 that are on the path 170 between a first location corresponding to the second POV 140 and a second location corresponding to the third POV 160. In some implementations, a speed of the transition is a function of a type of virtual character associated with the first and second POVs. For example, if the POVs are from a perspective of a humanoid (e.g., the virtual character 182 shown in FIG. 1H), the camera moves at an average human's walking speed.

As represented by block 330e, in some implementations, the first POV is from a first location within the graphical environment and the second POV is from a second location that is different from the first location. In some implementations, the method 300 includes identifying obstacles between the first location and the second location and displaying intermediary POVs that correspond to navigating around the obstacles. For example, as shown in FIG. 1G, the second rig 142 navigates between the objects 110 and 116 from a first location corresponding to the second POV 140 to a second location corresponding to the third POV 160.

As represented by block 330f, in some implementations, the first POV is associated with a first camera rig and the second POV is associated with a second camera rig that is different from the first camera rig. For example, as illustrated in FIG. 1B, the first POV 120 is captured by the first rig 122, and, as illustrated in FIG. 1C, the second POV 140 is captured by the second rig 142.

In some implementations, the first camera rig performs a first type of movement to display the graphical environment from the first POV and the second camera rig performs a second type of movement to display the second POV. For example, as shown in FIG. 1D, in some implementations, the second rig 142 moves forward in the direction of the arrow 144 and towards the object 110. As another example, as shown in FIG. 1G, in some implementations, the second rig 142 moves along the path 170 (e.g., a curved path, for example, a circular or circle-like path) to provide a view of the object 110 from a side of the object 110.

Figure 4:
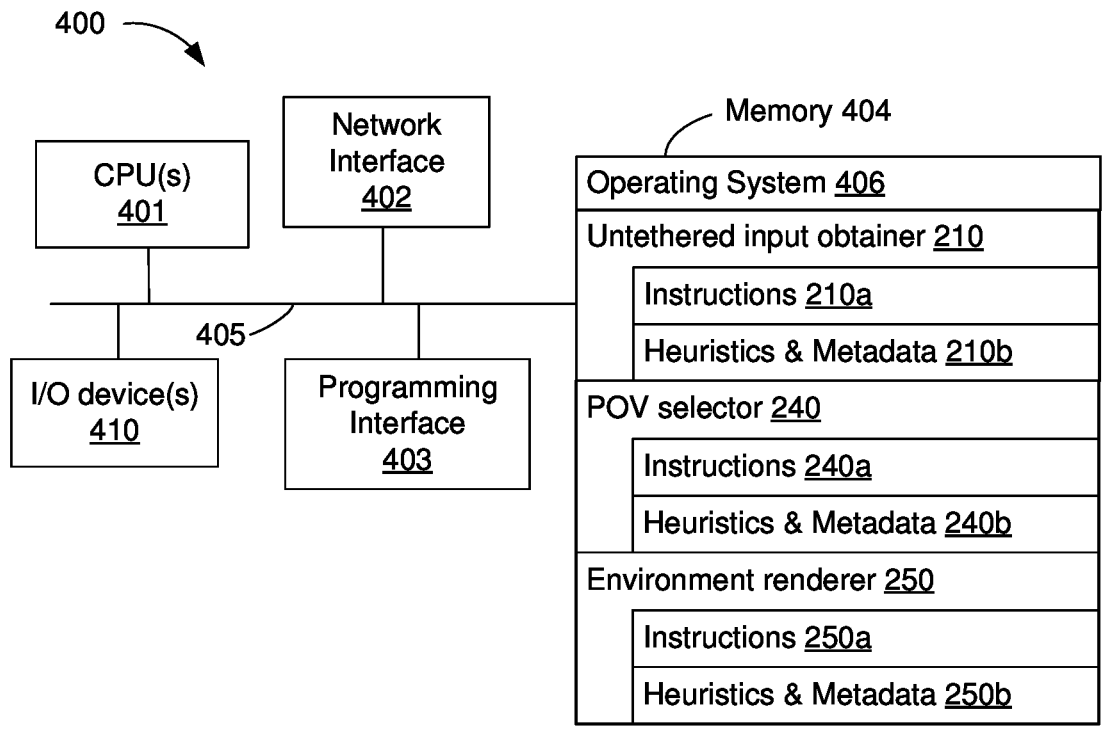
FIG. 4 is a block diagram of a device that presents a graphical environment from a selected point-of-view in accordance with some implementations.

FIG. 4 is a block diagram of a device 400 in accordance with some implementations. In some implementations, the device 400 implements the electronic device 100 shown in FIGS. 1A-1L, and/or the content presentation engine 200 shown in FIGS. 1A-2A. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the untethered input obtainer 210, the POV selector 240, and the environment renderer 250. In various implementations, the device 400 performs the method 300 shown in FIG. 3. Additionally or alternatively, in some implementations, the device 400 performs the method 700 shown in FIGS. 7A and 7B. Additionally or alternatively, in some implementations, the device 400 performs the method 1100 shown in FIG. 11.

In some implementations, the untethered input obtainer 210 obtains environmental data that indicates a set of one or more untethered inputs. For example, the untethered input obtainer 210 detects the speech input 130 and the gaze input 132 shown in FIG. 1B, the speech input 150 and the gesture 152 shown in FIG. 1E, the speech input 188 and the gaze input 190 shown in FIG. 1I, the speech input 193 and the gaze input 194 shown in FIG. 1K, and the speech input 232, the gaze input 234 and the gesture input 236 shown in FIG. 2. In some implementations, the untethered input obtainer 210 performs at least some of the operation(s) represented by block 320 in FIG. 3. To that end, the untethered input obtainer 210 includes instructions 210a, and heuristics and metadata 210b.

In some implementations, the POV selector 240 selects a POV for displaying the graphical environment based on a speech input and an untethered input. In some implementations, the POV selector 240 performs the operation(s) represented by block 320 in FIG. 3. To that end, the POV selector 240 includes instructions 240a, and heuristics and metadata 240b.

In some implementations, the environment renderer 250 renders the graphical environment from the POV selected by the POV selector 240. In some implementations, the environment renderer 250 performs the operations represented by blocks 310 and 330 in FIG. 3. To that end, the environment renderer 250 includes instructions 250a, and heuristics and metadata 250b.

In some implementations, the one or more I/O devices 410 include an environmental sensor for obtaining environmental data (e.g., the environmental data 220 shown in FIG. 2A). In some implementations, the one or more I/O devices 410 include an audio sensor (e.g., a microphone) for detecting a speech input (e.g., the speech input 130 shown in FIG. 1B). In some implementations, the one or more I/O devices 410 include an image sensor (e.g., a camera) to capture the image data 224 shown in FIG. 2A. In some implementations, the one or more I/O devices 410 include a depth sensor (e.g., a depth camera) to capture the depth data 226 shown in FIG. 2A. In some implementations, the one or more I/O devices 410 include a display for displaying the graphical environment from the selected POV (e.g., for displaying the XR environment 252 from the selected POV 254 shown in FIG. 2A). In some implementations, the one or more I/O devices 410 include a speaker for outputting an audible signal corresponding to the selected POV.

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

Some devices allow a user to provide an input to switch a point-of-view (POV) from which an environment is displayed. However, some user inputs to display the graphical environment from a particular POV may be ambiguous. For example, a voice input may be used to initiate a change to a different POV but may not specify a particular POV. As another example, the voice input may specify an object to focus on but may be ambiguous with respect to which part of the object to focus on. In some implementations, saliency values associated with the graphical environment may be used to select a POV for displaying the graphical environment. In various implementations, selecting the POV based on the set of saliency values reduces a need for a sequence of user inputs that correspond to a user manually selecting the POV. For example, automatically selecting the POV based on the set of saliency values reduces a need for a user to provide user inputs that correspond to moving a rig (e.g., a virtual camera) around a graphical environment. Reducing unnecessary user inputs tends to enhance operability of the device by decreasing power consumption associated with processing (e.g., interpreting and/or acting upon) the unnecessary user inputs.

Figure 5A:
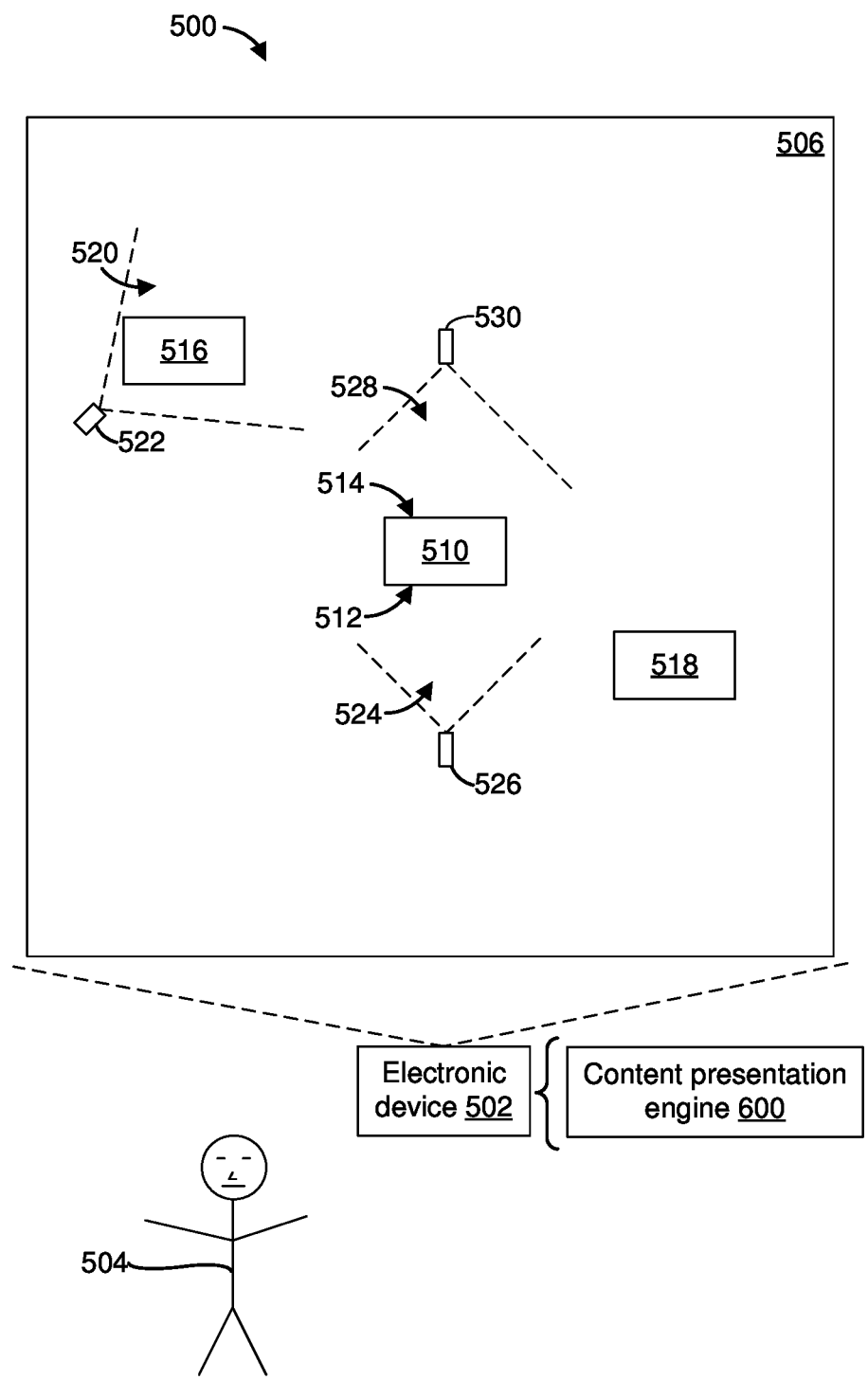
FIGS. 5A-5E are diagrams of an example operating environment in accordance with some implementations.

FIG. 5A is a block diagram of an example operating environment 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 500 includes an electronic device 502 and a content presentation engine 600. In some implementations, the electronic device 502 includes a handheld computing device that can be held by a user 504. For example, in some implementations, the electronic device 502 includes a smartphone, a tablet, a media player, a laptop, or the like. In some implementations, the electronic device 502 includes a wearable computing device that can be worn by the user 504. For example, in some implementations, the electronic device 502 includes a head-mountable device (HMD) or an electronic watch.

In the example of FIG. 5A, the content presentation engine 600 resides at the electronic device 502. For example, the electronic device 502 implements the content presentation engine 600. In some implementations, the electronic device 502 includes a set of computer-readable instructions corresponding to the content presentation engine 600. Although the content presentation engine 600 is shown as being integrated into the electronic device 502, in some implementations, the content presentation engine 600 is separate from the electronic device 502. For example, in some implementations, the content presentation engine 600 resides at another device (e.g., at a controller, a server or a cloud computing platform).

As illustrated in FIG. 5A, in some implementations, the electronic device 502 presents an extended reality (XR) environment 506. In some implementations, the XR environment 506 is referred to as a computer graphics environment. In some implementations, the XR environment 506 is referred to as a graphical environment. In some implementations, the electronic device 502 generates the XR environment 506. Alternatively, in some implementations, the electronic device 502 receives the XR environment 506 from another device that generated the XR environment 506.

In some implementations, the XR environment 506 includes a virtual environment that is a simulated replacement of a physical environment. In some implementations, the XR environment 506 is synthesized by the electronic device 502. In such implementations, the XR environment 506 is different from a physical environment in which the electronic device 502 is located. In some implementations, the XR environment 506 includes an augmented environment that is a modified version of a physical environment. For example, in some implementations, the electronic device 502 modifies (e.g., augments) the physical environment in which the electronic device 502 is located to generate the XR environment 506. In some implementations, the electronic device 502 generates the XR environment 506 by simulating a replica of the physical environment in which the electronic device 502 is located. In some implementations, the electronic device 502 generates the XR environment 506 by removing and/or adding items from the simulated replica of the physical environment in which the electronic device 502 is located.

In some implementations, the XR environment 506 includes various virtual objects such as an XR object 510 ("object 510", hereinafter for the sake of brevity) that includes a front portion 512 and a rear portion 514. In some implementations, the XR environment 506 includes multiple objects. In the example of FIG. 5A, the XR environment 506 includes objects 510, 516, and 518. In some implementations, the virtual objects are referred to as graphical objects or XR objects. In various implementations, the electronic device 502 obtains the virtual objects from an object datastore (not shown). For example, in some implementations, the electronic device 502 retrieves the object 510 from the object datastore. In some implementations, the virtual objects represent physical elements. For example, in some implementations, the virtual objects represent equipment (e.g., machinery such as planes, tanks, robots, motorcycles, etc.). In some implementations, the virtual objects represent fictional elements (e.g., entities from fictional materials, for example, an action figure or a fictional equipment such as a flying motorcycle).

In various implementations, the electronic device 502 (e.g., the content presentation engine 600) obtains a request to display the XR environment 506. The electronic device 502 may select a POV for displaying the XR environment 506 based on a set of saliency values. The XR environment 506 is associated with a set of saliency values that correspond to respective portions of the XR environment 506. For example, in some implementations, each object 510, 516, 518 is associated with a respective saliency value. In some implementations, portions of an object are associated with respective saliency values. For example, the front portion 512 and the rear portion 514 of the object 510 may be associated with respective saliency values.

In some implementations, the electronic device 502 selects a POV for displaying the XR environment 506 based on the set of saliency values. For example, the electronic device 502 may select a POV based on the object or portion of an object that is associated with the highest saliency value of the set of saliency values. If the object 516 is associated with the highest saliency value, for example, the electronic device 502 may display the XR environment 506 from a POV 520 via a rig 522. The POV 520 may provide a view of the object 516.

In some implementations, the electronic device 502 uses the rig 522 to capture a representation of the XR environment 506 from the POV 520, and the electronic device 502 displays the representation of the XR environment 506 captured from the POV 520. In some implementations, the rig 522 includes a set of one or more virtual environmental sensors. For example, in some implementations, the rig 522 includes a virtual image sensor (e.g., a virtual camera), a virtual depth sensor (e.g., a virtual depth camera), and/or a virtual audio sensor (e.g., a virtual microphone). In some implementations, the XR environment 506 includes a physical environment, and the rig 522 includes a set of one or more physical environmental sensors. For example, in some implementations, the rig 522 includes a physical image sensor (e.g., a physical camera), a physical depth sensor (e.g., a physical depth camera), and/or a physical audio sensor (e.g., a physical microphone). In some implementations, the rig 522 is fixed at a location within the XR environment 506 (e.g., the rig 522 is stationary).

In various implementations, when the electronic device 502 presents the XR environment 506 from the POV 520, the user 504 sees what the XR environment 506 looks like from a location corresponding to the rig 522. For example, when the electronic device 502 displays the XR environment 506 from the POV 520, the user 504 sees the object 516. The user 504 may not see the object 510 or the object 518. In some implementations, when the electronic device 502 presents the XR environment 506 from the POV 520, the user 504 hears sounds that are audible at a location corresponding to the rig 522. For example, the user 504 hears sounds that the rig 522 detects.

As another example, if the front portion 512 of the object 510 is associated with the highest saliency value, the electronic device 502 may display the XR environment 506 from a POV 524 via a rig 526. The POV 524 may provide a view of the front portion 512 of the object 510. On the other hand, if the rear portion 514 of the object 510 is associated with the highest saliency value, the electronic device 502 may display the XR environment 506 from a POV 528 via a rig 530. The POV 528 may provide a view of the rear portion 514 of the object 510.

Figure 5B:
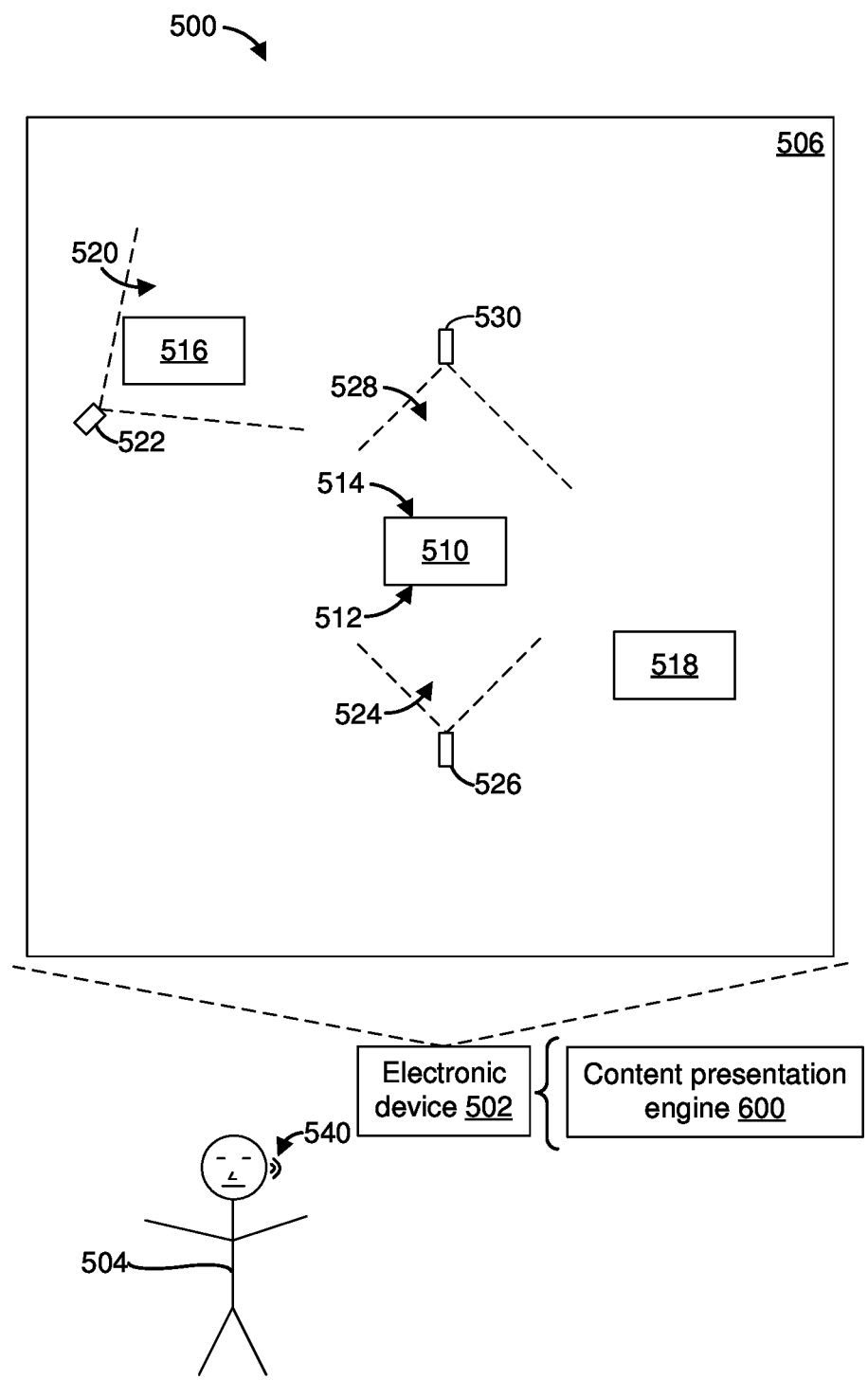

As illustrated in FIG. 5B, the electronic device 502 may obtain the request to display the XR environment 506 at least in part by obtaining an audible signal 540. For example, the electronic device 502 may receive a voice command from the user 504. In some implementations, the electronic device 502 disambiguates the audible signal 540 based on the set of saliency values. For example, if the audible signal 540 corresponds to a voice command to "focus," the electronic device 502 may display the XR environment 506 from a POV that corresponds to an object that is associated with the highest saliency value of the set of saliency values. If the object 516 is associated with the highest saliency value, the electronic device 502 may display the XR environment from the POV 520 via the rig 522.

In some implementations, if the audible signal 540 corresponds to a voice command to focus on a particular object, the electronic device 502 may display the XR environment 506 from a POV that corresponds to a portion of the object that is associated with the highest saliency value of the set of saliency values that are associated with that object. For example, if the audible signal 540 corresponds to a voice command to "focus on the dog," and the object 510 is a virtual dog, the electronic device 502 may display the XR environment 506 from either the POV 524 (via the rig 526) or the POV 528 (via the rig 530), depending on whether the front portion 512 or the rear portion 514 of the object 510 is associated with the highest saliency value.

Figure 5C:
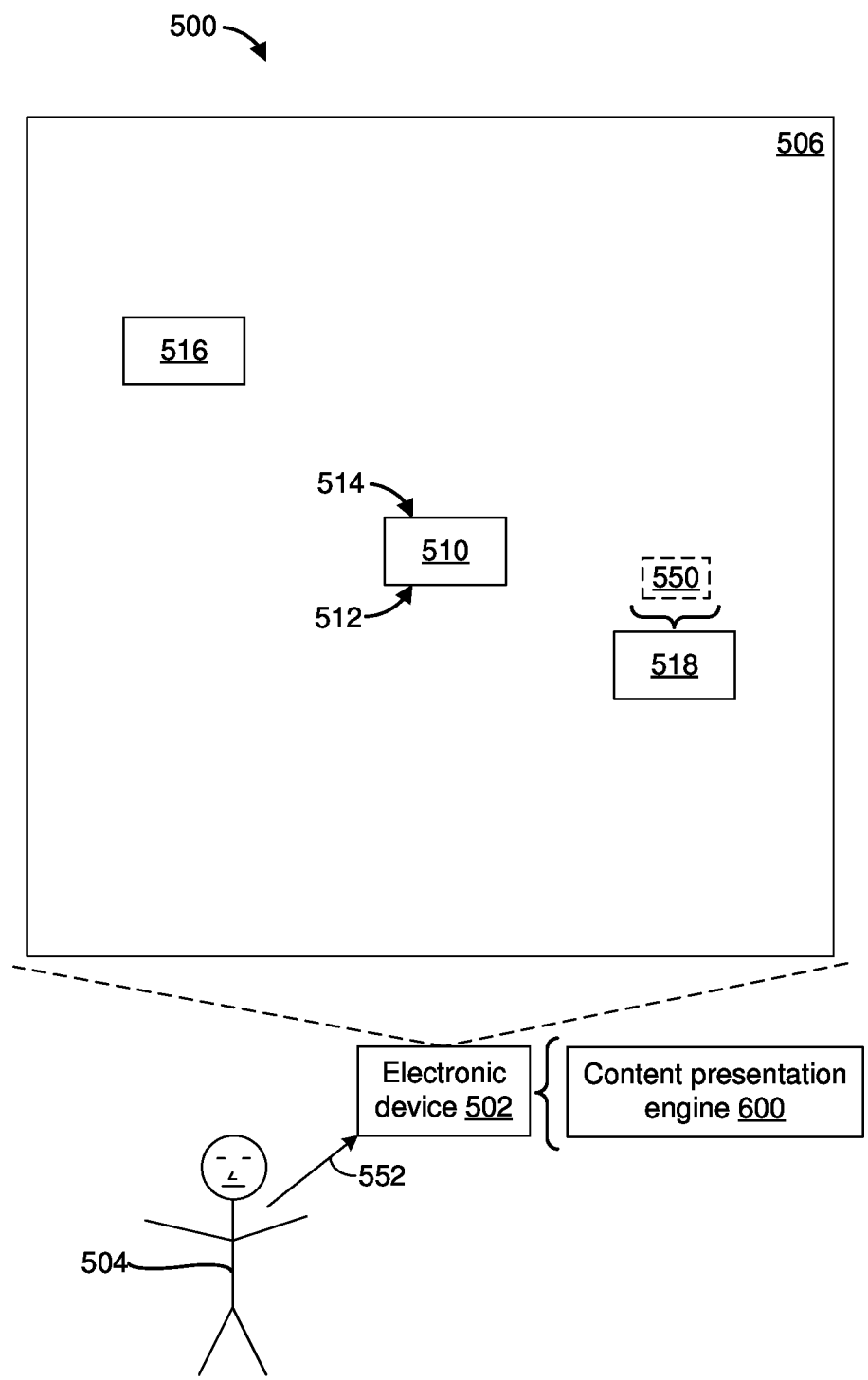

As illustrated in FIG. 5C, in some implementations, the electronic device 502 determines the saliency values. For example, the electronic device 502 may determine a saliency value 550 that is associated with the object 518 based on a user input 552. The user input 552 may include an input received via a user input device, such as a keyboard, mouse, stylus, and/or touch-sensitive display. The user input 552 may include an audio input received via an audio sensor. In some implementations, the user input 552 includes a gaze input. For example, the electronic device 502 may use a user-facing image sensor to determine that a gaze of the user 504 is directed to a particular object (e.g., the object 518) and may determine that the object 518 is salient (e.g., of interest) to the user 504. The electronic device 502 may assign a saliency value to the object 518 based on the gaze input.

In various implementations, the saliency value assigned to the object 518 indicates an estimated interest level of the user 504 in the object 518. For example, a saliency value that is greater than a threshold saliency value indicates that the user 504 is interested in viewing the object 518, and a saliency value that is less than the threshold saliency value indicates that the user 504 is not interested in viewing the object 518. In some implementations, different saliency values correspond to different degrees of user interest in the object 518. For example, a saliency value that is closer to '0' may correspond to a relatively low degree of user interest in the object 518, and a saliency value that is closer to '100' may correspond to a relatively high degree of user interest in the object 518.

In various implementations, the saliency value assigned to the object 518 indicates an intent of the user 504 to view the object 518. For example, a saliency value that is greater than a threshold saliency value indicates that the user 504 intends to view the object 518, and a saliency value that is less than the threshold saliency value indicates that the user 504 does not intend to view the object 518. In some implementations, different saliency values correspond to an intent to view the object 518 for different amounts of time. For example, a saliency value that is closer to '0' may correspond to an intent to view the object 518 for a relatively short amount of time (e.g., for less than a threshold amount of time), and a saliency value that is closer to '100' may correspond to an intent to view the object 518 for a relatively long amount of time (e.g., for greater than the threshold amount of time). In some implementations, different saliency values correspond to an intent to view the object 518 from different virtual distances. For example, a saliency value that is closer to '0' may correspond to an intent to view the object 518 from a relatively long virtual distance (e.g., from a virtual distance that is greater than a threshold virtual distance), and a saliency value that is closer to '100' may correspond to an intent to view the object 518 from a relatively short virtual distance (e.g., from a virtual distance that is less than the threshold virtual distance).

In some implementations, the user input 552 includes a gesture input. For example, the electronic device 502 may use an image sensor to capture an image of an extremity of the user 504 and may determine that a gesture is directed to a particular object (e.g., the object 518). The electronic device 502 may determine that the object 518 is salient to the user 504 based on the gesture input and may assign a saliency value to the object 518.

In some implementations, the user 504 identifies a salient object or a salient portion of an object in the XR environment 506 in response to a prompt presented by the electronic device 502. In some implementations, the user 504 identifies a salient object or a salient portion of an object in the XR environment 506 without having been prompted by the electronic device 502. For example, the electronic device 502 may determine a gaze input and/or a gesture input using an image sensor without presenting a prompt for the user 504 to gaze at or gesture toward an object or a portion of an object of interest.

In some implementations, the electronic device 502 receives the saliency values from a second device. For example, the user 504 may identify a salient object or a salient portion of an object in the XR environment 506 using a second device (e.g., an HMD) that is in communication with the electronic device 502. The second device may receive a user input from the user 504 and determine the saliency values based on the user input. In some implementations, the second device provides the saliency values to the electronic device 502.

In some implementations, the electronic device 502 receives the saliency values from an expert system. For example, an expert system may include a knowledge base that implements rules and/or information relating to objects and/or portions of objects and saliency values. An inference engine may apply the rules to existing information to determine saliency values for previously unknown objects and/or portions of objects. In some implementations, the expert system uses machine learning and/or data mining to determine the saliency values. After determining the set of saliency values, the expert system may provide the saliency values to the electronic device 502.

Figure 5D:
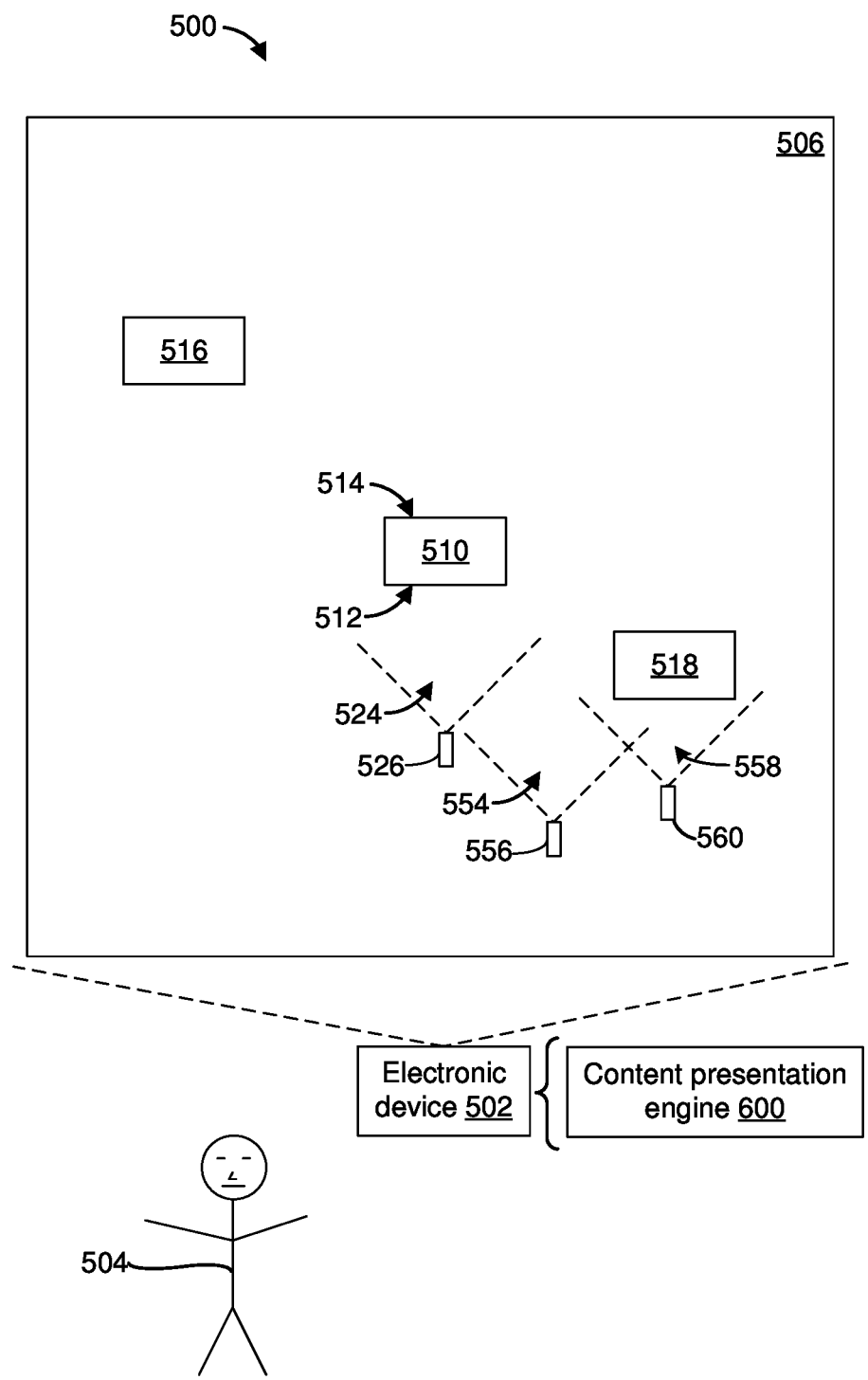

As illustrated in FIG. 5D, in some implementations, the electronic device 502 selects the POV based on a relationship between objects in the graphical environment. For example, the electronic device 502 may determine that the objects 510 and 518 are related to each other because they have a spatial relationship, e.g., they are less than a threshold distance from each other. Based on the relationship between the objects 510 and 518, the electronic device 502 may select a POV that provides a view of both objects 510 and 518. For example, the electronic device 502 may display the XR environment 506 from a POV 554 via a rig 556. In some implementations, the electronic device 502 selects the POV 554 preferentially over other POVs that provide more limited views of the objects 510 and 518. For example, the electronic device 502 may select the POV 554 rather than the POV 524 and/or a POV 558, which provides a view of the object 518 via a rig 560. In some implementations, the electronic device 502 synthesizes the POV 554 based on existing images that correspond to the POVs 524 and 558. More generally, in various implementations, the electronic device 502 synthesizes a new POV based on existing POVs.

Figure 5E:
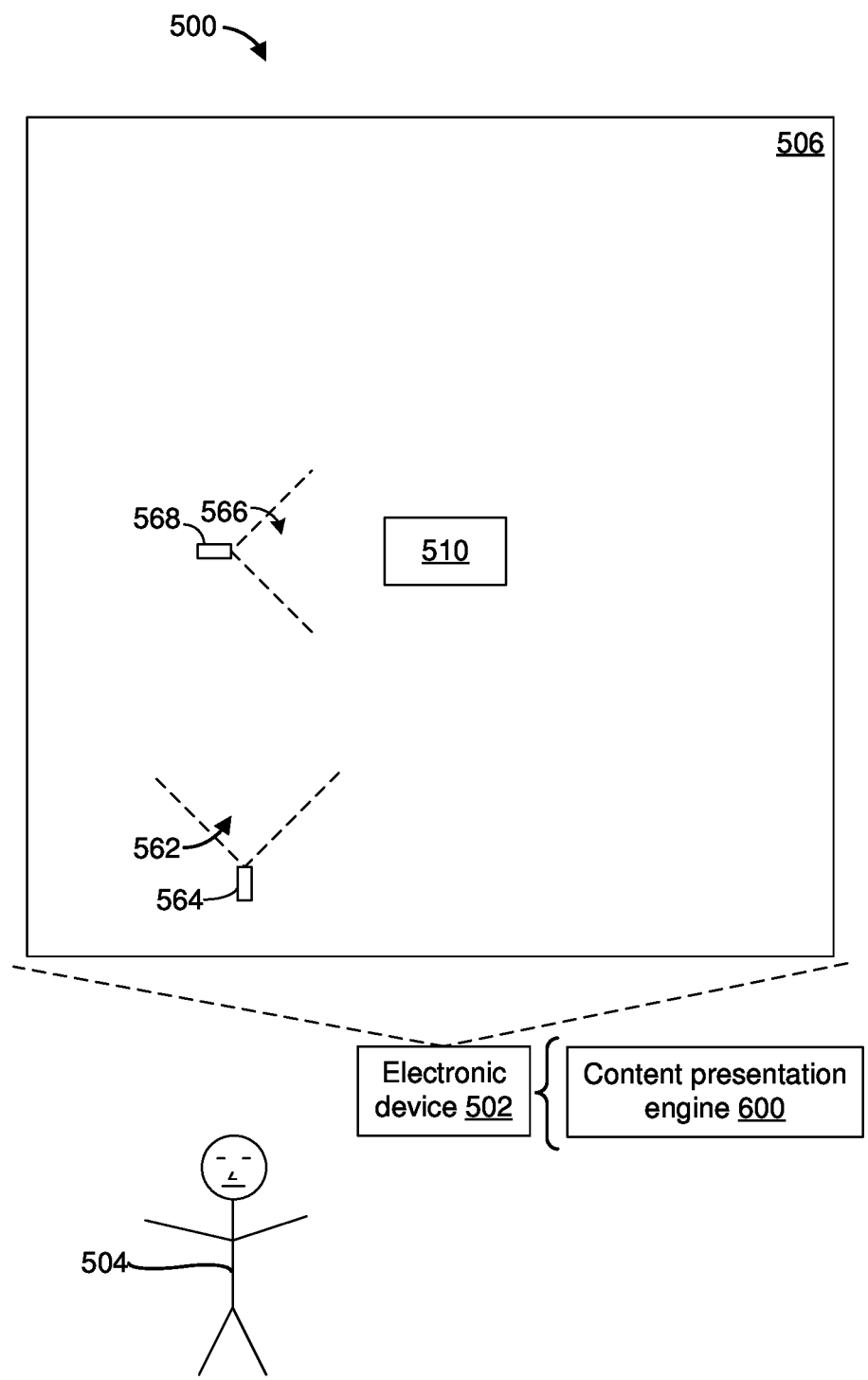

As illustrated in FIG. 5E, in some implementations, the electronic device 502 switches from another POV to the selected POV in response to obtaining the request to display the XR environment 506. For example, the electronic device 502 may display the XR environment 506 from a first POV 562 via a rig 564. The electronic device 502 may obtain a request to display the XR environment 506. In some implementations, the electronic device 502 selects a POV that is different from the first POV 562. For example, the request may identify an object, e.g., the object 510, and the electronic device 502 may select a POV 566 that provides a view of the object 510 via a rig 568. As another example, the electronic device 502 may select the POV 566 based on saliency values associated with the object 510 and other objects in the XR environment 506. In some implementations, the electronic device 502 switches from the first POV 562 to the selected POV 566 in response to obtaining the request to display the XR environment 506.

In some implementations, the electronic device 502 includes or is attached to a head-mountable device (HMD) worn by the user 504. The HMD presents (e.g., displays) the XR environment 506 according to various implementations. In some implementations, the HMD includes an integrated display (e.g., a built-in display) that displays the XR environment 506. In some implementations, the HMD includes a head-mountable enclosure. In various implementations, the head-mountable enclosure includes an attachment region to which another device with a display can be attached. For example, in some implementations, the electronic device 502 can be attached to the head-mountable enclosure. In various implementations, the head-mountable enclosure is shaped to form a receptacle for receiving another device that includes a display (e.g., the electronic device 502). For example, in some implementations, the electronic device 502 slides/snaps into or otherwise attaches to the head-mountable enclosure. In some implementations, the display of the device attached to the head-mountable enclosure presents (e.g., displays) the XR environment 506. In various implementations, examples of the electronic device 502 include smartphones, tablets, media players, laptops, etc.

Figure 6:
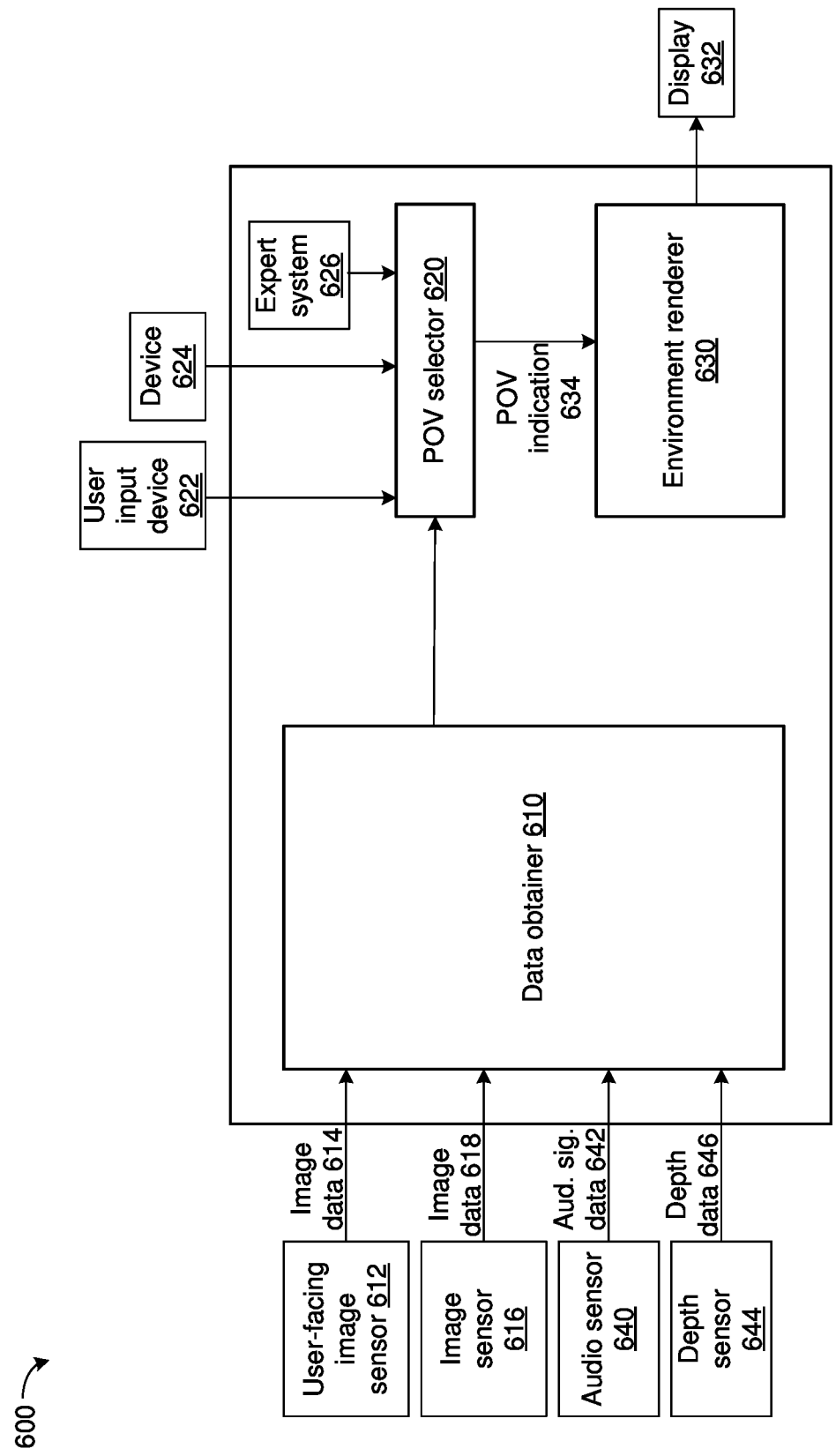
FIG. 6 is a block diagram of an example content presentation engine in accordance with some implementations.

FIG. 6 illustrates a block diagram of the content presentation engine 600 in accordance with some implementations. In some implementations, the content presentation engine 600 includes a data obtainer 610, a point of view (POV) selector 620, and an environment renderer 630. In some implementations, the content presentation engine 600 is integrated into the content presentation engine 200 shown in FIG. 2A and/or the content presentation engine 1000 shown in FIG. 10. In some implementations, in addition to or as an alternative to performing the operations described in relation to the content presentation engine 600, the content presentation engine 600 performs the operations described in relation to the content presentation engine 200 shown in FIG. 2A and/or the operations described in relation to the content presentation engine 1000 shown in FIG. 10.

In various implementations, the data obtainer 610 obtains environmental data characterizing a physical environment of the content presentation engine 600. For example, a user-facing image sensor 612 may capture an image representing a face of the user and provide image data 614 to the data obtainer 610. In some implementations, the image data 614 indicates a direction in which the user's gaze is directed. An image sensor 616 may capture an image of an extremity of the user and provide image data 618 to the data obtainer 610. For example, in some implementations, the image data 618 indicates whether the user is making a gesture with the user's hands.

In some implementations, an audio sensor 640 captures an audible signal, which may represent an utterance spoken by the user. For example, the audible signal may represent a speech input provided by the user. In some implementations, the electronic device 502 receives an audible signal and converts the audible signal into audible signal data 642. In some implementations, the audible signal data 642 is referred to as electronic signal data. The data obtainer 610 may receive the audible signal data 642.

In some implementations, a depth sensor 644 (e.g., a depth camera) captures depth data 646. For example, the depth data 646 includes depth measurements captured by a depth camera of the electronic device 502 shown in FIGS. 5A-5E. In various implementations, the depth data 646 indicates respective positions of body portions of a user. For example, in some implementations, the depth data 646 indicates whether the user is making a gesture with the user's hands.

In various implementations, the content presentation engine 600 obtains a request to display a graphical environment. For example, the data obtainer 610 may obtain environmental data that corresponds to a request to display the graphical environment. In some implementations, the data obtainer 610 recognizes a speech input in the audible signal data 642. The data obtainer 610 may determine that the speech input corresponds to a request to display the graphical environment. In some implementations, the data obtainer 610 may determine that the speech input identifies a particular object or a portion of an object in the graphical environment (e.g., "focus on the car").

The graphical environment is associated with a set of saliency values that correspond to respective portions of the graphical environment. Saliency values may represent respective levels of importance of features of the graphical environment. In some implementations, saliency values are associated with objects in the graphical environment and/or with portions of objects in the graphical environment. For example, each object in the graphical environment may be associated with a saliency map that indicates the most salient portions of the object. In some implementations, saliency values are different for different users. For example, for some users, a head portion of an object may be the most salient portion, while for other users, a torso portion of the object may be the most salient portion.

In various implementations, the POV selector 620 selects a POV for displaying the graphical environment based on the set of saliency values. For example, the POV selector 620 may select the POV based on the object or portion of an object that is associated with the highest saliency value of the set of saliency values. In some implementations, the content presentation engine 600 obtains a request to display the graphical environment at least in part by obtaining audible signal data. The audible signal data may represent a voice command, e.g., to "focus." In some implementations, the POV selector 620 selects a POV corresponding to an object that is associated with the highest saliency value of the set of saliency values. In some implementations, the audible signal data represents a voice command that identifies an object in the graphical environment, e.g., "focus on the car." The POV selector 620 may select a POV that corresponds to a portion of the identified object that is associated with the highest saliency value of the set of saliency values that are associated with that object. In some implementations, the POV selector 620 may exclude from consideration objects or portions of objects that are not identified in the voice command.

In some implementations, the POV selector 620 determines the saliency values. The POV selector 620 may determine a saliency value that is associated with an object or a portion of an object based on a user input received, for example, via a user input device 622, such as a keyboard, mouse, stylus, and/or touch-sensitive display. The POV selector 620 may determine the saliency value based on data received from the data obtainer 610. For example, in some implementations, the POV selector 620 determines the saliency value based on environmental data, such as the image data 614, the image data 618, the audible signal data 642, and/or the depth data 646. In some implementations, for example, the image data 614 is indicative of an object or a portion of an object at which a gaze of the user is focused. As another example, the image data 618 may be indicative of an object or a portion of an object toward which a gesture performed by the user is directed. In some implementations, the POV selector 620 determines that the object or portion of the object indicated by the environmental data is salient to the user and assigns a saliency value to the object or portion of the object.

In some implementations, the POV selector 620 causes a prompt to be presented to the user to elicit an input from the user that identifies a salient object or a salient portion of an object in the graphical environment. In some implementations, the user identifies a salient object or a salient portion of an object in the graphical environment without having been prompted. For example, the POV selector 620 may use the image data 614 and/or the image data 618 to determine a gaze input and/or a gesture input without causing a prompt to be presented to the user to gaze at or gesture toward an object or a portion of an object of interest.

In some implementations, the POV selector 620 receives the saliency values from a device 624 (e.g., an HMD) that is in communication with a device implementing the POV selector 620. For example, the user may identify a salient object or a salient portion of an object in the graphical environment using the device 624. The device 624 may receive a user input from the user and determine the saliency values based on the user input. In some implementations, the device 624 provides the saliency values to the device implementing the POV selector 620.

In some implementations, the POV selector 620 receives the saliency values from an expert system 626. For example, an expert system may include a knowledge base that implements rules and/or information relating to objects and/or portions of objects and saliency values. An inference engine may apply the rules to existing information to determine saliency values for previously unknown objects and/or portions of objects. In some implementations, the expert system 626 uses machine learning and/or data mining to determine the saliency values. After determining the set of saliency values, the expert system 626 may provide the saliency values to the POV selector 620.

In some implementations, the POV selector 620 selects the POV based on a relationship between objects in the graphical environment. For example, the POV selector 620 may determine that a pair of objects are related to each other because they have a spatial relationship, e.g., they are less than a threshold distance from each other. Based on the relationship between the objects, the POV selector 620 may select a POV that provides a view of both of the objects. In some implementations, the POV selector 620 selects a POV that provides a view of both of the objects preferentially over other POVs that provide more limited views of the objects, e.g., POVs that provide views of only one of the objects.

In some implementations, the POV selector 620 switches from another POV to the selected POV in response to obtaining the request to display the graphical environment. For example, the graphical environment may be displayed from a first POV. The data obtainer 610 may obtain a request to display the graphical environment. In some implementations, the POV selector 620 selects a second POV that is different from the first POV. For example, the request may identify an object, and the POV selector 620 may select a POV that provides a view of the identified object. As another example, the POV selector 620 may select the POV based on saliency values associated with the identified object and other objects in the graphical environment. In some implementations, the POV selector 620 switches from the first POV to the selected POV in response to the request to display the graphical environment.

In various implementations, the environment renderer 630 causes the graphical environment to be displayed on a display 632 from the selected POV. For example, the POV selector 620 may generate a POV indication 634 that indicates the selected POV. The environment renderer 630 may receive the POV indication 634 from the POV selector 620. The environment renderer 630 presents the graphical environment from the selected POV using the display 632 in response to receiving the POV indication 634 from the POV selector 620.

Implementations described herein contemplate the use of gaze information to present salient points of view and/or salient information. Implementers should consider the extent to which gaze information is collected, analyzed, disclosed, transferred, and/or stored, such that well-established privacy policies and/or privacy practices are respected. These considerations should include the application of practices that are generally recognized as meeting or exceeding industry requirements and/or governmental requirements for maintaining the user privacy. The present disclosure also contemplates that the use of a user's gaze information may be limited to what is necessary to implement the described embodiments. For instance, in implementations where a user's device provides processing power, the gaze information may be processed at the user's device, locally.

Figure 7A:
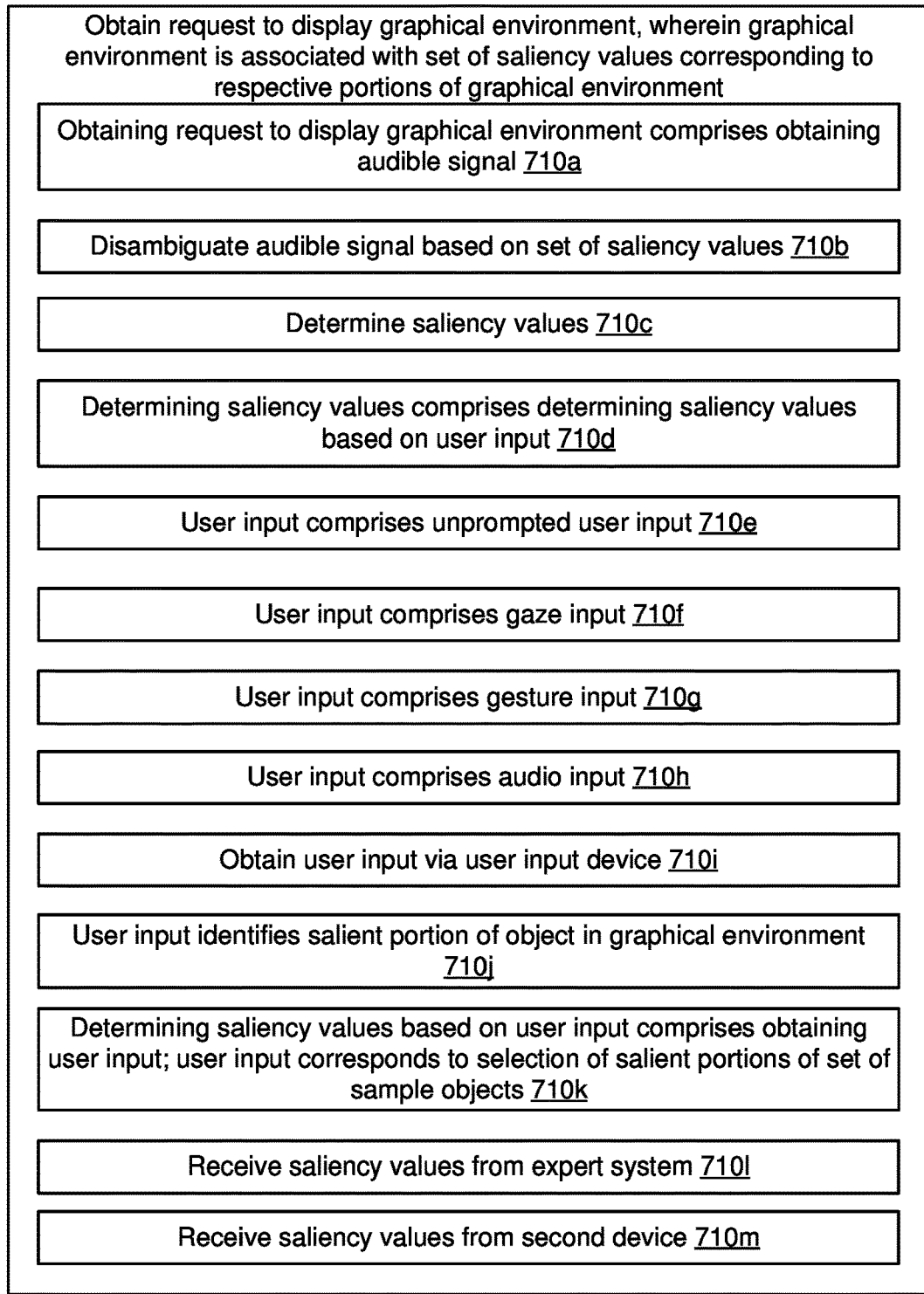

FIGS. 7A-7B are a flowchart representation of a method 700 for presenting a graphical environment. In various implementations, the method 700 is performed by a device (e.g., the electronic device 502 shown in FIGS. 5A-5E, or the content presentation engine 600 shown in FIGS. 5A-5E and 6). In some implementations, the method 700 is performed by processing logic, including hardware, firmware, software, or a combination thereof. In some implementations, the method 700 is performed by a processor executing code stored in a non-transitory computer-readable medium (e.g., a memory). Briefly, the method 700 includes obtaining a request to display a graphical environment that is associated with a set of saliency values corresponding to respective portions of the graphical environment, selecting a point-of-view (POV) for displaying the graphical environment based on the set of saliency values, and displaying the graphical environment from the selected POV.

Referring to FIG. 7A, in various implementations, as represented by block 710, the method 700 includes obtaining a request to display a graphical environment. The graphical environment is associated with a set of saliency values. The saliency values correspond to respective portions of the graphical environment. For example, objects in the graphical environment may be associated with respective saliency values. In some implementations, portions of an object in the graphical environment are associated with respective saliency values. Saliency values may represent respective levels of importance of features of the graphical environment. In some implementations, saliency values are different for different users. For example, for some users, a head portion of an object may be the most salient portion, while for other users, a torso portion of the object may be the most salient portion.

In some implementations, as represented by block 710*a*, obtaining the request to display the graphical environment includes obtaining an audible signal. For example, a voice command may be received from the user. As represented by block 710*b*, in some implementations, the audible signal may be disambiguated based on the set of saliency values. For example, if the audible signal corresponds to a voice command to "focus," the set of saliency values may be used to determine an object in the graphical environment to serve as a basis of a point-of-view. As another example, if the audible signal corresponds to a voice command that identifies an object, the set of saliency values may be used to determine a portion of the object to serve as a basis of a point-of-view.

In some implementations, as represented by block 710*c*, the method 700 includes determining the set of saliency values. For example, as represented by block 710*d*, the saliency value may be determined based on a user input. In some implementations, a prompt is presented to the user to elicit an input from the user that identifies a salient object or a salient portion of an object in the graphical environment. As represented by block 710*e*, in some implementations, the user input comprises an unprompted user input. For example, a gaze input or a gesture input may be obtained from the user without presenting a prompt to the user to gaze at or gesture toward an object or a portion of an object of interest.

In some implementations, as represented by block 710*f*, the user input comprises a gaze input. For example, a user-facing image sensor may capture image data that is used to determine a gaze vector. The gaze vector may be indicative of an object or a portion of an object toward which a gaze of the user is directed. In some implementations, as represented by block 710*g*, the user input comprises a gesture input. For example, an image sensor may capture image data that is used to determine a position and/or a movement of an extremity of the user. The image data may be indicative of an object or a portion of an object to which a gesture performed by the user is directed.

In some implementations, as represented by block 710*h*, the user input comprises an audio input. For example, an audio sensor may obtain audible signal data. The audible signal data may represent an utterance spoken by the user. For example, the audible signal data may represent a speech input provided by the user.

In some implementations, as represented by block 710*i*, the user input is obtained via a user input device. For example, the user may provide the user input using one or more of a keyboard, mouse, stylus, and/or touch-sensitive display.

In some implementations, as represented by block 710*j*, the user input identifies a salient portion of an object in the graphical environment. For example, an image sensor may capture image data that is indicative of a gaze input and/or a gesture input. The gaze input and/or the gesture input may indicate a user's selection of salient portions of an object in the graphical environment. As another example, a user may provide a voice input that indicates which portions of an object are salient to the user. In some implementations, a user provides a user input via a user input device, such as a keyboard, mouse, stylus, and/or touch-sensitive display. The user input identifies a salient portion of an object in the graphical environment.

In some implementations, as represented by block 710k, determining the set of saliency values based on a user input includes obtaining the user input. The user input may correspond to a selection of salient portions of a set of sample objects. For example, a set of sample virtual cars may be displayed to the user. The user may provide a user input indicating one or more salient portions (e.g., front portions, tires, and/or rear portions) of the sample virtual cars. The user input may be used to determine saliency values for similar objects (e.g., virtual cars) in the graphical environment.

In some implementations, as represented by block 710l, the saliency values are received from an expert system. For example, an expert system may include a knowledge base that implements rules and/or information relating to objects and/or portions of objects and saliency values. An inference engine may apply the rules to existing information to determine saliency values for previously unknown objects and/or portions of objects. In some implementations, the expert uses machine learning and/or data mining to determine the saliency values.

In some implementations, as represented by block 710m, the saliency values are received from a second device. For example, the saliency values may be received from a device (e.g., an HMD) that is in communication with a device on which the method 700 is implemented. For example, the user may identify a salient object or a salient portion of an object in the graphical environment using the second device. The second device may receive a user input from the user and determine the saliency values based on the user input.

Referring now to FIG. 7B, as represented by block 720, the method 700 may include selecting a point-of-view (POV) for displaying the graphical environment based on the set of saliency values. For example, as represented by block 720a, the graphical environment may include a plurality of objects. Each object may be associated with one of the saliency values. Selecting the POV may include selecting one of the plurality of objects based on the saliency values. For example, the object corresponding to the highest saliency value of the set of saliency values may be selected.

In various implementations, selecting the POV based on the set of saliency values reduces a need for a sequence of user inputs that correspond to a user manually selecting the POV. For example, automatically selecting the POV based on the set of saliency values reduces a need for a user to provide user inputs that correspond to moving a rig (e.g., a virtual camera) around a graphical environment. Reducing unnecessary user inputs tends to enhance operability of the device by decreasing power consumption associated with processing (e.g., interpreting and/or acting upon) the unnecessary user inputs.

In some implementations, as represented by block 720b, the saliency values correspond to respective portions of an object in the graphical environment. Selecting the POV may include selecting a portion of the object based on the saliency values. For example, the portion of the object corresponding to the highest saliency value of the set of saliency values may be selected. In some implementations, as represented by block 720c, the request to display the graphical environment identifies the object (e.g., from which a portion of the object serves as the basis of the POV). For example, the request may include audible signal data representing a voice command, e.g., to "focus" on a particular object in the graphical environment. The method 700 may include selecting the POV based on saliency values associated with portions of the object identified in the request. In some implementations, objects or portions of objects that are not identified in the request may be excluded from consideration for selection as the basis of the POV.

In some implementations, as represented by block 720d, the method 700 includes selecting the POV based on a relationship between objects in the graphical environment. For example, two or more objects may be related to each other because they have a spatial relationship, e.g., they are less than a threshold distance from each other. A POV may be selected based on the relationship between the objects to provide a view of the two or more objects. For example, a POV that provides a view of multiple related objects may be selected preferentially over other POVs that provide a view of only one of the objects.

In various implementations, as represented by block 730, the method 700 includes displaying, on the display, the graphical environment from the selected POV. For example, a POV indication may be generated that indicates the selected POV. The graphical environment may be displayed from the selected POV according to the POV indication. In some implementations, as represented by block 730a, a view of two objects in the graphical environment that are related to each other may be displayed. For example, objects that are functionally or spatially related to one another may be displayed together.

In various implementations, displaying the graphical environment from the selected POV results in displaying a salient portion of the graphical environment that may be relevant to the user while foregoing display of a non-salient portion that may not be relevant to the user. Displaying a salient portion (e.g., a relevant portion) of the graphical environment tends to increase a likelihood of the user engaging with (e.g., viewing) the display thereby increasing a utility (e.g., usefulness) of the device.

In some implementations, as represented by block 730b, the method 700 includes switching from another POV to the selected POV in response to obtaining the request to display the graphical environment. For example, the graphical environment may be displayed from a first POV. A user may provide a request to display the graphical environment. Based on saliency values associated with portions of the graphical environment, a second POV different from the first POV may be selected. For example, the request may identify an object, and the first POV may not provide a view of the identified object. Accordingly, a second POV that provides a view of the identified object may be selected. In some implementations, the display switches from the first POV to the second POV in response to the request to display the graphical environment.

Figure 8:
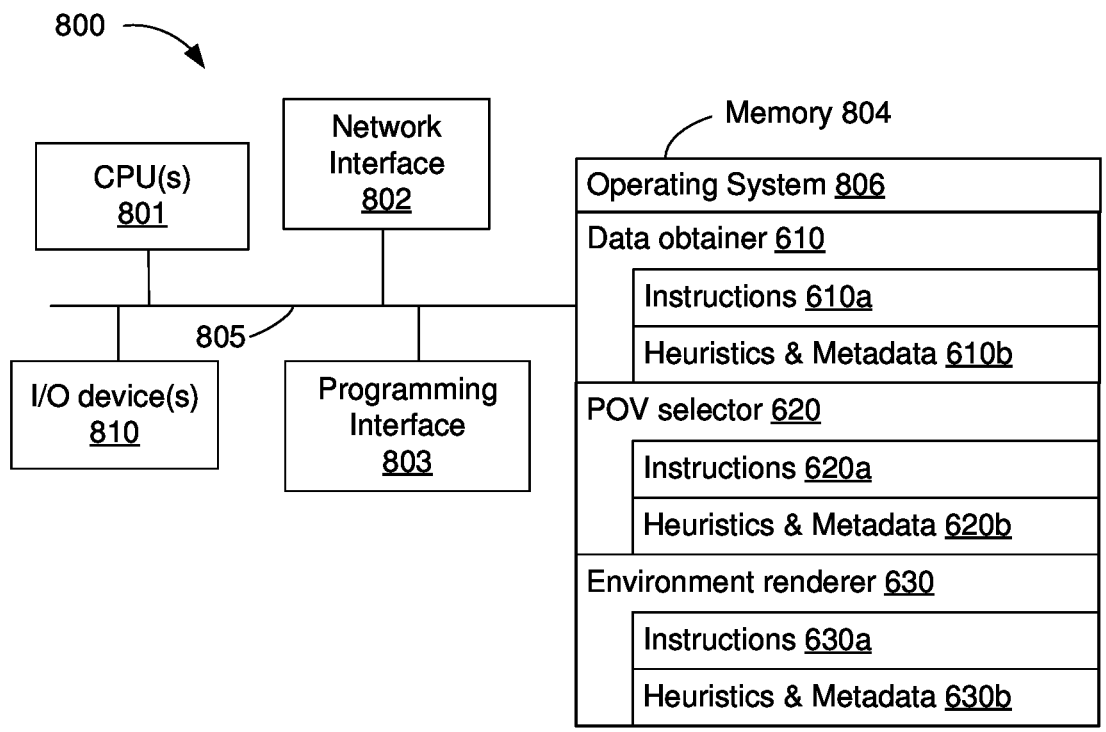
FIG. 8 is a block diagram of a device that presents a graphical environment from a selected point-of-view in accordance with some implementations.

FIG. 8 is a block diagram of a device 800 that presents a graphical environment from a selected point-of-view in accordance with some implementations. In some implementations, the device 800 implements the electronic device 502 shown in FIGS. 5A-5E, and/or the content presentation engine 600 shown in FIGS. 5A-5E and 6. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units (CPUs) 801, a network interface 802, a programming interface 803, a memory 804, one or more input/output (I/O) devices 810, and one or more communication buses 805 for interconnecting these and various other components.

In some implementations, the network interface 802 is provided to, among other uses, establish and maintain a metadata tunnel between a cloud hosted network management system and at least one private network including one or more compliant devices. In some implementations, the one or more communication buses 805 include circuitry that interconnects and controls communications between system components. The memory 804 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 804 optionally includes one or more storage devices remotely located from the one or more CPUs 801. The memory 804 comprises a non-transitory computer readable storage medium.

In some implementations, the memory 804 or the non-transitory computer readable storage medium of the memory 804 stores the following programs, modules and data structures, or a subset thereof including an optional operating system 806, the data obtainer 610, the POV selector 620, and the environment renderer 630. In various implementations, the device 800 performs the method 700 shown in FIGS. 7A-7B. Additionally or alternatively, in some implementations, the device 800 performs the method 300 shown in FIG. 3. Additionally or alternatively, in some implementations, the device 800 performs the method 1100 shown in FIG. 11.

In some implementations, the data obtainer 610 obtains environmental data characterizing a physical environment of the content presentation engine 600. In some implementations, the data obtainer 610 performs at least some of the operation(s) represented by block 710 in FIG. 7A. To that end, the data obtainer 610 includes instructions 610*a* and heuristics and metadata 610*b*.

In some implementations, the POV selector 620 selects a POV for displaying the graphical environment based on a set of saliency values associated with the graphical environment. In some implementations, the POV selector 620 performs at least some of the operation(s) represented by block 720 in FIG. 7B. To that end, the POV selector 620 includes instructions 620*a* and heuristics and metadata 620*b*.

In some implementations, the environment renderer 630 displays the graphical environment from the POV selected by the POV selector 620. In some implementations, the environment renderer 630 performs the at least some of the operation(s) represented by block 730 in FIG. 7B. To that end, the environment renderer 630 includes instructions 630*a* and heuristics and metadata 630*b*.

In some implementations, the one or more I/O devices 810 include an environmental sensor for obtaining environmental data. In some implementations, the one or more I/O devices 810 include an audio sensor (e.g., a microphone) for detecting a speech input. In some implementations, the one or more I/O devices 810 include an image sensor (e.g., a camera) to capture image data representing a user's eyes and/or extremity. In some implementations, the one or more I/O devices 810 include a depth sensor (e.g., a depth camera) to capture depth data. In some implementations, the one or more I/O devices 810 include a display for displaying the graphical environment from the selected POV. In some implementations, the one or more I/O devices 810 include a speaker for outputting an audible signal corresponding to the selected POV.

In various implementations, the one or more I/O devices 810 include a video pass-through display that displays at least a portion of a physical environment surrounding the device 800 as an image captured by a scene camera. In various implementations, the one or more I/O devices 810 include an optical see-through display that is at least partially transparent and passes light emitted by or reflected off the physical environment.

It will be appreciated that FIG. 8 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 8 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

When a device displays a view of a target object from a particular POV, the target object may not be readily visible from that particular POV. For example, if the POV corresponds to following the target object, a view of the target object may be obstructed if other objects are interposed between a camera rig and the target object or if the target object turns around a corner. In some implementations, a device switches between rigs to maintain a visual of a target object in response to detecting a change in a graphical environment. In various implementations, switching from the first rig to the second rig allows the device to display an uninterrupted view (e.g., a continuous view) of the target, thereby enhancing a user experience of the device. In some implementations, automatically switching from the first rig to the second rig reduces a need for a user input that corresponds to the user manually switching from the first rig to the second rig. Reducing unnecessary user inputs tends to enhance operability of the device by reducing a power consumption associated with processing (e.g., interpreting and/or acting upon) unnecessary user inputs.

Figure 9A:
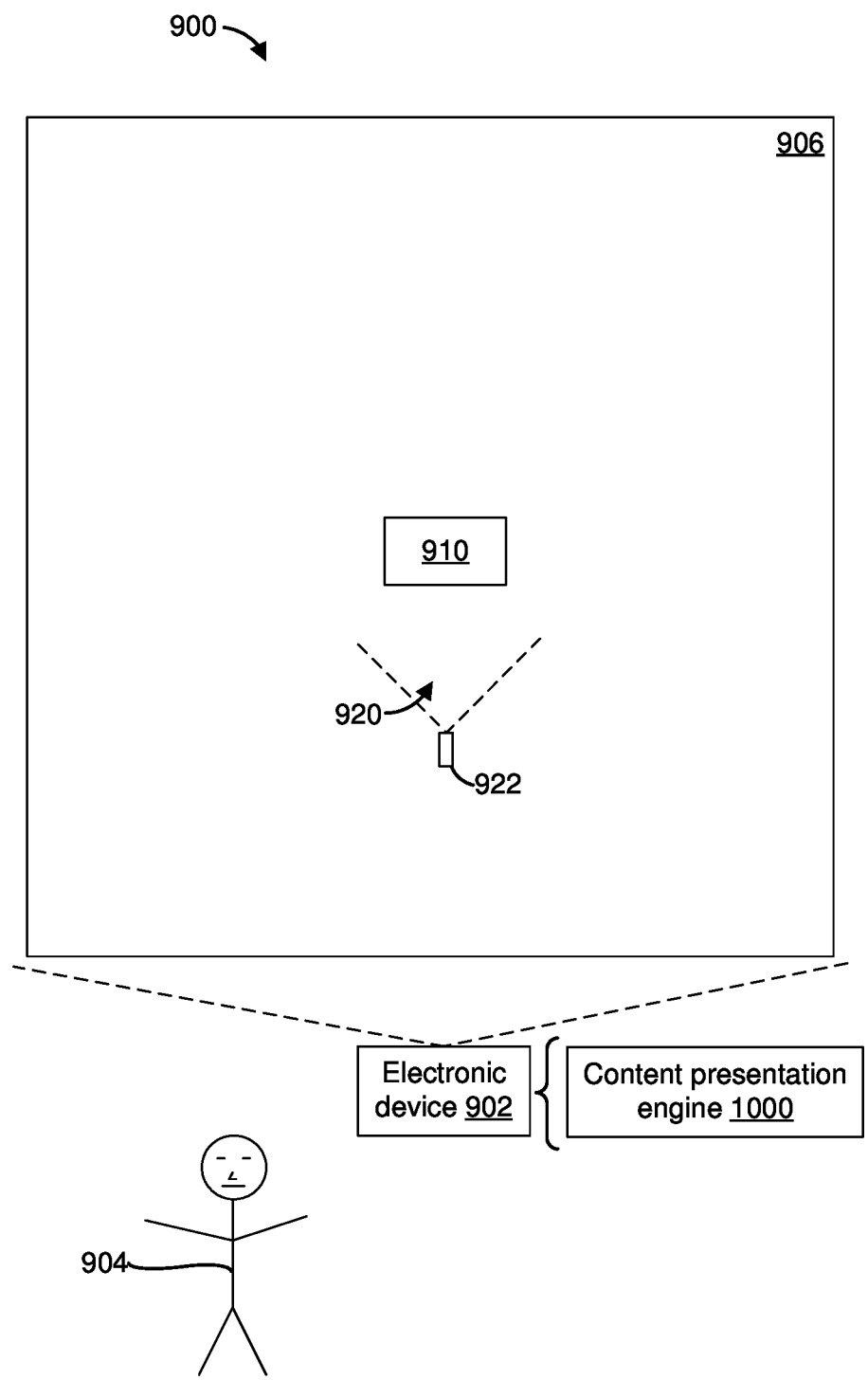
FIGS. 9A-9G are diagrams of an example operating environment in accordance with some implementations.

FIG. 9A is a diagram of an example operating environment 900 in accordance with some implementations. As a non-limiting example, the operating environment 900 includes an electronic device 902 and a content presentation engine 1000. In some implementations, the electronic device 902 includes a handheld computing device that can be held by a user 904. For example, in some implementations, the electronic device 902 includes a smartphone, a tablet, a media player, a laptop, or the like. In some implementations, the electronic device 902 includes a wearable computing device that can be worn by the user 904. For example, in some implementations, the electronic device 902 includes a head-mountable device (HMD) or an electronic watch.

In the example of FIG. 9A, the content presentation engine 1000 resides at the electronic device 902. For example, the electronic device 902 implements the content presentation engine 1000. In some implementations, the electronic device 902 includes a set of computer-readable instructions corresponding to the content presentation engine 1000. Although the content presentation engine 1000 is shown as being integrated into the electronic device 902, in some implementations, the content presentation engine 1000 is separate from the electronic device 502. For example, in some implementations, the content presentation engine 1000 resides at another device (e.g., at a controller, a server or a cloud computing platform).

As illustrated in FIG. 9A, in some implementations, the electronic device 902 presents an extended reality (XR) environment 906. In some implementations, the XR environment 906 is referred to as a computer graphics environment. In some implementations, the XR environment 906 is referred to as a graphical environment. In some implementations, the electronic device 902 generates the XR environment 906. Alternatively, in some implementations, the electronic device 902 receives the XR environment 906 from another device that generated the XR environment 906.

In some implementations, the XR environment 906 includes a virtual environment that is a simulated replacement of a physical environment. In some implementations, the XR environment 906 is synthesized by the electronic device 902. In such implementations, the XR environment 906 is different from a physical environment in which the electronic device 902 is located. In some implementations, the XR environment 906 includes an augmented environment that is a modified version of a physical environment. For example, in some implementations, the electronic device 902 modifies (e.g., augments) the physical environment in which the electronic device 902 is located to generate the XR environment 906. In some implementations, the electronic device 902 generates the XR environment 906 by simulating a replica of the physical environment in which the electronic device 902 is located. In some implementations, the electronic device 902 generates the XR environment 906 by removing and/or adding items from the simulated replica of the physical environment in which the electronic device 902 is located.

In some implementations, the XR environment 906 includes various virtual objects such as an XR object 910 ("object 910", hereinafter for the sake of brevity). In some implementations, the virtual objects are referred to as graphical objects or XR objects. In various implementations, the electronic device 902 obtains the virtual objects from an object datastore (not shown). For example, in some implementations, the electronic device 902 retrieves the object 910 from the object datastore. In some implementations, the virtual objects represent physical elements. For example, in some implementations, the virtual objects represent equipment (e.g., machinery such as planes, tanks, robots, motorcycles, etc.). In some implementations, the virtual objects represent fictional elements (e.g., entities from fictional materials, for example, an action figure or a fictional equipment such as a flying motorcycle).

In various implementations, the electronic device 902 (e.g., the content presentation engine 1000) displays a first view of a target in the XR environment 906, e.g., the object 910. For example, the electronic device 902 may display the XR environment 906 from a point-of-view (POV) 920 via a rig 922. The POV 920 may provide a view of the object 910. In some implementations, the electronic device 902 uses the rig 922 to capture a representation of the XR environment 906 from the POV 920, and the electronic device 902 displays the representation of the XR environment 906 captured from the POV 920. In some implementations, the rig 922 includes a set of one or more virtual environmental sensors. For example, in some implementations, the rig 922 includes a virtual image sensor (e.g., a virtual camera), a virtual depth sensor (e.g., a virtual depth camera), and/or a virtual audio sensor (e.g., a virtual microphone). In some implementations, the XR environment 906 includes a physical environment, and the rig 922 includes a set of one or more physical environmental sensors. For example, in some implementations, the rig 922 includes a physical image sensor (e.g., a physical camera), a physical depth sensor (e.g., a physical depth camera), and/or a physical audio sensor (e.g., a physical microphone). In some implementations, the rig 922 is fixed at a location within the XR environment 906 (e.g., the rig 922 is stationary).

In various implementations, when the electronic device 902 presents the XR environment 906 from the POV 920, the user 904 sees what the XR environment 906 looks like from a location corresponding to the rig 922. For example, when the electronic device 902 displays the XR environment 906 from the POV 920, the user 904 sees the object 910. The user 904 may not see other objects that are out of the field of view of the rig 922 or that are obscured by the object 910. In some implementations, when the electronic device 902 presents the XR environment 906 from the POV 920, the user 904 hears sounds that are audible at a location corresponding to the rig 922. For example, the user 904 hears sounds that the rig 922 detects.

Figure 9B:
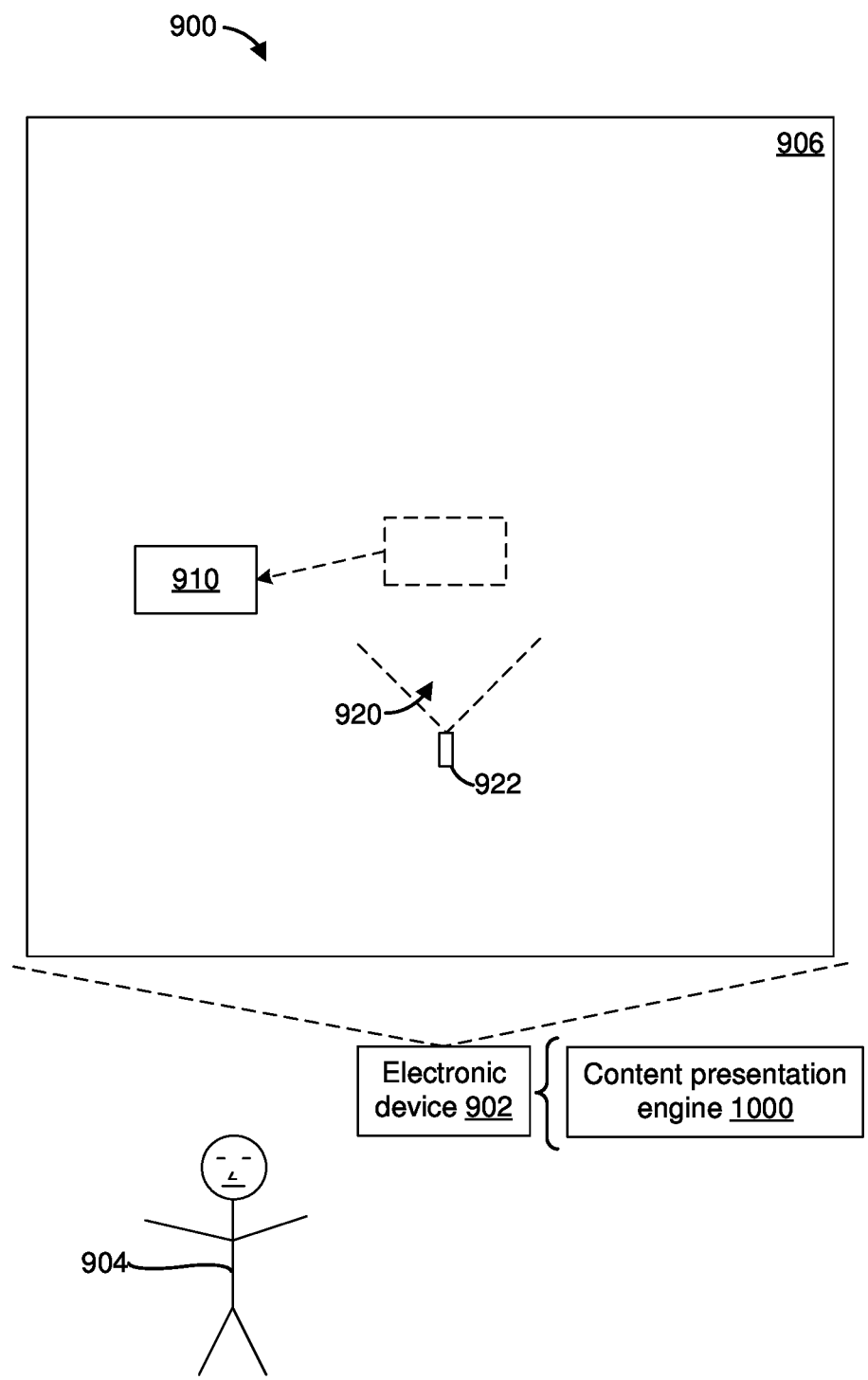
Figure 9C:
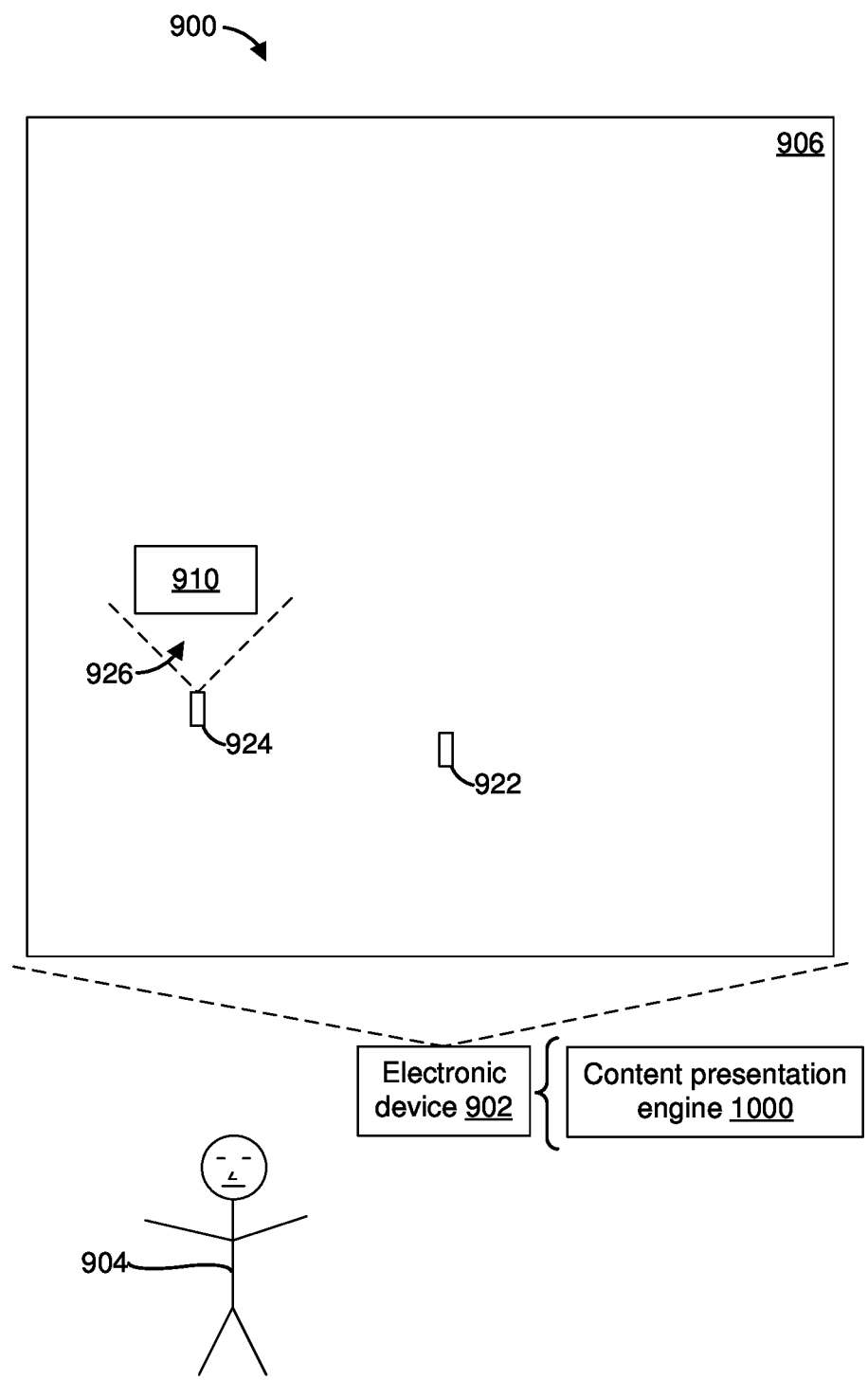

In various implementations, the electronic device 902 detects a change in the graphical environment. For example, as illustrated in FIG. 9B, the electronic device 902 may detect that the object 910 has moved out of the field of view of the rig 922. In response to detecting that the object 910 has moved out of the field of view of the rig 922, the electronic device 902 may switch from the rig 922 to another rig that provides a view of the object 910. For example, as illustrated in FIG. 9C, the electronic device 902 may switch to a rig 924. The rig 924 may provide a POV 926 of the object 910 that is different from the POV 920 of FIG. 9A.

In some implementations, the XR environment 906 includes various fixed rigs (e.g., rigs that are fixed at various locations within the XR environment 906, for example, stationary rigs). In such implementations, the electronic device 902 (e.g., the content presentation engine 1000) tracks the object 910 (e.g., maintains a view of the object 910) by switching between the various fixed rigs. Alternatively, in some implementations, the XR environment 906 includes a movable rig, and the electronic device 902 tracks the object 910 by moving the movable rig in response to detecting a movement of the object 910.

Figure 9D:
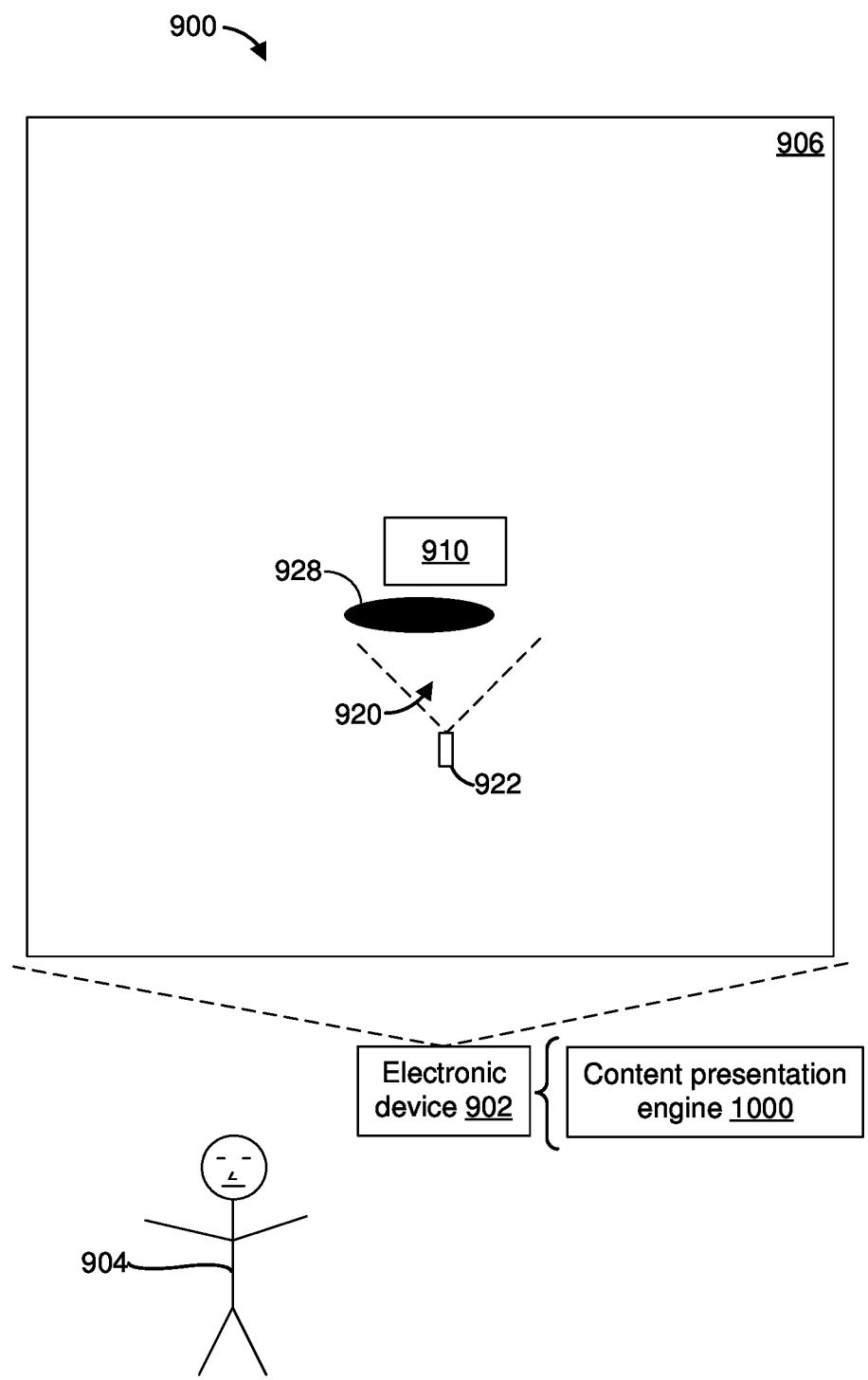
Figure 9E:
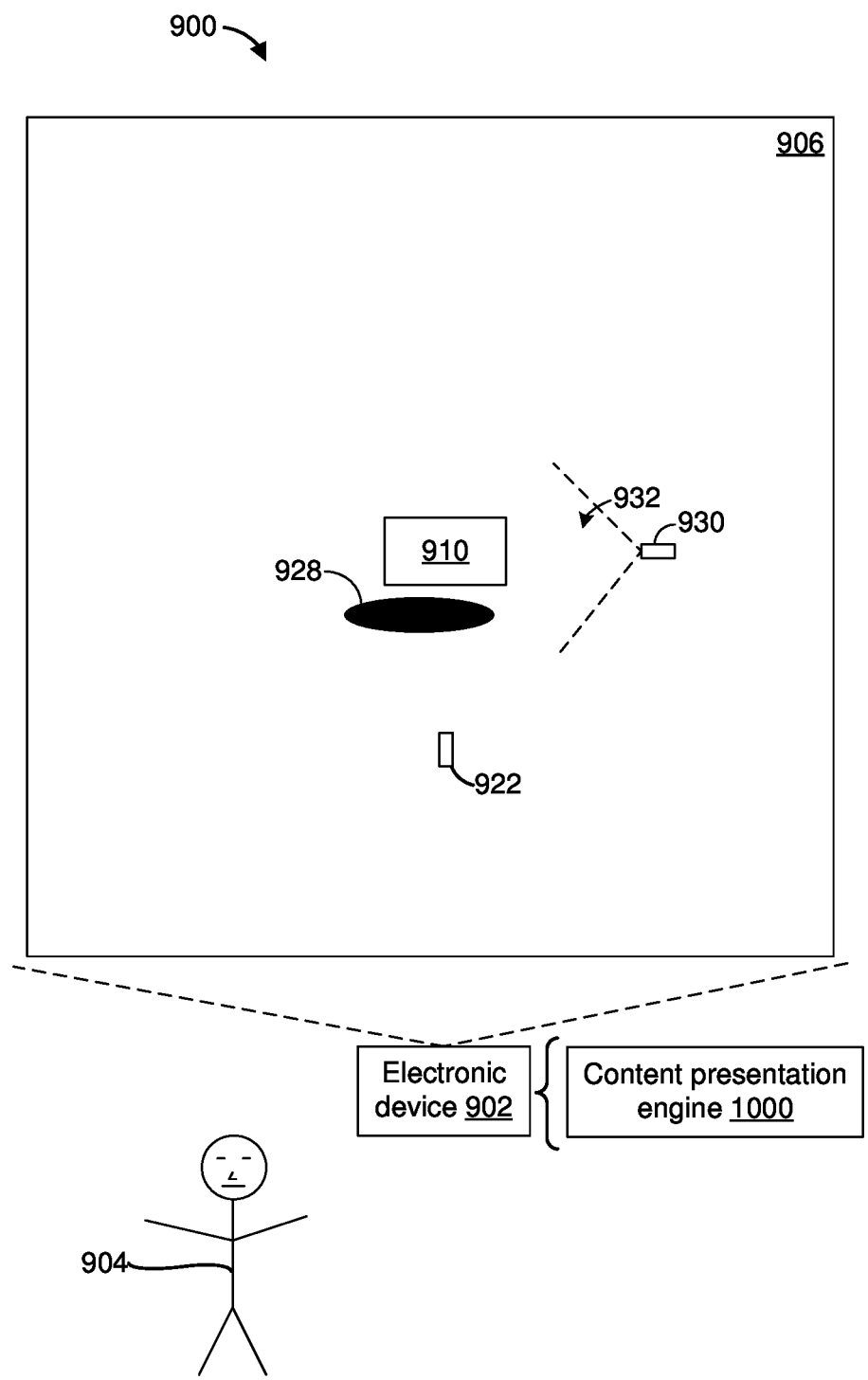

In some implementations, as illustrated in FIG. 9D, the electronic device 902 may detect that an obstruction 928 has blocked a line of sight between the rig 922 and the object 910. In response to detecting that the line of sight between the rig 922 and the object 910 is interrupted, the electronic device 902 may switch from the rig 922 to another rig that provides an uninterrupted line of sight to the object 910. For example, as illustrated in FIG. 9E, the electronic device 902 may switch to a rig 930. The rig 930 may provide a POV 932 of the object 910 that is different from the POV 920 of FIG. 9A. For example, the POV 932 may be characterized by an uninterrupted line of sight from the rig 930 to the object 910.

Figure 9F:
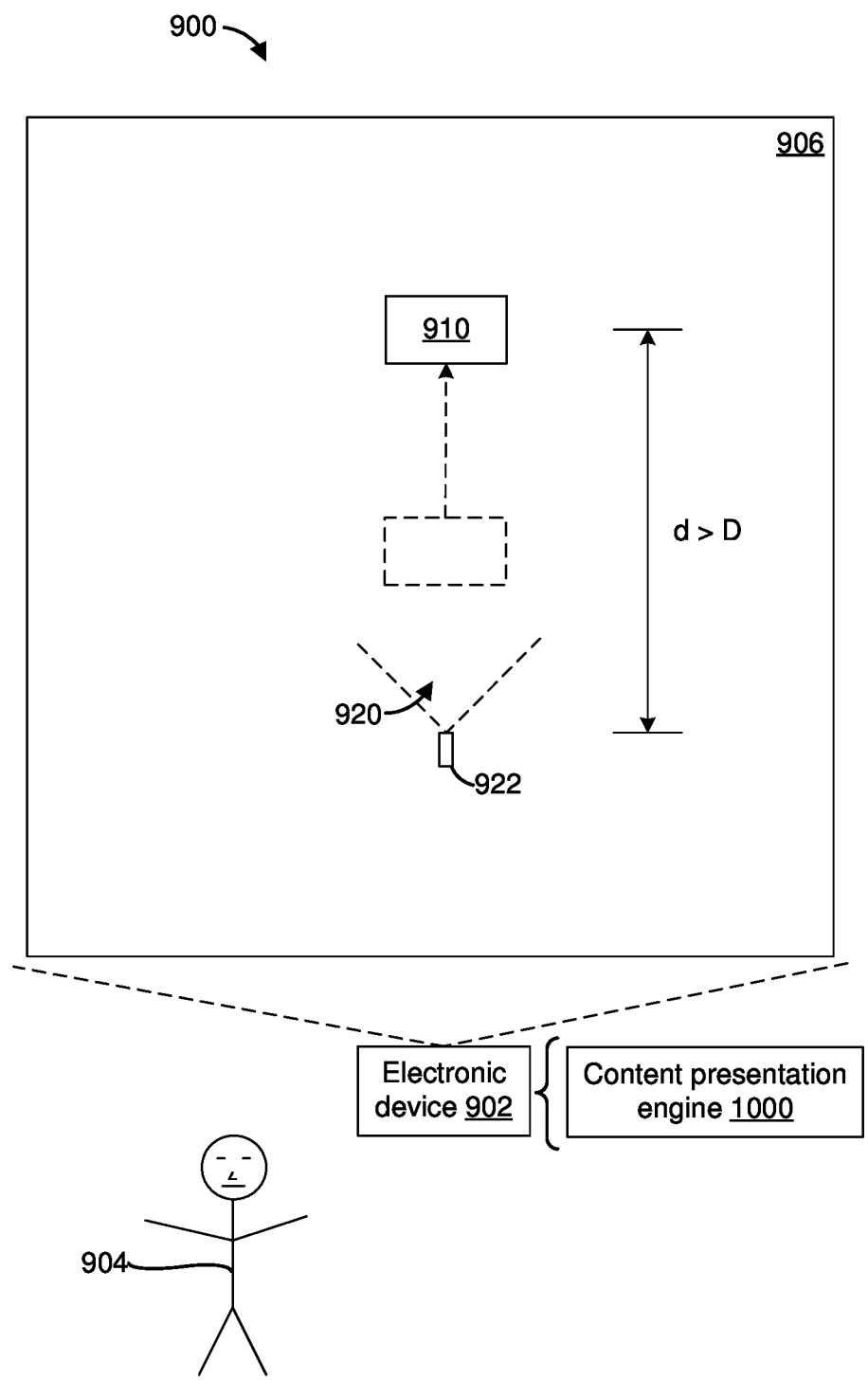
Figure 9G:
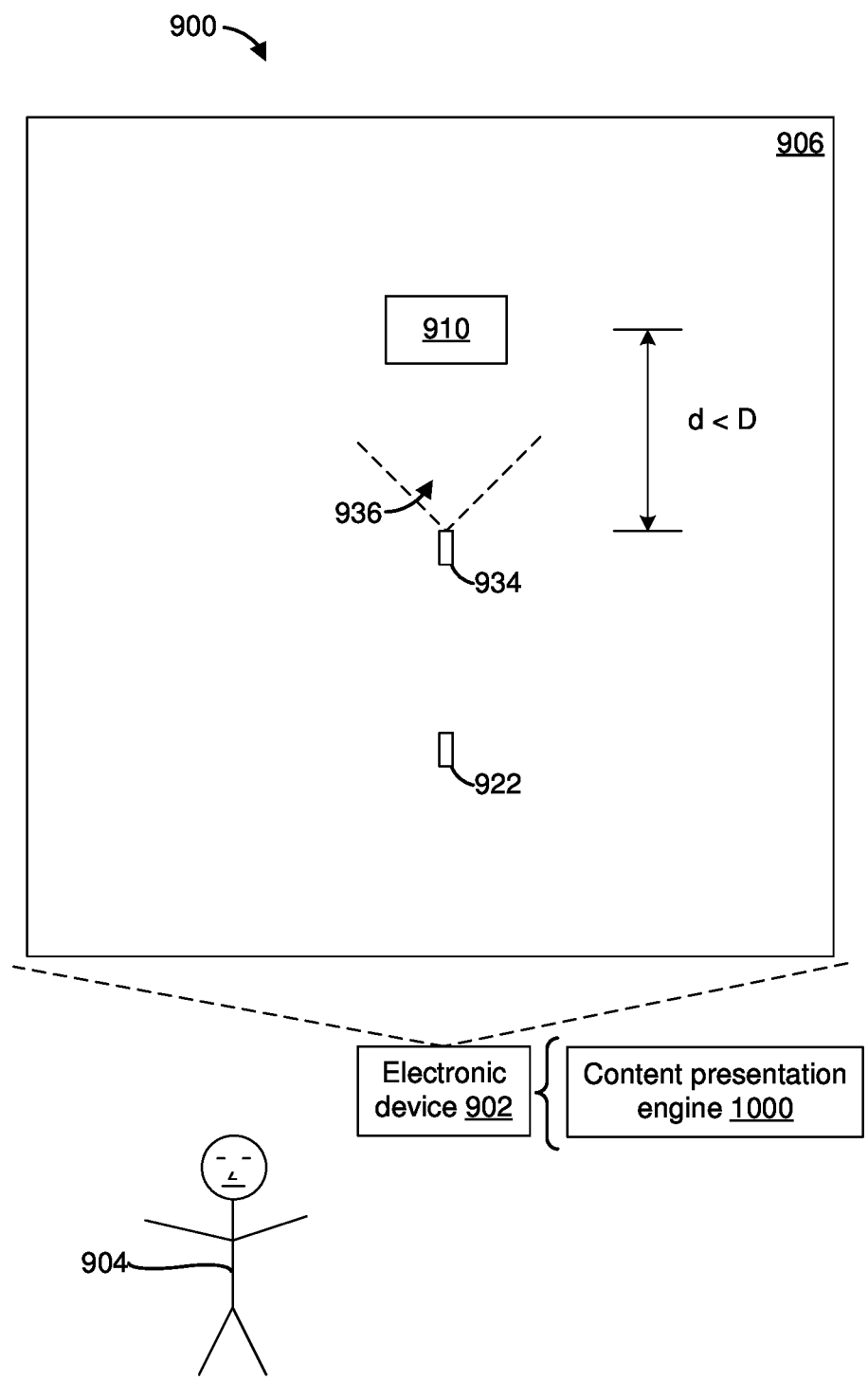

In some implementations, as illustrated in FIG. 9F, the electronic device 902 may detect that the object 910 has moved more than a threshold distance from the rig 922. For example, the distance d between the object 910 and the rig 922 may exceed a threshold D. In response to detecting that the object 910 has moved more than the threshold distance from the rig 922, the electronic device 902 may switch from the rig 922 to another rig. For example, as illustrated in FIG. 9G, the electronic device 902 may switch to a rig 934 that provides a POV 936 of the object 910 that is different from the POV 920 of FIG. 9A. The POV 936 may provide a closer view of the object 910 than the POV 920.

Figure 10:
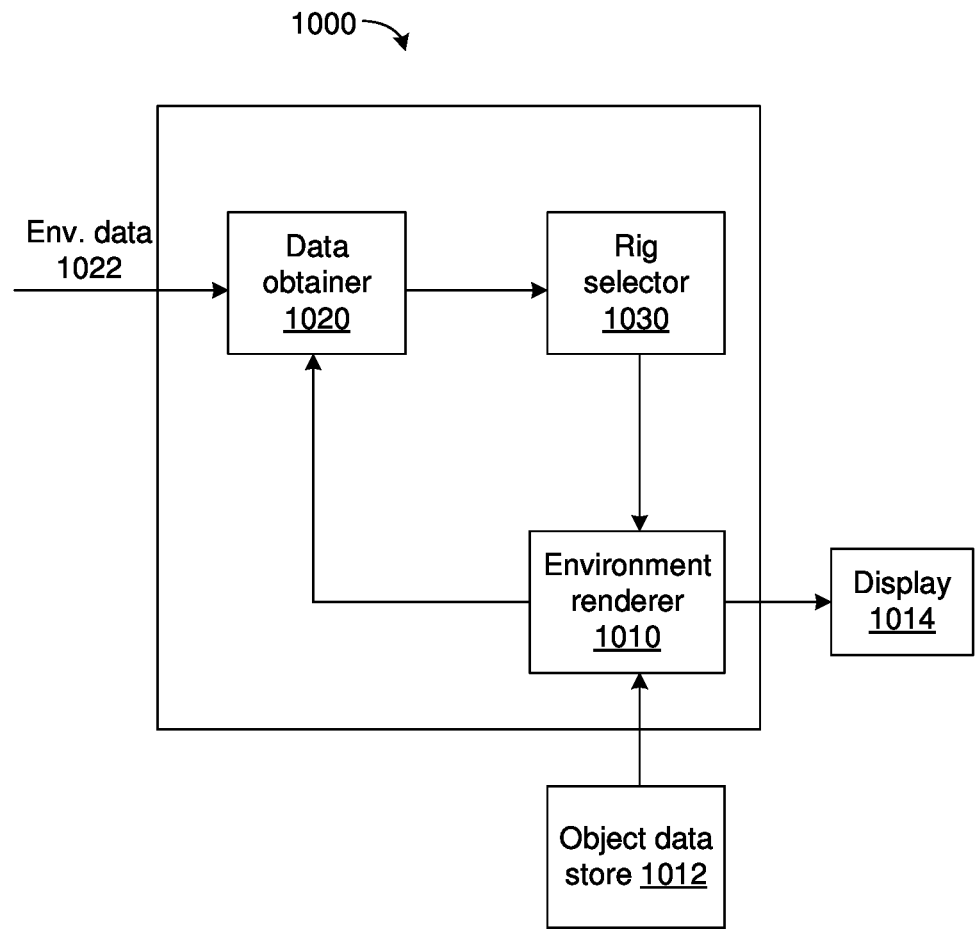
FIG. 10 is a block diagram of an example content presentation engine in accordance with some implementations.

FIG. 10 is a block diagram of an example content presentation engine 1000 in accordance with some implementations. In some implementations, the content presentation engine 1000 includes an environment renderer 1010, a data obtainer 1020, and a rig selector 1030. In some implementations, the content presentation engine 1000 is integrated into the content presentation engine 200 shown in FIG. 2A and/or the content presentation engine 600 shown in FIG. 6. In some implementations, in addition to or as an alternative to performing the operations described in relation to the content presentation engine 1000, the content presentation engine 1000 performs the operations described in relation to the content presentation engine 200 shown in FIG. 2A and/or the operations described in relation to the content presentation engine 600 shown in FIG. 6.

In various implementations, the environment renderer 1010 displays a first view of a target located in a graphical environment. For example, the environment renderer 1010 may generate an XR environment or receive an XR environment from a device that generated the XR environment. The XR environment may include a virtual environment that is a simulated replacement of a physical environment. In some implementations, the environment renderer 1010 synthesizes the XR environment. The XR environment may be different from a physical environment in which the environment renderer 1010 is located. In some implementations, the XR environment includes an augmented environment that is a modified version of a physical environment. For example, in some implementations, the environment renderer 1010 modifies (e.g., augments) the physical environment in which the environment renderer 1010 is located to generate the XR environment. In some implementations, the environment renderer 1010 generates the XR environment by simulating a replica of the physical environment in which the environment renderer 1010 is located. In some implementations, the environment renderer 1010 generates the XR environment by removing and/or adding items from the simulated replica of the physical environment in which the environment renderer 1010 is located.

The XR environment may include an object. In some implementations, the object is referred to as a graphical object or an XR object. In various implementations, the environment renderer 1010 obtains the object from an object datastore 1012. In some implementations, the object represents a physical element. For example, in some implementations, the object represents equipment (e.g., machinery such as planes, tanks, robots, motorcycles, etc.). In some implementations, the object represents a fictional element (e.g., an entity from fictional material, for example, an action figure or a fictional equipment such as a flying motorcycle).

In various implementations, the environment renderer 1010 displays a first view of the object in the XR environment. For example, the environment renderer 1010 may cause a display 1014 to display the XR environment from a first point-of-view (POV) that provides a view of the object. The first POV may be associated with a rig. The environment renderer 1010 may use the rig to capture a representation of the XR environment from the first POV. In some implementations, the display 1014 displays the representation of the XR environment captured from the first POV. In some implementations, the rig includes a set of one or more virtual environmental sensors. For example, in some implementations, the rig includes a virtual image sensor (e.g., a virtual camera), a virtual depth sensor (e.g., a virtual depth camera), and/or a virtual audio sensor (e.g., a virtual microphone). In some implementations, the XR environment includes a physical environment, and the rig includes a set of one or more physical environmental sensors. For example, in some implementations, the rig includes a physical image sensor (e.g., a physical camera), a physical depth sensor (e.g., a physical depth camera), and/or a physical audio sensor (e.g., a physical microphone). In some implementations, the rig is fixed at a location within the XR environment (e.g., the rig is stationary).

In various implementations, when the environment renderer 1010 presents the XR environment from the first POV, the user sees what the XR environment looks like from a location corresponding to the rig. For example, when the environment renderer 1010 presents the XR environment from the first POV, the user sees the object. The user may not see other objects that are out of the field of view of the rig or that are obscured by the object. In some implementations, when the environment renderer 1010 presents the XR environment from the first POV, the user hears sounds that are audible at a location corresponding to the rig. For example, the user hears sounds that the rig detects.

In some implementations, the data obtainer 1020 detects a change in the graphical environment. For example, the data obtainer 1020 may obtain environmental data 1022 characterizing a physical environment of the content presentation engine 1000. For example, an image sensor may capture an image representing the physical environment and provide image data to the data obtainer 1020. As another example, a depth sensor may capture depth data and provide the depth data to the data obtainer 1020. In some implementations, the environment renderer 1010 detects a change in the graphical environment based on the environmental data 1022. For example, the environmental data 1022 may indicate that an obstruction has moved between the rig and the object.

In some implementations, the environment renderer 1010 provides information relating to the graphical environment to the data obtainer 1020. The data obtainer 1020 may detect a change in the graphical environment based on the information provided by the environment renderer 1010. For example, the information provided by the environment renderer 1010 may indicate that the object has moved out of the field of view of the rig or that the object has moved more than a threshold distance from the rig.

In some implementations, in response to the data obtainer 1020 detecting the change in the graphical environment, the rig selector 1030 switches from the rig associated with the first POV to another rig that provides another view of the object that is different from the first POV. For example, the data obtainer 1020 may provide information relating to the location of the object and/or other objects in the XR environment to the rig selector 1030. The rig selector 1030 may use this information to select another rig that provides another view of the object.

In some implementations, the selected rig is associated with a different location in the graphical environment. For example, the rig may be selected to provide a view from a different camera angle than the first POV. As another example, if the data obtainer 1020 detected an obstruction blocking a line of sight to the object, the rig selector 1030 may select a rig that provides an uninterrupted line of sight to the object. In some implementations, the data obtainer 1020 detects a movement of the target, and the rig selector 1030 selects a rig that maintains visibility of the target.

In some implementations, when the rig selector 1030 switches to the selected rig, the environment renderer 1010 displays the XR environment from a second POV associated with the selected rig. For example, the environment renderer 1010 may cause the display 1014 to display the XR environment from the second POV. The environment renderer 1010 may use the selected rig to capture a representation of the XR environment from the second POV. In some implementations, the display 1014 displays the representation of the XR environment captured from the second POV. In some implementations, the selected rig includes a set of one or more virtual environmental sensors. For example, in some implementations, the selected rig includes a virtual image sensor (e.g., a virtual camera), a virtual depth sensor (e.g., a virtual depth camera), and/or a virtual audio sensor (e.g., a virtual microphone). In some implementations, the XR environment includes a physical environment, and the selected rig includes a set of one or more physical environmental sensors. For example, in some implementations, the selected rig includes a physical image sensor (e.g., a physical camera), a physical depth sensor (e.g., a physical depth camera), and/or a physical audio sensor (e.g., a physical microphone). In some implementations, the selected rig is fixed at a location within the XR environment (e.g., the selected rig is stationary).

In various implementations, when the environment renderer 1010 presents the XR environment from the second POV, the user sees what the XR environment looks like from a location corresponding to the selected rig. For example, when the environment renderer 1010 presents the XR environment from the second POV, the user sees the object. The user may not see other objects that are out of the field of view of the selected rig or that are obscured by the object. In some implementations, when the environment renderer 1010 presents the XR environment from the second POV, the user hears sounds that are audible at a location corresponding to the selected rig. For example, the user hears sounds that the selected rig detects.

Figure 11:
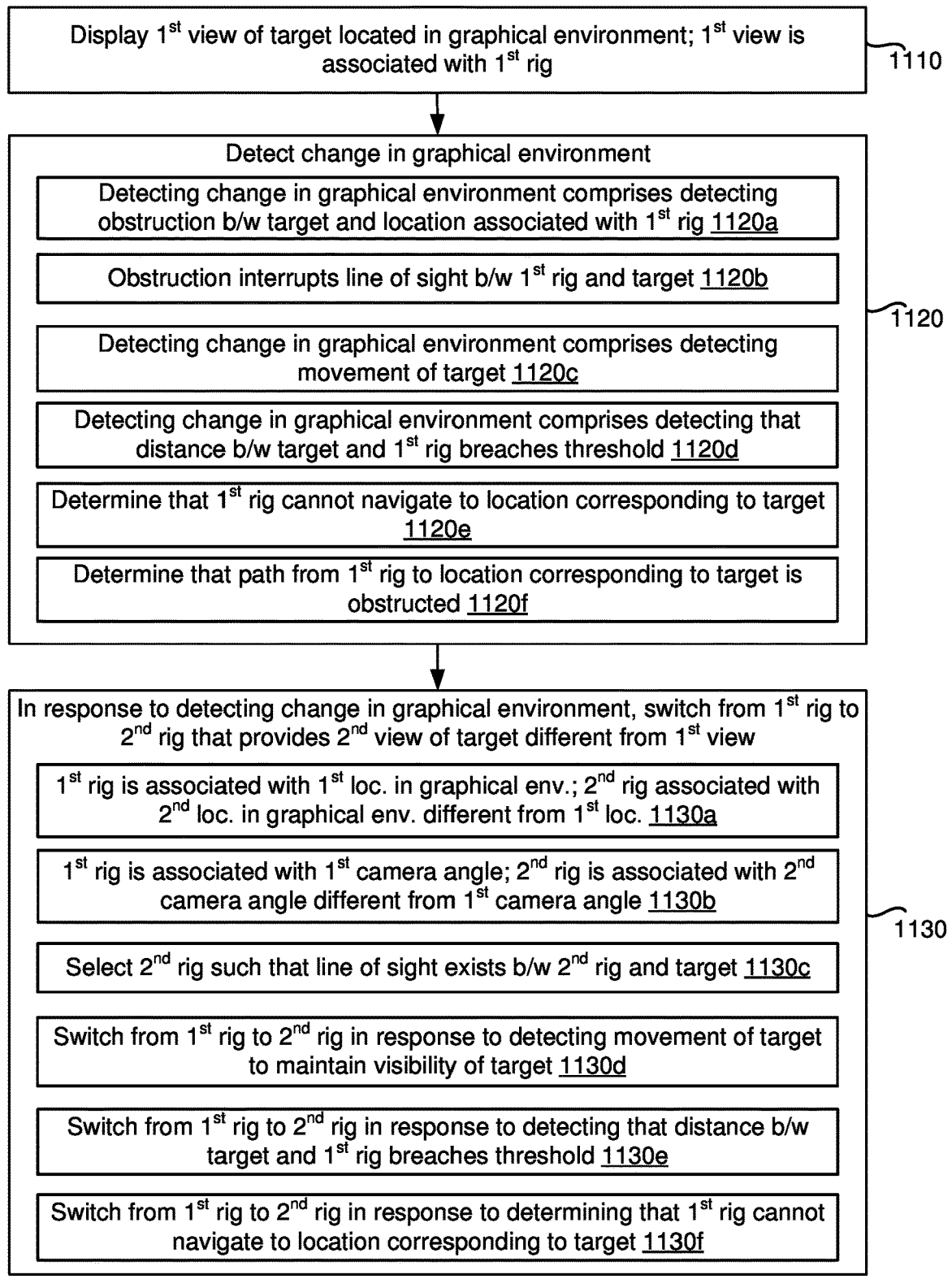
FIG. 11 is a flowchart representation of a method for presenting a graphical environment in accordance with some implementations.

FIG. 11 is a flowchart representation of a method 1100 for presenting a graphical environment in accordance with some implementations. In various implementations, the method 1100 is performed by a device (e.g., the electronic device 902 shown in FIGS. 9A-9G, or the content presentation engine 1000 shown in FIGS. 9A-9G and 10). In some implementations, the method 1100 is performed by processing logic, including hardware, firmware, software, or a combination thereof. In some implementations, the method 1100 is performed by a processor executing code stored in a non-transitory computer-readable medium (e.g., a memory). Briefly, the method 1100 includes displaying a first view of a target located in a graphical environment. The first view is associated with a first rig. The method 1100 includes detecting a change in the graphical environment and, in response to detecting the change in the graphical environment, switching from the first rig to a second rig that provides a second, different, view of the target.

In various implementations, as represented by block 1110, the method 1100 includes displaying a first view of a target located in a graphical environment. The first view is associated with a first rig. The graphical environment may include an XR environment, such as a virtual environment that is a simulated replacement of a physical environment. In some implementations, the XR environment is different from a physical environment in which an electronic device is located. The XR environment may include an augmented environment that is a modified version of a physical environment. In some implementations, the XR environment is generated by simulating a replica of the physical environment. The XR environment may be generated by removing and/or adding items from the simulated replica of the physical environment.

In some implementations, the target in the graphical environment is an object, such as a graphical object or an XR object. The object may represent a physical element, such as equipment (e.g., machinery such as planes, tanks, robots, motorcycles, etc.). In some implementations, the object represents a fictional element (e.g., an entity from fictional material, for example, an action figure or a fictional equipment such as a flying motorcycle).

In some implementations, the first rig captures a representation of the graphical environment from the first view. The first rig may include a set of one or more virtual environmental sensors. For example, in some implementations, the first rig includes a virtual image sensor (e.g., a virtual camera), a virtual depth sensor (e.g., a virtual depth camera), and/or a virtual audio sensor (e.g., a virtual microphone). In some implementations, the graphical environment includes a physical environment, and the first rig includes a set of one or more physical environmental sensors. For example, in some implementations, the first rig includes a physical image sensor (e.g., a physical camera), a physical depth sensor (e.g., a physical depth camera), and/or a physical audio sensor (e.g., a physical microphone). In some implementations, the first rig is fixed at a location within the graphical environment (e.g., the first rig is stationary).

In various implementations, when the target is displayed from the first view, the user sees what the target looks like from a location corresponding to the first rig. For example, when the graphical environment is displayed from the first view, the user sees the target. The user may not see other objects that are out of the field of view of the first rig or that are obscured by the target. In some implementations, when the target is displayed from the first view, the user hears sounds that are audible at a location corresponding to the first rig. For example, the user hears sounds that the first rig detects.

In various implementations, as represented by block 1120, the method 1100 includes detecting a change in the graphical environment. For example, environmental data may characterize a physical environment of an electronic device and may indicate a change in the graphical environment. For example, an image sensor may capture an image representing the physical environment. As another example, a depth sensor may capture depth data. In some implementations, as represented by block 1120a, detecting the change in the graphical environment includes detecting an obstruction between the target and a location associated with the first rig. For example, image data and/or depth data may indicate that an obstruction has moved between the first rig and the target. In some implementations, as represented by block 1120b, the obstruction interrupts a line of sight between the first rig and the target.

In some implementations, an environment renderer provides information relating to the graphical environment that may indicate a change in the graphical environment. For example, if the target is a virtual object, the environment renderer may maintain information corresponding to the location and/or movement of the virtual object, the first rig, and/or other objects in the graphical environment. In some implementations, as represented by block 1120c, detecting the change in the graphical environment includes detecting a movement of the target. For example, information from the environment renderer may be used to detect the movement of the target. In some implementations, as represented by block 1120d, detecting the change in the graphical environment comprises detecting that a distance between the target and the first rig breaches a threshold. For example, information provided by the environment renderer and relating to the respective locations of the target and the first rig may be used to determine the distance between the target and the first rig. As another example, movement information corresponding to the target and/or the first rig may be used to determine if the target has moved more than the threshold distance away from the first rig.

In some implementations, as represented by block 1120e, the method 1100 includes determining that the first rig cannot navigate to a location corresponding to the target. For example, the first rig may be stationary or may be incapable of moving as quickly as the target. In some implementations, as represented by block 1120f, the method 1100 includes determining that a path from the first rig to the location corresponding to the target is obstructed.

In various implementations, as represented by block 1130, the method 1100 includes switching from the first rig to a second rig that provides a second view of the target in response to detecting the change in the graphical environment. The second view is different from the first view. In various implementations, switching from the first rig to the second rig allows the device to display an uninterrupted view (e.g., a continuous view) of the target, thereby enhancing a user experience of the device. In some implementations, automatically switching from the first rig to the second rig reduces a need for a user input that corresponds to the user manually switching from the first rig to the second rig. Reducing unnecessary user inputs tends to enhance operability of the device by reducing a power consumption associated with processing (e.g., interpreting and/or acting upon) unnecessary user inputs.

In some implementations, the method 1100 includes determining a saliency value associated with the target. In some implementations, the method 1100 includes determining whether the saliency value associated with the target is equal to or greater than a threshold saliency value. In some implementations, if the saliency value associated with the target is greater than the threshold saliency value, the method 1100 includes determining to track the target as the target moves and switching from the first rig to the second rig in response to detecting the change in the graphical environment. However, in some implementations, if the saliency value associated with the target is less than the threshold saliency value, the method 1100 includes determining not to track the target as the target moves and forgoing the switch from the first rig to the second rig (e.g., maintaining the first view from the first rig) in response to detecting the change in the graphical environment.

In some implementations, the method 1100 includes determining whether or not a gaze of a user of the device is directed to the target. In some implementations, if the gaze of the user is directed to the target, the method 1100 includes determining to track the target as the target moves and switching from the first rig to the second rig in response to detecting the change in the graphical environment. However, in some implementations, if the gaze of the user is not directed to the target, the method 1100 includes determining not to track the target as the target moves and forgoing the switch from the first rig to the second rig (e.g., maintaining the first view from the first rig) in response to detecting the change in the graphical environment.

In some implementations, the selected rig is associated with a different location in the graphical environment. For example, as represented by block 1130a, the first rig may be associated with a first location in the graphical environment, and the second rig may be associated with a second rig in the graphical environment that is different from the first location.

In some implementations, the rig may be selected to provide a view from a different camera angle than the first view. As represented by block 1130b, the first rig may be associated with a first camera angle, and the second rig may be associated with a second camera angle that is different from the first camera angle. For example, the first rig may provide a frontal view of the target, and the second rig may provide a top view of the target.

In some implementations, the detected change in the graphical environment may include an obstruction that interrupts a line of sight from the first rig to the target. As represented by block 1130c, the second rig may be selected such that a line of sight exists between the second rig and the target. For example, the second rig may be selected such that a line of sight between it and the target is not interrupted by the obstruction.

The detected change in the graphical environment may include a detected movement of the target. In some implementations, as represented by block 1130d, the method 1100 includes switching from the first rig to the second rig in response to detecting movement of the target to maintain visibility (e.g., an uninterrupted view) of the target. For example, as the target moves, a rig that is closer to the target may be selected. In some implementations, as represented by block 1130e, switching from the first rig to the second rig is performed in response to detecting that the distance between the target and the first rig breaches a threshold. The second rig may be selected such that the distance between the target and the second rig does not breach the threshold, e.g., the distance between the target and the second rig is less than the threshold.

Detecting the change in the graphical environment may include detecting that the first rig cannot navigate to a location corresponding to the target. For example, a path from the first rig to the target may be obstructed. In some implementations, as represented by block 1130f, switching from the first rig to the second rig is performed in response to determining that the first rig cannot navigate to the location corresponding to the target. The second rig may be selected to provide a view of the target. In some implementations, the second rig is selected such that the second rig can navigate to the target, e.g., the second rig is closer to the target and/or a path from the second rig to the target is not obstructed.

In some implementations, the graphical environment is displayed from a second view associated with the second rig. The second rig may capture a representation of the target from the second view. In some implementations, the second rig includes a set of one or more virtual environmental sensors. For example, in some implementations, the second rig includes a virtual image sensor (e.g., a virtual camera), a virtual depth sensor (e.g., a virtual depth camera), and/or a virtual audio sensor (e.g., a virtual microphone). In some implementations, the graphical environment includes a physical environment, and the second rig includes a set of one or more physical environmental sensors. For example, in some implementations, the second rig includes a physical image sensor (e.g., a physical camera), a physical depth sensor (e.g., a physical depth camera), and/or a physical audio sensor (e.g., a physical microphone). In some implementations, the second rig is fixed at a location within the graphical environment (e.g., the second rig is stationary).

In various implementations, when the target is displayed from the second view, the user sees what the graphical environment looks like from a location corresponding to the second rig. For example, the user may not see other objects that are out of the field of view of the second rig or that are obscured by the object. In some implementations, when the graphical environment is presented from the second view, the user hears sounds that are audible at a location corresponding to the second rig. For example, the user hears sounds that the second rig detects.

Figure 12:
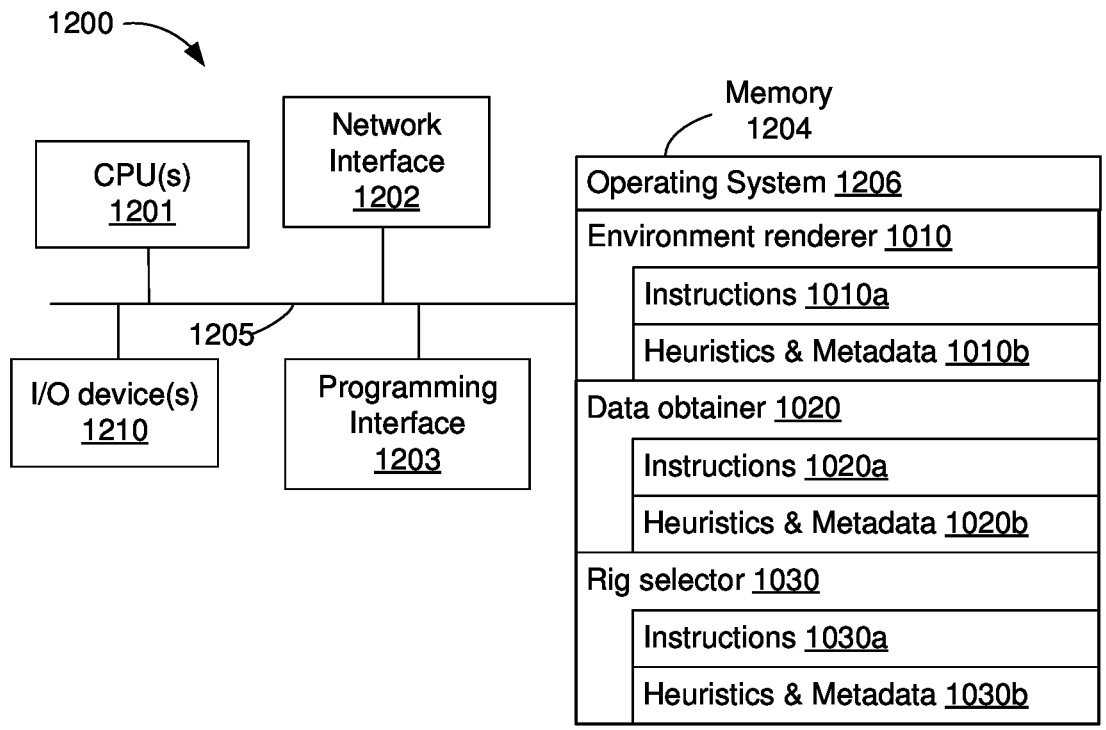
FIG. 12 is a block diagram of a device that follows a target in a graphical environment in accordance with some implementations.

FIG. 12 is a block diagram of a device 1200 that follows a target in a graphical environment in accordance with some implementations. In some implementations, the device 1200 implements the electronic device 902 shown in FIGS. 9A-9G, and/or the content presentation engine 1000 shown in FIGS. 9A-9G and 10. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 1200 includes one or more processing units (CPUs) 1201, a network interface 1202, a programming interface 1203, a memory 1204, one or more input/output (I/O) devices 1210, and one or more communication buses 1205 for interconnecting these and various other components.

In some implementations, the network interface 1202 is provided to, among other uses, establish and maintain a metadata tunnel between a cloud hosted network management system and at least one private network including one or more compliant devices. In some implementations, the one or more communication buses 1205 include circuitry that interconnects and controls communications between system components. The memory 1204 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 1204 optionally includes one or more storage devices remotely located from the one or more CPUs 1201. The memory 1204 comprises a non-transitory computer readable storage medium.

In some implementations, the memory 1204 or the non-transitory computer readable storage medium of the memory 1204 stores the following programs, modules and data structures, or a subset thereof including an optional operating system 1206, the environment renderer 1010, the data obtainer 1020, and the rig selector 1030. In various implementations, the device 1200 performs the method 1100 shown in FIG. 11. Additionally or alternatively, in some implementations, the device 1200 performs the method 300 shown in FIG. 3. Additionally or alternatively, in some implementations, the device 1200 performs the method 700 shown in FIGS. 7A and 7B.

In some implementations, the environment renderer 1010 displays a first view of a target in a graphical environment. In some implementations, the environment renderer 1010 performs at least some of the operation(s) represented by block 1110 in FIG. 11. To that end, the environment renderer 1010 includes instructions 1010a and heuristics and metadata 1010b.

In some implementations, the data obtainer 1020 obtains data and detects a change in the graphical environment. In some implementations, the data obtainer 1020 performs at least some of the operation(s) represented by block 1120 in FIG. 11. To that end, the data obtainer 1020 includes instructions 1020a and heuristics and metadata 1020b.

In some implementations, the rig selector 1030 switches from a rig associated with the first view to another rig that provides another view of the target that is different from the first view. In some implementations, the rig selector 1030 performs the at least some of the operation(s) represented by block 1130 in FIG. 11. To that end, the rig selector 1030 includes instructions 1030a and heuristics and metadata 1030b.

In some implementations, the one or more I/O devices 1210 include an environmental sensor for obtaining environmental data. In some implementations, the one or more I/O devices 1210 include an audio sensor (e.g., a microphone) for detecting a speech input. In some implementations, the one or more I/O devices 1210 include an image sensor (e.g., a camera) to capture image data representing a user's eyes and/or extremity. In some implementations, the one or more I/O devices 1210 include a depth sensor (e.g., a depth camera) to capture depth data. In some implementations, the one or more I/O devices 1210 include a display for displaying the graphical environment from the selected POV. In some implementations, the one or more I/O devices 1210 include a speaker for outputting an audible signal corresponding to the selected POV.

In various implementations, the one or more I/O devices 1210 include a video pass-through display that displays at least a portion of a physical environment surrounding the device 1200 as an image captured by a scene camera. In various implementations, the one or more I/O devices 1210 include an optical see-through display that is at least partially transparent and passes light emitted by or reflected off the physical environment.

It will be appreciated that FIG. 12 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 12 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:
1. A method comprising:
at a device including a display, an audio sensor, an input device, one or more processors and a non-transitory memory:

displaying, on the display, a graphical environment from a first point-of-view (POV) associated with a first camera rig that performs a first type of movement to display the graphical environment from the first POV;

selecting a second POV based on a speech input received via the audio sensor and an input obtained via the input device; and displaying the graphical environment from the second POV associated with a second camera rig that is different from the first camera rig and performs a second type of movement to display the graphical environment from the second POV.

2. The method of claim 1, wherein selecting the second POV comprises disambiguating the speech input based on the input.

3. The method of claim 1, wherein the input includes a gaze input.

4. The method of claim 1, wherein the input includes a position of an extremity.

5. The method of claim 1, wherein selecting the second POV comprises disambiguating the speech input based on contextual data indicating a context of the device or a user of the device.

6. The method of claim 1, wherein the first POV is associated with a first type of virtual character and the second POV is associated with a second type of virtual character.

7. The method of claim 1, wherein the first POV provides a view of a first object and the second POV provides a view of a second object that is different from the first object.

8. The method of claim 1, wherein the first POV provides a view of a first portion of an object and the second POV provides a view of a second portion of the object that is different from the first portion of the object.

9. The method of claim 1, wherein displaying the graphical environment from the second POV comprises displaying a transition between the first POV and the second POV, wherein the transition includes a set of intermediary POVs.

10. The method of claim 9, wherein a speed of the transition is a function of a type of virtual character associated with the first and second POVs.

11. The method of claim 1, wherein the first POV is from a first location within the graphical environment and the second POV is from a second location that is different from the first location.

12. The method of claim 11, further comprising identifying obstacles between the first location and the second location and displaying intermediary POVs that correspond to navigating around the obstacles.

13. A device comprising:
one or more processors;
a non-transitory memory;
a display;
an audio sensor;
an input device; and
one or more programs stored in the non-transitory memory, which, when executed by the one or more processors, cause the device to:
 display, on the display, a graphical environment from a first point-of-view (POV) associated with a first camera rig that performs a first type of movement to display the graphical environment from the first POV;
 select a second POV based on a speech input received via the audio sensor and an input obtained via the input device; and
 display the graphical environment from the second POV associated with a second camera rig that is different from the first camera rig and performs a second type of movement to display the graphical representation from the second POV.

14. The device of claim 13, wherein selecting the second POV comprises disambiguating the speech input based on the input.

15. The device of claim 13, wherein the input includes a gaze input.

16. A non-transitory memory storing one or more programs, which, when executed by one or more processors of a device, cause the device to:
 display, on a display, a graphical environment from a first point-of-view (POV) associated with a first camera rig that performs a first type of movement to display the graphical environment from the first POV;
 select a second POV based on a speech input received via an audio sensor and an input obtained via an input device; and
 display the graphical environment from the second POV associated with a second camera rig that is different from the first camera rig and performs a second type of movement to display the graphical environment from the second POV.

17. The non-transitory memory of claim 16, wherein the input includes a position of an extremity.

18. The non-transitory memory of claim 16, wherein selecting the second POV comprises disambiguating the speech input based on contextual data indicating a context of the device or a user of the device.

* * * * *